(12) United States Patent
Archer et al.

(10) Patent No.: US 11,476,495 B2
(45) Date of Patent: *Oct. 18, 2022

(54) STABLE ROOM-TEMPERATURE SODIUM-SULFUR BATTERY

(71) Applicant: Cornell University, Ithaca, NY (US)

(72) Inventors: Lynden A. Archer, Ithaca, NY (US); Shuya Wei, Henan (CN)

(73) Assignee: CORNELL UNIVERSITY, Ithaca, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/999,484

(22) Filed: Aug. 21, 2020

(65) Prior Publication Data

US 2020/0381767 A1 Dec. 3, 2020

Related U.S. Application Data

(63) Continuation of application No. 16/081,775, filed as application No. PCT/US2017/020920 on Mar. 6, 2017, now Pat. No. 10,763,540.

(60) Provisional application No. 62/303,685, filed on Mar. 4, 2016.

(51) Int. Cl.
| | | |
|---|---|---|
| *H01M 6/04* | (2006.01) | |
| *H01M 10/054* | (2010.01) | |
| *H01M 4/13* | (2010.01) | |
| *H01M 4/36* | (2006.01) | |
| *H01M 4/38* | (2006.01) | |
| *H01M 4/62* | (2006.01) | |
| *H01M 10/0567* | (2010.01) | |

(52) U.S. Cl.
CPC ........... *H01M 10/054* (2013.01); *H01M 4/13* (2013.01); *H01M 4/362* (2013.01); *H01M 4/381* (2013.01); *H01M 4/624* (2013.01); *H01M 10/0567* (2013.01); *H01M 4/38* (2013.01)

(58) Field of Classification Search
CPC ........... H01M 10/054; H01M 10/0566; H01M 10/0567; H01M 10/0569; H01M 10/0568; H01M 10/0561; H01M 4/13; H01M 4/362; H01M 4/381; H01M 4/624; H01M 4/38

See application file for complete search history.

(56) References Cited

U.S. PATENT DOCUMENTS

| | | | |
|---|---|---|---|
| 9,203,109 B2 | 12/2015 | Caputo et al. | |
| 10,763,540 B2* | 9/2020 | Archer | H01M 4/13 |
| 2007/0154814 A1 | 7/2007 | Ryu et al. | |
| 2010/0239893 A1* | 9/2010 | Gordon | H01M 4/136 |
| | | | 429/50 |
| 2013/0065127 A1 | 3/2013 | Nazar et al. | |
| 2013/0244085 A1* | 9/2013 | Coors | H01M 4/136 |
| | | | 429/160 |
| 2015/0084604 A1 | 3/2015 | Thillaiyan et al. | |
| 2016/0049658 A1 | 2/2016 | Chae et al. | |
| 2017/0207488 A1* | 7/2017 | Zhamu | H01M 4/139 |

FOREIGN PATENT DOCUMENTS

| | | |
|---|---|---|
| CN | 104300175 A | 1/2015 |
| WO | 2009/114314 A2 | 9/2009 |
| WO | 2016/202969 A1 | 12/2016 |

OTHER PUBLICATIONS

Xin, S., et al., A High-Energy Room-Temperature Sodium-Sulfur Batter, Adv. Mater., 2014, vol. 26, pp. 1261-1265.

* cited by examiner

*Primary Examiner* — Raymond Alejandro
(74) *Attorney, Agent, or Firm* — Paul J. Roman, Jr.; Johnson, Marcou, Isaacs & Nix, LLC

(57) ABSTRACT

A sodium-ion conducting (e.g., sodium-sulfur) battery, which can be rechargeable, comprising a microporous host-sulfur composite cathode as described herein or a liquid electrolyte comprising a liquid electrolyte solvent and a liquid electrolyte salt or electrolyte additive as described herein or a combination thereof. The batteries can be used in devices such as, for example, battery packs.

27 Claims, 37 Drawing Sheets

(a) cont.

(b)

(c)

C

A

STABLE ROOM-TEMPERATURE SODIUM-SULFUR BATTERY

CROSS-REFERENCE TO RELATED APPLICATIONS

This application is a continuation of U.S. patent application Ser. No. 16/081,775, filed Aug. 31, 2018 (which issued on Sep. 1, 2020 as U.S. Pat. No. 10,763,540), which is a National Phase of International Application no. PCT/US2017/020920, filed Mar. 6, 2017, which claims priority to U.S. provisional patent application No. 62/303,685, filed Mar. 4, 2016, the disclosures of each of which are incorporated herein by reference.

STATEMENT REGARDING FEDERALLY-SPONSORED RESEARCH OR DEVELOPMENT

This invention was made with government support under grant no. IIP-1237622 awarded by the National Science Foundation. The government has certain rights in the invention.

FIELD OF THE DISCLOSURE

This disclosure relates to sodium ion-conducting batteries. More particularly, it relates to sodium-sulfur rechargeable batteries.

BACKGROUND OF THE DISCLOSURE

High-energy and inexpensive rechargeable battery systems based on earth-abundant materials are important for both mobile and stationary energy storage technologies. Rechargeable sodium-sulfur (Na—S) batteries able to operate stably at room temperature are among the most sought-after of these platforms because the cells take advantage of a two-electron-redox process to yield high storage capacity from inexpensive electrode materials. Realization of such batteries has been fraught with multiple stubborn problems ranging from unstable electrodeposition of sodium during battery recharge to rapid loss of the active cathode material by dissolution into the electrolyte.

The importance of rechargeable lithium batteries in portable electronics and their potential for electrifying transportation have been well described in several reviews. Various recent efforts have focused on the lithium-sulfur (Li—S) chemistry due to the high theoretical specific energy (2500 W h $kg^{-1}$), high natural abundance and environmental benignity of the sulfur cathode, with great progress being achieved during the past decade. Although many technical challenges remain, the cost and feasibility of batteries that use metallic lithium as the anode and sulfur as the cathode appear good for applications in transportation, but less so for grid-related applications, where scale and cost are as important as gravimetric storage capacity. Sodium, the second lightest and smallest alkali metal is a low-cost alternative to lithium as anode and is available in regions all over world, it is unsurprising that interest in Na-based batteries predate those in Li-based ones.

High-temperature sodium-sulfur (Na—S) batteries operated at >300° C. with molten electrodes and a solid β-alumina electrolyte have been commercialized for stationary energy storage systems, confirming that this cell chemistry can meet the scale and cost requirements for feasibility in grid-scale applications. A stable room temperature (RT) analog of the rechargeable Na—S battery with a higher theoretical specific energy of 1274 W h $kg^{-1}$ has to date proven elusive. The large difference in size between Na atom and $Na^+$ ion defines one aspect of the challenge, as it is thought to make a sodium anode more prone than lithium to form unstable electrodeposits and dendrites. Sodium is also more reactive with aprotic liquid electrolyte solvents and forms a less stable protective solid electrolyte interphase (SEI) in aprotic liquids, which leads to lower electrochemical conversion efficiency and poor shelf life. $Na^+$ ions are larger and less reducing than $Li^+$ ions, which implies that transport and kinetics of electrochemical processes in the cathode are more sluggish. Finally, its reduction products with sulfur are more soluble than the analogous ones for lithium. Taken together, these traits mean that a successful Na—S cell must overcome multiple new challenges at both the anode and cathode, in addition to the already well-known ones facing Li—S batteries: the insulating nature of sulfur and its solid-state discharge product; the solubility of intermediate lithium polysulfides (LiPS) species and their associated shuttling between the electrodes, which lowers the Coulombic efficiency of the cell; and volume expansion of the cathode upon cell discharge. It is significant that some of these problems remain even when a solid-state electrolyte is employed in high-temperature Na—S cells in which the Na metal anode is a liquid.

Sulfur infused into microporous carbon materials with small pore sizes ($d_p$<1.8 nm) and high surface areas ($S_A$≥843 $m^2/g$) have been reported previously. When employed as cathodes in Li—S cells, the materials have been reported to display only one of the two discharge plateaus observed in traditional Li—S batteries, which has been argued to lend support to the hypothesis that in microporous carbons sulfur undergoes a solid-state electrochemical reaction with $Li^+$ directly forming solid sulfide product species in the cathode—i.e. without forming soluble LiPS. An alternative argument has been presented that supports formation of smaller sulfur ($S_{2-4}$) species in microporous carbon substrates that upon reduction with $Li^+$ cannot form soluble high-order LiPS. Although this argument is a reasonable interpretation of the electrochemistry data, support from thermodynamic analysis of the electrode has so far been lacking. Because the mechanism of cathode stabilization relies on changing the thermodynamics of reduced sulfur in carbon micropores to favor smaller sulfur species, this sets strict limits on the size of the carbon pores. On the anode side, strategies for preventing dendrite formation in lithium metal batteries are generally considered applicable for the sodium anode, but none have been demonstrated. Among the approaches that work for Li, efforts to reduce the magnitude of destabilizing electric fields near the anode by tethering anions to slow-moving or immobile supports, or those focused on introduction of LiF or LiF precursors (e.g. fluorinated polymer binders, salts or fluorinated electrolytes or electrolyte additives (e.g. ethylene carbonate carbonate) known to readily breakdown in the presence of Li to form LiF could potentially prevent dendrite proliferation in Na-battery systems.

Therefore, what is needed for rechargeable sodium-sulfur (Na—S) batteries able to operate stably at room temperature are robust strategies that protect both electrodes from degradation processes that are more severe than in the analogous Li—S batteries.

BRIEF SUMMARY OF THE DISCLOSURE

The present disclosure provides batteries (e.g., sodium-ion conducting batteries). The batteries can be rechargeable batteries. The batteries comprise a cathode, an anode, and an ion-conducting electrolyte. The batteries conduct ions such as, for example, sodium ions. The batteries can have properties described in the examples provided herein.

A battery (e.g., sodium ion-conducting battery of the present disclosure, which may be rechargeable) can comprise various combinations of cathode materials, liquid electrolyte (e.g., liquid electrolyte solvent(s) and/or liquid electrolyte salt(s)), and electrolyte additive(s). In various examples, a sodium-ion conducting battery (e.g., a rechargeable sodium-ion conducting battery) comprises (1) a porous host-sulfur solid-state composite cathode as described herein or (2) a liquid electrolyte comprising a liquid electrolyte solvent and a liquid electrolyte salt as described herein or (3) an electrolyte additive as described herein or a combination thereof. The cathode comprises cathode material (e.g., interconnected porous (e.g., microporous and/or mesoporous) host-sulfur composite material) is in electrical contact with the sodium ion-conducting electrolyte material. The microporous and/or mesoporous host can comprise various materials. The microporous and/or mesoporous host has a microporous and/or mesoporous structure and is electrically conductive. The porous cathode host material has continuous, interconnected pores (e.g., pores interconnected in three dimensions). The pores can be microporous and/or mesoporous. The cathode comprises sulfur. The sulfur is confined in one or more of the pores of the porous carbon. The anode comprises anode material in electrical contact with the sodium ion-conducting electrolyte material. The sodium ion-conducting a liquid electrolyte comprises a liquid electrolyte solvent (e.g., carbonate(s), alkylpolyether(s), or a combination thereof), a liquid electrolyte salt, and an electrolyte additive. The electrolyte additive comprises an ionic liquid (cation) tethered (e.g., covalently bonded) to an organic or inorganic nanoparticle (also referred to herein as particle(s)). The ionic liquid (cation or anion) can be tethered (e.g., covalently, ionically, hydrogen bonded, or combination thereof) to the organic or inorganic nanoparticle via various linking moieties. At least a portion or all of the electrolyte additive forms a layered coating (e.g., monolayer) on at least a portion or all of the surface of the anode in contact with the liquid electrolyte.

The present disclosure provides devices. The devices comprise one or more battery (e.g., sodium ion-conducting battery, which may be rechargeable) of the present disclosure. In an example, the device is a battery pack (e.g., a homogenous or heterogeneous battery pack) comprising one or more cells comprising one or more battery (e.g., sodium ion-conducting battery, which may be rechargeable).

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
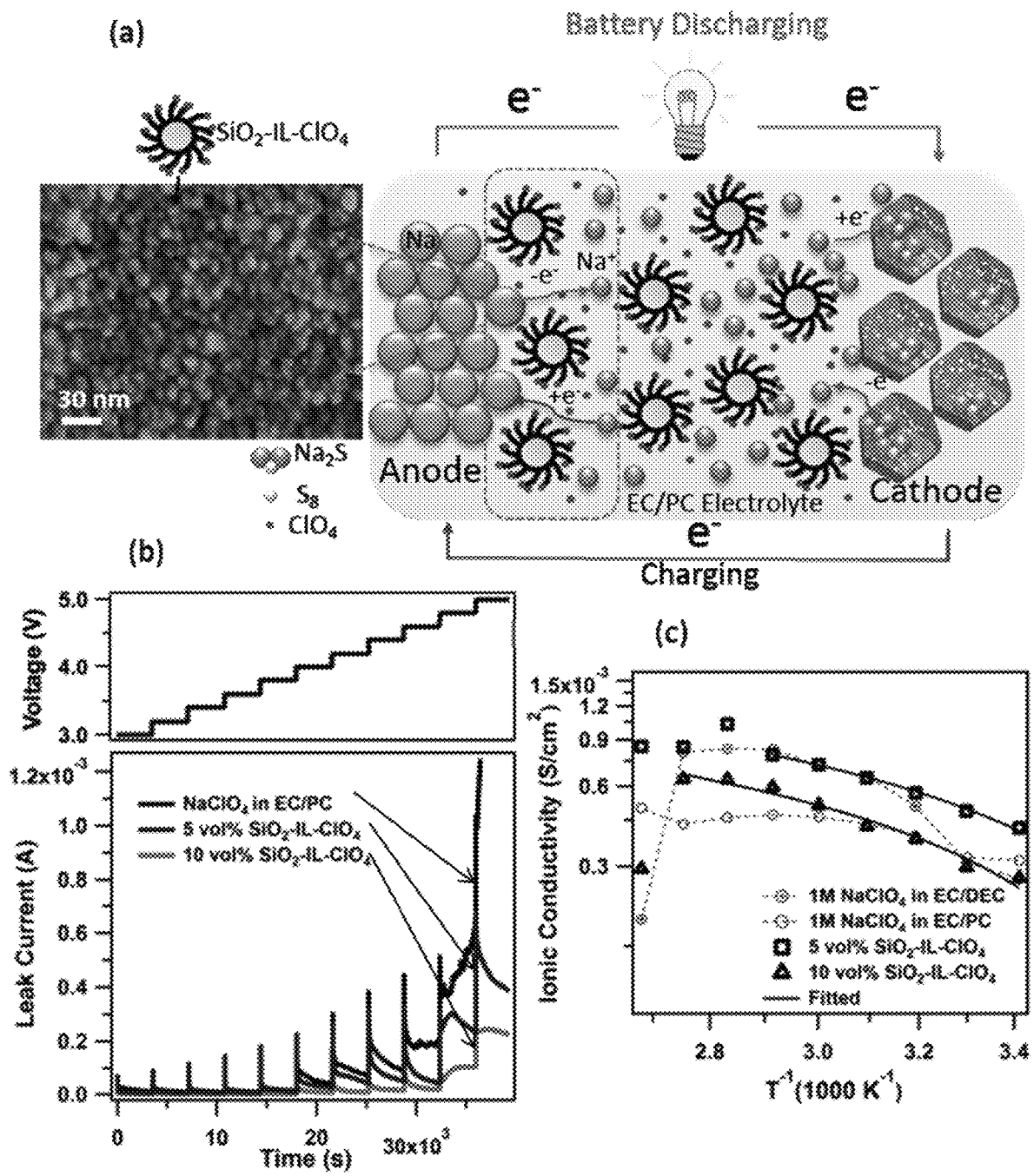
FIG. 1 shows a stable Na—S Cell. (a) Schematic drawing of a Na—S cell during galvanostatic cycling, using $SiO_2$-ILClO$_4$ as additive in 1M NaClO$_4$ in a mixture of ethylene carbonate and propylene carbonate (EC/PC) (v:v=1:1). On the anode side, sodium atom loses an electron to form sodium ion during discharge. The sodium ion diffuses inside the microporous carbon-sulfur composite (MCPS) and reacts with sulfur to form sodium sulfide ($Na_2S$) on the cathode side, and the reverse reaction took place during charging, where $SiO_2$-IL-ClO$_4$ helps stabilize sodium anode. The SEM image of the sodium metal surface cycled in a cell with 10 vol % of $SiO_2$-IL-ClO$_4$ in the electrolyte show for the first time that the particles form a conformal layer on the anode surface. (b) Constant voltage-charge profile of the Na—S cells with different volume fraction of $SiO_2$-IL-ClO$_4$ in the electrolyte mentioned in a maintained at 3.0, 3.2, 3.4, 3.6, 3.8, 4.0, 4.2, 4.4, 4.6, 4.8, and 5.0 V for 1 h (h=hour(s)) at room temperature. (c) Ionic conductivity of the Na—S cells with different volume fraction of $SiO_2$-IL-ClO$_4$ in the electrolyte as a function of temperature. EC/DEC represents a mixture of ethylene carbonate and diethyl carbonate (v:v=1:1). The solid lines are linear Vogel-Fulcher-Tammann (VFT) fits of the temperature dependent ionic conductivity.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

The present disclosure provides batteries (e.g., sodium-ion conducting batteries, which may be rechargeable sodium-ion conducting batteries). The present disclosure also provides devices comprising one or more battery (e.g., sodium-ion conducting battery) of the present disclosure.

In various examples, sodium-sulfur batteries/cells disclosed herein comprise solid-state composite sulfur cathodes and are able to operate reversibly at room temperature. The solid-state cathode design is a departure from the current art and delivers cells with long term charge-discharge cycling behaviors superior to any other room temperature sodium-sulfur batteries known in the art. These cells are enabled by, in various examples and combinations, effective strategies for protecting the Na anode using deposition stabilizers; by solid-state sulfur cathodes composed of sulfur infused into interconnected pores of a conductive substrate; and electrolytes that do not dissolve sulfur and its reduction products formed in the solid-state cathode during battery cycling.

In an aspect, the present disclosure provides sodium-ion conducting batteries. The batteries can be rechargeable batteries. The batteries comprise a cathode, an anode, and an ion-conducting electrolyte. The batteries conduct ions such as, for example, sodium ions. The batteries can have properties described in the examples provided herein.

In an example, the present disclosure provides a room-temperature, Na—S battery that uses, for example, a sodium metal anode, a solid-state porous carbon-sulfur composite cathode, and a liquid carbonate electrolyte containing the ionic liquid 1-methyl-3-propylimidazolium-chlorate tethered to $SiO_2$ nanoparticles ($SiO_2$-IL-$ClO_4$) as a deposition stabilizer. The Na—S cells can stably cycle for over 100 cycles at 0.5 C (1 C=1675 mAh/g) with 600 mAh/g reversible capacity and nearly 100 percent Coulombic efficiency. By means of spectroscopic and electrochemical analysis, it was found that the high stability and reversibility of the cells stem from at least two sources. First, $SiO_2$-IL-$ClO_4$ particles spontaneously form a Na-ion conductive film on the anode, which appears to stabilize deposition of sodium by the tethered anion effect. Second, on the cathode side, sulfur remains completely interred in the carbon pores and appears to undergo a solid-state electrochemical reaction with Na-ions inside the pores (e.g., micropores and/or mesopores).

A sodium ion-conducting battery of the present disclosure can comprise various combinations of cathode materials, liquid electrolyte (e.g., liquid electrolyte solvent(s) and/or liquid electrolyte salt(s)), and electrolyte additive(s). In various examples, a sodium-ion conducting battery (e.g., a rechargeable sodium-ion conducting battery) comprises (1) an porous host-sulfur solid-state composite cathode as described herein or (2) a liquid electrolyte comprising a liquid electrolyte solvent and a liquid electrolyte salt as described herein or (3) an electrolyte additive as described herein or a combination thereof.

In various examples, a sodium-ion conducting battery, which may be rechargeable) comprises: a sodium metal anode and one or more of the following: a porous host-sulfur composite cathode, for example, an interconnected microporous and/or mesoporous host-sulfur composite cathode (e.g., a porous carbon-sulfur composite cathode), a liquid electrolyte including a liquid electrolyte solvent and a liquid electrolyte salt, for example, where the liquid electrolyte solvent is selected from aliphatic carbonates (e.g., ethylene carbonate, propylene carbonate, vinyl carbonate, dimethyl carbonate, diethyl carbonate, ethylmethyl carbonate, fluorinated ethylene carbonate, or a combination thereof), alkylpolyethers (e.g., tetraglyme, diglyme, monoglyme, 1,3-dioxolane, ethylene glycol dimethyl ether, or a combination thereof) or a combination thereof, and, for example, where the liquid electrolyte salt is selected from the group consisting of sodium hexafluorophosphate ($NaPF_6$), sodium perchlorate ($NaClO_4$), bis (trifluoromethanesulfonyl) imide sodium (NaTFSI); sodium trifluoromethanesulfonate (NaFSI), sodium nitrite ($NaNO_3$), sodium halides (NaF, NaCl, NaBr, NaI), and combinations thereof, and an electrolyte additive including an ionic liquid (e.g., cation or anion) tethered (e.g., covalently bonded, ionically bonded, hydrogen bonded, or a combination thereof) to an organic or inorganic particle, for example, having a diameter of 2 nm to 500 nm (e.g., 2 nm to 500 nm or 10 nm to 50 nm), for example, where the ionic liquid includes a cation moiety selected from the group consisting of imidizolium ions (e.g., 1-methyl-3-propylimidazolium), ammonium, pyridinium, piperdinium, and pyrrolidinium, and, for example, where the ionic liquid includes an anion selected from group consisting of halide ions, perchlorate ions, hexafluorophosphate ions, and bis (trifluoromethanesulfonyl) imide, trifluoromethanesulfonate ions, for example, where the organic nanoparticle is a carbon nanoparticle or a polymer nanoparticle, for example, where the inorganic nanoparticle is silica, titania, alumina, zirconium dioxide, calcium peroxide, or a combination thereof, and, for example, where the electrolyte additive is present at 5% to 30% (e.g., 5% to 20%) volume fraction of the liquid electrolyte.

The cathode comprises cathode material (e.g., porous host-sulfur composite material such as, for example, interconnected microporous and/or mesoporous host-sulfur composite material) in electrical contact with the sodium ion-conducting electrolyte material. The cathode material is disposed in electrical contact with at least a portion of the sodium ion-conducting electrolyte material. For example, the cathode material is a sodium ion-conducting material that stores ions by mechanisms such as intercalation or reacts with the ion to form a secondary phase (e.g., an air or sulfide electrode).

The porous (e.g., microporous and/or mesoporous host) can comprise various materials. A porous host has a porous structure and is electrically conductive. For example, a microporous host has a microporous structure and is electrically conductive. In various examples, a porous host (e.g., a microporous and/or mesoporous host) has an electrical conductivity of at least 5 mS/cm, at least 10 mS/cm, or at least 20 mS/cm, including all integer mS/cm values and ranges therebetweeen. Examples of suitable materials include, but are not limited to, microporous and/or mesoporous carbon materials, microporous and/or mesoporous polymers (e.g., conducing polymers such as, for example, polypyyrrole, polythiophene, polyaniline, polyacetylene, polyimide, polyethyleneimine, polyacrylonitrile, and analogs (e.g., substituted analogs) thereof), microporous and/or mesoporous metal-organic frameworks (e.g., HKUST, MIL, metal organic frameworks (MOFs)), microporous metals (e.g., Ti, Al, In, Cu, Fe, Zn, Sn, Ni, Zr, Mn, CuTi, and Ag), microporous and/or mesoporous metal oxides (e.g., iron oxides, titanium dioxides, tin oxide, ruthenium oxide, and zinc oxide), microporous and/or mesoporous ceramic materials (e.g., silicon carbide and titanium carbides), microporous and/or mesoporous molecular sieve materials, microporous and/or mesoporous metal sulfides (e.g., $TiS_2$, $SnS_2$, $FeS_2$, $CoS_2$, $NiS_2$, $SeS_2$, and $Sb_2S_3$), and microporous and/or mesoporous zeolites. In various examples, the porous (e.g., microporous and/or mesoporous) host consists essentially of or consists of these materials. In an example, the cathode and/or microporous and/or mesoporous host material does not contain carbon nanotubes.

The porous cathode host material has continuous, interconnected pores (e.g., pores interconnected in three dimensions). The pores can be microporous and/or mesoporous. The pores can be regularly shaped and regularly oriented pores. The pore size distribution can be homogeneous or heterogeneous. The pore structure can be tortuous, but, in various examples, contains no more than 10% pores or no more than 20% pores with dead ends. The pore structure may be straight or tapered. The pores can have a diameter (e.g., longest dimension perpendicular to the axis of the pores or longest dimension of the pore opening) of 0.1 nm to 20 nm, including all 0.1 nm values and ranges there between. In various examples, the pores have a diameter (e.g., longest dimension perpendicular to the axis of the pores or longest dimension of the pore opening) of 0.1 nm to 5 nm or 0.1 nm to 2 nm). The host can have a pore volume of 0.2 $cm^3$/g to 3 $cm^3$/g, including all 0.1 $cm^3$/g values and ranges therebetween (e.g., 0.4 to 1.5 $cm^3$/g). The porous host can have surface area of, for example, 200 to 3000 $m^2$/g, including all integer $m^2$/g values and ranges therebetween (e.g., 800 to 2000 $m^2$/g).

Porous (e.g., microporous and/or mesoporous) host materials can be made by, in various examples, solid-state, sol-gel, or electrochemical reactions. The porous host materials may comprise individual nanoparticulates fused together by a conductive material that may be of a different composition and/or chemistry of the particulates. Solid-state, sol-gel, or electrochemical reactions can provide porous materials having desirable pore characteristics (e.g., pore structure, pore size, pore morphology, or a combination thereof).

It is desirable that the porous host has pores having a pore diameter of 20 nm or less so that the pores can be filled or partially filled with sulfur and prevent access of electrolyte to the pores. Without intending to be bound by any particular theory, it is considered that microporous and/or mesoporous hosts show a reversible solid-state electrochemical reaction pathway compared to the previous composite sulfur cathodes.

In an example, the cathode comprises or is a porous carbon-sulfur composite electrode. The porous carbon can have regularly shaped and regularly oriented pores. The pores can have various morphology. For example, the pores have a rhombic dodecahedral shape. For example, the porous carbon has pores having a diameter of 0.1 nm to 20 nm, including all 0.1 nm values and ranges therebetween, (e.g., 0.1 to 10 or 0.1 nm to 2 nm) and/or the porous carbon has a pore volume of 0.25 $cm^3$/g to 5 $cm^3$/g, including all 0.01 $cm^3$/g values and ranges therebetween, (e.g., 0.4 $cm^3$/g to 1.5 $cm^3$/g) and/or a surface area of 200 $m^2$/g to 2,000 $m^2$/g, including all integer $m^2$/g values and ranges therebetween, (e.g., 800 $m^2$/g to 2,000 $m^2$/g). The sulfur is elemental sulfur (e.g., $S_8$). The elemental sulfur can be confined in one or more of the pores of the porous carbon. The sulfur can be vapor infused into the porous carbon and well dispersed inside the porous (e.g., microporous and/or mesoporous) carbon. For example, the sulfur is present at 40% by weight to 90% by weight, including all integer % by weight values and ranges therebetween, (e.g., 40% by weight to 70% by weight) based on the weight of the carbon-sulfur composite.

The conductivity of the porous carbon-sulfur composite can be $5*10^{-3}$ S/cm or greater. The porous carbon can contain more graphitic carbon than disordered carbon thereby providing desirable conductivity. For example, the ratio of graphitic carbon/disordered carbon is 0.4-1.5, including all 0.1 ratio values and ranges therebetween. In another example, the ratio of graphitic carbon/disordered carbon is 0.6-1.2. The relative amounts of graphitic carbon and disordered carbon can be determined by methods known in the art. In an example, the relative amounts of graphitic carbon and disordered carbon can be determined based on the ratio between the peak intensity the graphitic carbon and disordered carbon in the Raman spectrum of the porous carbon material.

The porous carbon can be made by carbonization of metal-organic framework (e.g., ZIF, MIL) or other carbon precursors (e.g., glucose, sucrose, and polyacronitrile). Accordingly, in an example, the porous-carbon is made by carbonization of metal-organic framework or other carbon precursor.

In an example, the cathode material comprises porous carbon. In another example, the cathode material is porous carbon. The porous carbon can have regularly shaped and regularly oriented pores having a diameter of 0.1 nm to 2 nm, where the porous carbon has a pore volume of, for example, 0.2 to 3 $cm^3$/g (e.g., 0.4 to 1.5 $cm^3$/g) and/or surface area of, for example, 200 to 3000 $m^2$/g (e.g., 800 to 2000 $m^2$/g). The microporous and/or mesoporous carbon (e.g., individual carbon nanoparticulates) can have a columnar, spherical or rhombic dodechedral shape, or a combination thereof. For example, the porous carbon is made by carbonization of metal-organic framework (e.g., ZIF, MIL) or other carbon precursors (e.g., glucose, sucrose, and polyacronitrile).

In an example, the porous carbon material is synthesized by carbonizing a well patterned ZIF-8. Well patterned ZIF-8 has uniform rhombic dodecahedral shape and also the micropores are well and uniform distributed through the material. In the synthesis of ZIF-8, the ratio between the ligand (e.g., 2-methylimidazole), metal (e.g., $ZnNO_3.6H_2O$) and coordination molecule (e.g., 1-methylimidazole) can be important. Additionally, how to mix these starting material can also be important.

In an example, ZIF-8 was synthesized as follows. 734 mg of $Zn(NO_3)_2.6H_2O$ (e.g., ≥99%, available from Sigma-Aldrich) was dissolved in 50 mL of methanol (MeOH, e.g., anhydrous, 99.8%, available from Sigma-Aldrich). Then another solution was prepared by dissolving 810 mg of 2-methylimidazole (e.g., 99%, available from Sigma-Aldrich) and 405 mg of 1-methylimidazole (e.g., ≥99%, available from Sigma-Aldrich) in 50 mL of MeOH. The later solution was poured into the former one under magnetic stirring. Stirring was stopped once the two solutions were combined. After keeping static for 24 hours at room temperature, the precipitate was collected by centrifugation, washed with ethanol and then dried at 70 degree overnight. The carbonization of the ZIF-8 polyhedrons was carried out in $N_2$ flow. The ZIF-8 sample was first heated up to 150 degrees (heating rate: 1° C./minute) and kept for 2 hours, and then further heated up to 1000° C. (heating rate: 2° C./minute) and maintained for 8 hours.

The porous host can be formed by methods such as, for example, etching, electrodeposition, templating, thermal treatment, laser annealing, solvent-nonsolvent, induced porosity, sintering of nanoparticulates, or combinations of these approaches. Examples of microporous host materials can be made by methods known in the art. Examples of microporous materials are commercially available.

The cathode comprises sulfur. The sulfur can be elemental sulfur (e.g., $S_8$). The sulfur is confined in one or more of the pores of the porous carbon. In various examples, the sulfur is present at 30% to 80%, 35% to 80%, 40% to 80%, 45% to 80%, or 50% to 80% by weight based on the weight of the carbon-sulfur composite.

Sulfur can be incorporated into a cathode (e.g., a porous host such as, for example, a microporous and/or mesoporous host) by various methods. In an example, the sulfur is vapor infused into the porous carbon allowed it to be interred inside pores of (e.g., the entire range of pores) of the host material (e.g., in the pores of a regular or heterogeneous porous carbon host material). In another example, sulfur is solution infused in the cathode material (e.g., sulfur is dissolved in solvent (e.g., $CS_2$ at elevated temperature) and porous host material is dispersed into the solution. In another example, a blend of host material and sulfur is subjected to microwave heating or thermal treatment.

Without intending to be bound by any particular theory, it is considered that $Na^+$ diffuses into the composite cathode material during battery operation and can participate in a solid-state electrochemical reaction with the sulfur material hosted in the pores. In various examples, during discharge of a battery (e.g., a rechargeable battery), which may have a liquid electrolyte comprising one or more carbonate and/or one or more alkylpolyether, the sulfur undergoes a reversible solid-state reaction to form insoluble sulfides (e.g., $Na_2S_2$/$Na_2S$) and/or the reaction does not form soluble polysulfides.

The anode comprises anode material in electrical contact with the sodium ion-conducting electrolyte material. For example, the anode material is the metallic form of the ion conducted in the solid-state electrolyte (e.g., metallic sodium for a sodium-ion battery). For example, the anode is a sodium metal anode.

The sodium ion-conducting a liquid electrolyte comprises a liquid electrolyte solvent, a liquid electrolyte salt, and an electrolyte additive. The liquid electrolyte solvent can be selected from aliphatic carbonates (e.g., ethylene carbonate, propylene carbonate, vinyl carbonate, dimethyl carbonate, diethyl carbonate, ethylmethyl carbonate, fluorinated ethylene carbonate, and combinations thereof), alkylpolyethers (e.g., tetraglyme, diglyme, monoglyme, 1,3-dioxolane, ethylene glycol dimethyl ether, and combinations thereof), and combinations thereof. The liquid electrolyte salt can be a sodium salt. For example, a sodium salt is selected from the group consisting of sodium hexafluorophosphate ($NaPF_6$), sodium perchlorate ($NaClO_4$), bis (trifluoromethanesulfonyl) imide sodium (NaTFSI), and combinations thereof.

The electrolyte additive comprises an ionic liquid (cation) tethered (e.g., covalently bonded, ionically bonded, hydrogen bonded, or a combination thereof) to an organic or inorganic nanoparticle (also referred to herein as particle(s)). For example, the nanoparticle having a diameter of 2 nm to 100 nm, including all integer nm values and ranges therebetween. The electrolyte additive can be present at 5% to 20% volume fraction, including all integer % volume fraction values therebetween. The volume of the additive is considered as the core volume (silica).

The ionic liquid can comprise a cation moiety or moieties selected from the group consisting of imidazolium ions (e.g., 1-methyl-3-propylimidazolium), ammonium ions, pyridinium ions, piperidinium ion, pyrrolidinium ions, and combinations thereof. The electrolyte additive comprises anions (counter ions). The anions can be selected from group consisting of halide ions, perchlorate ions, hexafluorophosphate ions, and bis (trifluoromethanesulfonyl) imide ions, and combinations thereof.

The nanoparticle can be an organic nanoparticle (e.g., a carbon nanoparticle or an organic polymer nanoparticle). The nanoparticle also can be an inorganic nanoparticle. Examples of inorganic nanoparticles include, but are not limited to, silica, titania, alumina, zirconium dioxide, calcium peroxide nanoparticles, and combinations thereof.

The ionic liquid (cation or anion) can be tethered (e.g., covalently, ionically, hydrogen bonded, or combination thereof) to the organic or inorganic nanoparticle via various linking moieties. For example, the ionic liquid (cation or anion) can be tethered (e.g., covalently bonded) to the organic or inorganic nanoparticle via a linking moiety comprising an alkylene moiety having 1 to 3 carbons (e.g., —$(CH_2)_n$—, where n is 1, 2, or 3). In other examples, linking moieties comprise one or more thioether moieties, amine moieties, ether moieties, or charged analogs thereof. It is desirable that the electrolyte additive (e.g., the nanoparticle, tethering group, and ionic liquid) is chemically stable under the battery operating conditions.

The ionic liquid (cation or anion) can be tethered (e.g., covalently bonded, ionically, or hydrogen bonded) to the organic or inorganic nanoparticle via various chemical strategies. For example, thiolchemistry and ion-exchange chemistry can be used. Suitable chemical strategies are known in the art. In various examples, ionic liquid (cation or anion) is tethered (e.g., covalently bonded) to the organic or inorganic nanoparticle bearing groups that react with those present on the particles using chemistries/methodologies known in the art (e.g. acid-base, thiol linking chemistry, silane chemistry, halide exchange, amine-epoxide/isocyanate/aldehyde, hydroxyl group, or combinations thereof). In an example, ionic liquid (cation) is tethered (e.g., covalently bonded) to the organic or inorganic nanoparticle by reaction of silane coupling of silanol groups on the particles with hydrolysable alkoxy silanes coupled to a an immidasolium salt. Exchange of the native halide anion with a TFSI or $ClO^{4-}$ anion produces nanoparticle electrolyte additives that selectively adsorb on the Na anode, protecting the anode against dendrite formation and side reactions with liquid electrolyte.

For example, the tethered ionic liquid is formed as shown in the following:

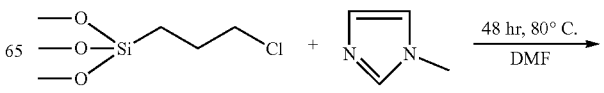

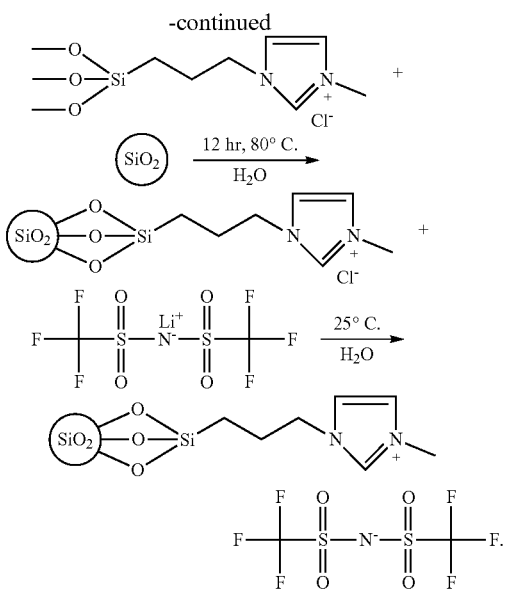

In various examples, amino silica is formed by reacting silica nanoparticles with excess 3-aminopropyltrimethosysilane in, for example, water or anhydrous toluene for 24 hours at room temperature under argon. Amino silica can be tethered to an ionic liquid (e.g., an ionic liquid cation or anion) having, for example, an isocyanate, sulfonylchloride, acid chloride, epoxy, aldehydes, halides, and other mutually reactive functional groups.

Various amounts of electrolyte additive can be used. In an example, the volume fraction of the electrolyte additive is 1%-50% volume fraction based on the volume of liquid electrolyte solvent, including all integer % volume fraction values and ranges therebetween. In another example, the volume fraction of electrolyte additive is 5-20%. It is desirable electrolyte additive is suspended in the electrolyte and no electrolyte additive aggregates are observed. Aggregates can be observed by methods known in the art. For example, aggregates are observed by microscopy methods such as, for example, scanning electron microscopy or transmission electron microscopy.

At least a portion or all of the electrolyte additive forms a layered coating (e.g., monolayer) disposed on at least a portion or all of the surface of the anode in contact with the liquid electrolyte. The layered coating can be referred to as an SEI layer. In an example, the layered coating of electrolyte comprises 1 to 50 layers of electrolyte additive, including all integer number of layers and ranges therebetween. In another example, the layered coating of electrolyte comprises 1 to 5 layers of electrolyte additive. In various examples, a battery of the present disclosure comprising an electrolyte additive exhibits one or more of the following: contact thermal side reactions with the electrolyte, parasitic thermal side reactions with the electrolyte, contact electrochemical side reactions with the electrolyte, and parasitic electrochemical side reactions with the electrolyte.

Without intending to be bound by any particular theory, it is considered that the layered coating of electrolyte protects the anode by preventing loss of intermediate sodium polysulfides (NaPS) species to the electrolyte. Loss of intermediate sodium polysulfides (NaPS) species to the electrolyte can result in undesirable battery performance. In an example, there are no detectible polysulfide species in the electrolyte of the battery after 400 or more hours of operation and/or 200 or more cycles. In various examples, there are no detectible polysulfide species in the electrolyte of the battery after 500, 750, or 1,000 or more hours of operation and/or 300, 400, 500, 750, or 1,000 or more cycles. Polysulfide species can be detected by methods known in the art. In various examples, polysulfide species are detected by UV-vis spectroscopy in an electrolyte or EDS, STEM image, or DEX mapping in a sodium metal anode or XPS, NMR analysis for the cathode.

An ion conducting battery can have various electrolyte to sulfur ratios. In an example, the electrolyte to sulfur ratio is 2 μl/mg to 200 μl/mg, including all 0.1 μl/mg ratio values and ranges therebetween. In an example, the ratio of electrolyte to sulfur is 10 μl/mg to 50 μl/mg. An ion conducting battery can have various sodium salt concentrations in the electrolyte. In an example, the sodium salt concentration in the electrolyte is 0.5 M to 2M, including all 0.1 M values and ranges therebetween. In an example, the electrolyte to sulfur ratio is 2 to 200 μl/mg and the sodium salt concentration in the electrolyte is 0.5 M to 2M.

A sodium ion-conducting battery of the present disclosure can have desirable properties. In various examples, a sodium ion-conducting battery of the present disclosure has one or more of the following properties: an operating temperature of 0-70° C., including all integer ° C. values and ranges therebetween, an operating voltage of 0.6-3V, including all 0.1 V values and ranges therebetween, (e.g., 0.6-2.6V), and operating current density of less than 5 C (e.g., 0.1 C-2 C) (wherein 1 C is 1675 mA/g based on sulfur). In various examples, a sodium ion-conducting battery of the present disclosure has one or more of the following properties: an operating temperature of 18-25° C., an operating voltage of 0.6-3V (e.g., 0.6-2.6V), and operating current density of less than 5 C (e.g., 0.1 C-2 C) (wherein 1 C is 1675 mA/g based on sulfur). In an example, a sodium ion-conducting battery of the present disclosure can maintain a capacity of 600 mAh/g reversible capacity for at least 100 cycles at a C rate of 0.5 C.

The sodium ion-conducting batteries may comprise various additional structural components such as bipolar plates, external packaging, and electrical contacts/leads to connect wires. The battery can further comprise bipolar plates. The battery can further comprise bipolar plates and external packaging, and electrical contacts/leads to connect wires. Repeat battery cell units can be separated by a bipolar plate.

The cathode material (if present), the anode material (if present), the electrolyte, the cathode-side (first) current collector (if present), and the anode-side (second) current collector (if present) may form a cell. In this case, the solid-state, sodium ion-conducting battery comprises a plurality of cells separated by one or more bipolar plates. The number of cells in the battery is determined by the performance requirements (e.g., voltage output) of the battery and is limited only by fabrication constraints. For example, the ion-conducting battery comprises 1 to 500 cells, including all integer number of cells and ranges therebetween.

For example, a sodium ion-conducting, solid-state battery or battery cell has one planar cathode and/or anode—electrolyte interface or no planar cathode and/or anode—electrolyte interfaces. For example, the battery or battery cell does not exhibit solid electrolyte interphase (SEI).

In an aspect, the present disclosure provides devices. The devices comprise one or more of the present disclosure.

In an example, the device is a battery pack comprising one or more cells comprising one or more sodium ion-conducting battery. In an example, the battery pack is homogeneous cell pack where all the cells are made of sodium-sulfur batteries. In another example, the battery pack is a heterogeneous cell pack comprising one or more sodium-sulfur batteries and one or more other types of cells such as, for example, high-voltage lithium ion batteries or sodium-ion batteries other than those of the present disclosure.

The following Statements provide various examples of the batteries and devices of the present disclosure:

Statement 1) A battery (e.g., a sodium-sulfur battery, which may be rechargeable) comprising: a) a sodium metal anode; b) a cathode comprising a microporous and/or mesoporous host-sulfur composite material (e.g., where the microporous and/or mesoporous host has regularly shaped and regularly oriented pores and/or a diameter of 0.1 nm to 20 nm and/or the pore structure is interconnected and tortuous); c) a liquid electrolyte comprising a liquid electrolyte solvent and a liquid electrolyte sodium salt (e.g., where the liquid electrolyte solvent is selected from the group consisting of aliphatic carbonates, alkylpolyethers, and combinations thereof); and d) an electrolyte additive comprising an ionic liquid tethered to an organic or inorganic nanoparticle.

Statement 2) A battery (e.g., a sodium-sulfur battery, which may be rechargeable) according to Statement 1, where the microporous and/or mesoporous host is selected from (or comprises a material selected from) the group consisting of microporous and/or mesoporous carbon materials (e.g., microporous and/or mesoporous carbon), microporous and/or mesoporous polymers, microporous and/or mesoporous metal-organic frameworks, microporous and/or mesoporous metals, microporous and/or mesoporous metal oxides, microporous and/or mesoporous ceramic materials, microporous and/or mesoporous molecular sieves, and microporous and/or mesoporous metal sulfides.

Statement 3) A battery (e.g., a sodium-sulfur battery, which may be rechargeable) according to Statement 1 or 2, where the microporous and/or mesoporous host has a pore volume of 0.2 to 3 $cm^3/g$ and/or a surface area of 200 to 3000 $m^2/g$.

Statement 4) A battery (e.g., a sodium-sulfur battery, which may be rechargeable) according to any one of the preceding Statements, where the sulfur is elemental sulfur and the elemental sulfur is confined in one or more of the pores of the microporous and/or mesoporous host and/or the sulfur is present at 30% to 80%, 35% to 80%, 40% to 80%, 45% to 80%, or 50% to 80% by weight based on the weight of the microporous and/or mesoporous host-sulfur composite material.

Statement 5) A battery (e.g., a sodium-sulfur battery, which may be rechargeable) according to any one of the preceding Statements, where the microporous and/or mesoporous host-sulfur composite electrode is a microporous and/or mesoporous carbon-sulfur composite cathode (e.g., where the microporous and/or mesoporous carbon has regularly shaped and regularly oriented pores having a diameter of 0.1 nm to 20 nm.)

Statement 6) A battery (e.g., a sodium-sulfur battery, which may be rechargeable) according to Statement 5, where the microporous and/or mesoporous carbon has a pore volume of 0.2 to 3 $cm^3/g$ and/or a surface area of 200 to 3000 $m^2/g$.

Statement 7) A battery (e.g., a sodium-sulfur battery, which may be rechargeable) according to any one of Statements 5 or 6, where the microporous and/or mesoporous carbon comprises primary particles having a rhombic dodecahedral shape.

Statement 8) A battery (e.g., a sodium-sulfur battery, which may be rechargeable) according to any one of Statements 5-7, where the microporous and/or mesoporous carbon-sulfur composite cathode comprises a porous carbon-sulfur composite having a conductivity of above $5*10^{-3}$ S/cm.

Statement 9) A battery (e.g., a sodium-sulfur battery, which may be rechargeable) according to any one of Statements 5-8, where the microporous and/or mesoporous carbon contains more graphitic carbon than disordered carbon.

Statement 10) A battery (e.g., a sodium-sulfur battery, which may be rechargeable) according to any one of Statements 5-9, where the microporous and/or mesoporous carbon of the microporous and/or mesoporous carbon-sulfur composite electrode is made by carbonization of metal-organic framework (e.g., ZIF, MIL) or carbon precursors (e.g., carbon precursors selected from the group consisting of carbohydrates and organic polymers).

Statement 11) A battery (e.g., a sodium-sulfur battery, which may be rechargeable) according to any one of the preceding Statements, where the sulfur is vapor infused into the pores of the microporous and/or mesoporous carbon.

Statement 12) A battery (e.g., a sodium-sulfur battery, which may be rechargeable) according to any one of the preceding Statements, where the carbonate is selected from the group consisting of ethylene carbonate, propylene carbonate, vinyl carbonate, dimethyl carbonate, diethyl carbonate, ethylmethyl carbonate, fluorinated ethylene carbonate, and combinations thereof.

Statement 13) A battery (e.g., a sodium-sulfur battery, which may be rechargeable) according to any one of the preceding Statements, where the alkylpolyether is selected from the group consisting of tetraglyme, dyglyme, monoglyme, 1,3-dioxolane, ethylene glycol dimethyl ether, and combinations thereof.

Statement 14) A battery (e.g., a sodium-sulfur battery, which may be rechargeable) according to any one of the preceding Statements, where the liquid electrolyte sodium salt is selected from the group consisting of sodium hexafluorophosphate, sodium perchlorate, bis (trifluoromethanesulfonyl) imide sodium, sodium trifluoromethanesulfonate, sodium nitrite ($NaNO_3$), sodium fluoride, sodium chloride, sodium bromide, sodium iodide, and combinations thereof.

Statement 15) A battery (e.g., a sodium-sulfur battery, which may be rechargeable) according to any one of the preceding Statements, where the nanoparticle has a diameter of 2 nm to 500 nm.

Statement 16) A battery (e.g., a sodium-sulfur battery, which may be rechargeable) according to any one of the preceding Statements, where the ionic liquid comprise a cation moiety selected from the group consisting of imidizolium ions, ammonium, pyridinium, piperdinium, and pyrrolidinium and/or the ionic liquid comprises an anion selected from group consisting of halide ions, perchlorate ions, hexafluorophosphate ions, and bis (trifluoromethanesulfonyl) imide, trifluoromethanesulfonate ions.

Statement 17) A battery (e.g., a sodium-sulfur battery, which may be rechargeable) according to any one of the preceding Statements, where the electrolyte additive is present at 5% to 30% volume fraction with respect to the volume of the liquid electrolyte.

Statement 18) A battery (e.g., a sodium-sulfur battery, which may be rechargeable) according to any one of the preceding Statements, wherein the cation of the ionic liquid is tethered to an organic or inorganic nanoparticle.

Statement 19) A battery (e.g., a sodium-sulfur battery, which may be rechargeable) according to any one of the preceding Statements, wherein the organic nanoparticle is a carbon nanoparticle or a polymer nanoparticle.

Statement 20) A battery (e.g., a sodium-sulfur battery, which may be rechargeable) according to any one of the preceding Statements, wherein the inorganic particle is a silica nanoparticle, titania nanoparticle, alumina nanoparticle, zirconium dioxide nanoparticle, or calcium peroxide nanoparticle.

Statement 21) A battery (e.g., a sodium-sulfur battery, which may be rechargeable) according to any one of the preceding Statements, wherein the ionic liquid cation is tethered to an organic or inorganic particle via an alkylene moiety comprising 3 to 10 carbons.

Statement 22) A battery (e.g., a sodium-sulfur battery, which may be rechargeable) according to any one of the preceding Statements, wherein the at least a portion or all of the electrolyte additive forms a layered coating comprising 1 to 50 layers of the electrolyte additive disposed on at least a portion or all of the surface of the anode in contact with the liquid electrolyte.

Statement 23) A battery (e.g., a sodium-sulfur battery, which may be rechargeable) according to any one of the preceding Statements, where during discharge of the battery the sulfur undergoes a reversible solid-state reaction to form insoluble sulfides (e.g., $Na_2S_2/Na_2S$) and/or the reaction does not form soluble polysulfides.

Statement 24) A device comprising one or more battery (e.g., a sodium-sulfur battery, which may be rechargeable) of any one of the preceding Statements.

Statement 25) A device according to Statement 24, where the device is a battery pack (e.g., where the battery back is a homogeneous battery pack or a heterogeneous battery pack.

The following is an example of the present disclosure. The example is not intended to be limiting in any manner.

EXAMPLE 1

This example describes the fabrication of a stable RT rechargeable Na—S battery of the present disclosure.

In order to construct a RT rechargeable Na—S battery, a conductive cathode substrate able to overcome the electronically insulating nature of both the fully charged and discharged products (S and $Na_2S$) is required for high active material utilization. In order to maintain stable cell performance, the substrate must also be able to prevent loss of the intermediate sodium polysulfides (NaPS) species to the electrolyte.

A stable RT rechargeable Na—S battery (FIG. 1a) is described that overcomes challenges associated with such batteries. The battery utilizes a Na metal anode, a metal-organic framework-derived microporous carbon polyhedron-sulfur composite (MCPS) cathode, and a liquid electrolyte comprised of a 1:1 mixture of ethylene carbonate (EC) and propylene carbonate (PC) containing 1M $NaClO_4$ salt and 1-methyl-3-propylimidazolium-chlorate ionic liquid tethered silica nanoparticle ($SiO_2$-IL-$ClO_4$) additives as an agent for stabilizing electrodeposition. Na—S cells with this design are shown to achieve desirable cycling performance with nearly 100% Coulombic efficiency at higher current density and with relatively high sulfur loadings in the cathode. Reversible storage capacities of over 860 mAh/g at 0.1 C (1 C=1675 mA/g) and 600 mAh/g at 0.5 C based on active sulfur mass are described. Even at the higher current density (0.5 C) the batteries are able to cycle stably for over 100 cycles with 0.31% capacity decay per cycle. The fundamental origins of the desirable performance of the constructed Na—S cells are studied using spectroscopic tools and analysis to understand the electrochemistry at the cathode upon sodiation and desodiation processes. Notably, we find that no soluble NaPS species are formed and that the diffusivity of $Na^+$ into the composite cathode is consistent with expectations for solid-state transport. Together, these results indicate that the Na—S cells follow a different electrochemical reaction mechanism compared to traditional metal-sulfur batteries, which likely contributes to the stability and high capacity retention upon cycling.

Figure 7:
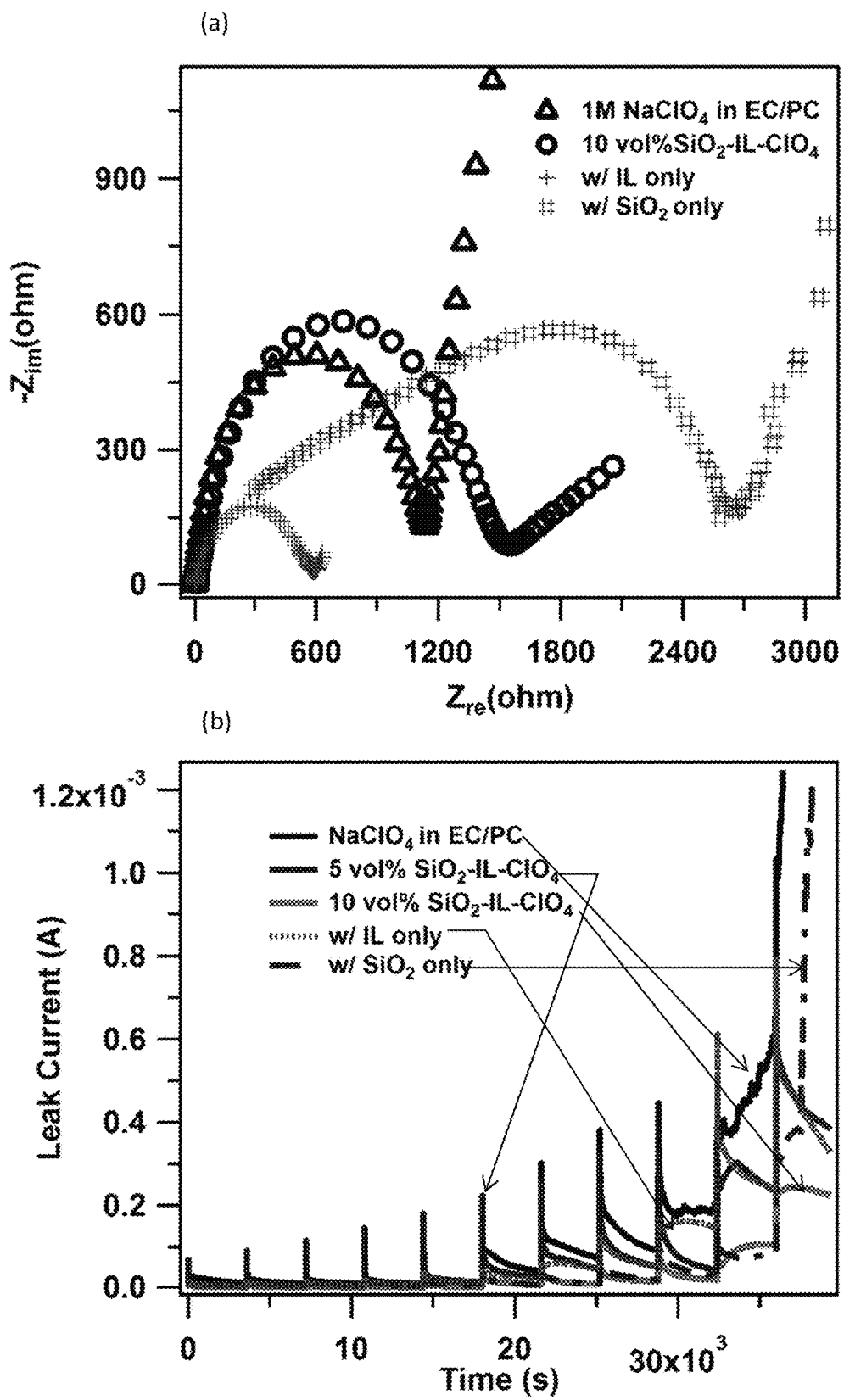
FIG. 7 shows (a) Impedance spectra and (b) floating test of the Na—S cells with different electrolyte additives. The black triangles in the Nyquist plot correspond to the Na—S cell in 80 μl 1M $NaClO_4$ in EC/PC, whereas the data represented by black circles are for the corresponding cell with 10 vol % of $SiO_2$-IL-$ClO_4$ in the electrolyte mentioned above. The plus and number signs represent electrolytes containing IL and silica that are equivalent amounts of 10 vol % of $SiO_2$-IL-$ClO_4$ in the electrolyte respectively. The case with only $SiO_2$ shows a large increase in interfacial resistance, indicating the formation of a physical barrier, while the case with only IL decreases the interfacial resistance a lot, resulting from the high conductivity of the IL. (b) cell with IL or $SiO_2$ only as the electrolyte additive shows improved stability compared to the cell with no additive, but both of them are not as good as the cell with $SiO_2$-IL-$ClO_4$ as the additive.

The $SiO_2$-IL-$ClO_4$ particle additives in the electrolyte play a significant role in ensuring stable cell performance during the recharge cycle. To understand the role played by the particle additive, an electrochemical floating test was performed in the potential range from 3.0 V to 5.0 V. As shown in FIG. 1b, electrolytes without particles exhibit an increase of current as the potential increases and display an unstable time-dependent current response when the potential reaches 4 V. In contrast, electrolytes containing $SiO_2$-IL-$ClO_4$ particle additives exhibit much lower leakage current and are stable at least up to 4.5 V. We conclude these effects stem from the same source—immobilization of a fraction of anions near the anode during cell recharge—as reported in previous lithium electrodeposition studies, where similar $SiO_2$-IL-TFSI particles were shown to provide orders of magnitude enhancements in the stability of lithium deposition in a PC-1M LiTFSI electrolyte. FIG. 1c describes the ionic conductivity as a function of temperature for EC/PC 1M $NaClO_4$ electrolytes containing different concentrations of $SiO_2$-IL-$ClO_4$ particles. The measurements were performed using coin cells with a Na metal electrode. It can be seen that the particles stabilize the ionic conductivities of the electrolytes, particularly at intermediate temperatures. Cells with 10 vol % particles in the electrolyte exhibit stable bulk ion transport until just below the melting point of Na metal (97.72° C.). In contrast, control cells with no particles present in the electrolyte exhibit irregular changes in conductivity with temperature, suggesting less stability. A scanning electron micrograph in FIG. 1a of the sodium metal surface harvested from a cell in which 10 nm $SiO_2$-IL-$ClO_4$ particles were present in the electrolyte. It is obvious from the figure that the particles form a dense monolayer on the Na-metal surface, which we believe is the fundamental source of the enhanced electrochemical and thermal stability. Based on these observations, we believe that $SiO_2$-IL-$ClO_4$ additive could play two roles in stabilizing the cell: (i) the tethered ionic liquid forms a mechanically robust and chemically stable SEI layer on the surface of sodium metal, which limits contact and parasitic thermal and electrochemical side reactions with the electrolyte; (ii) the silica particles serve as anchor points for $ClO_4^-$ anions, which reduce the electric field through the tethered anion effect discussed previously (FIG. 7).

Figure 2:
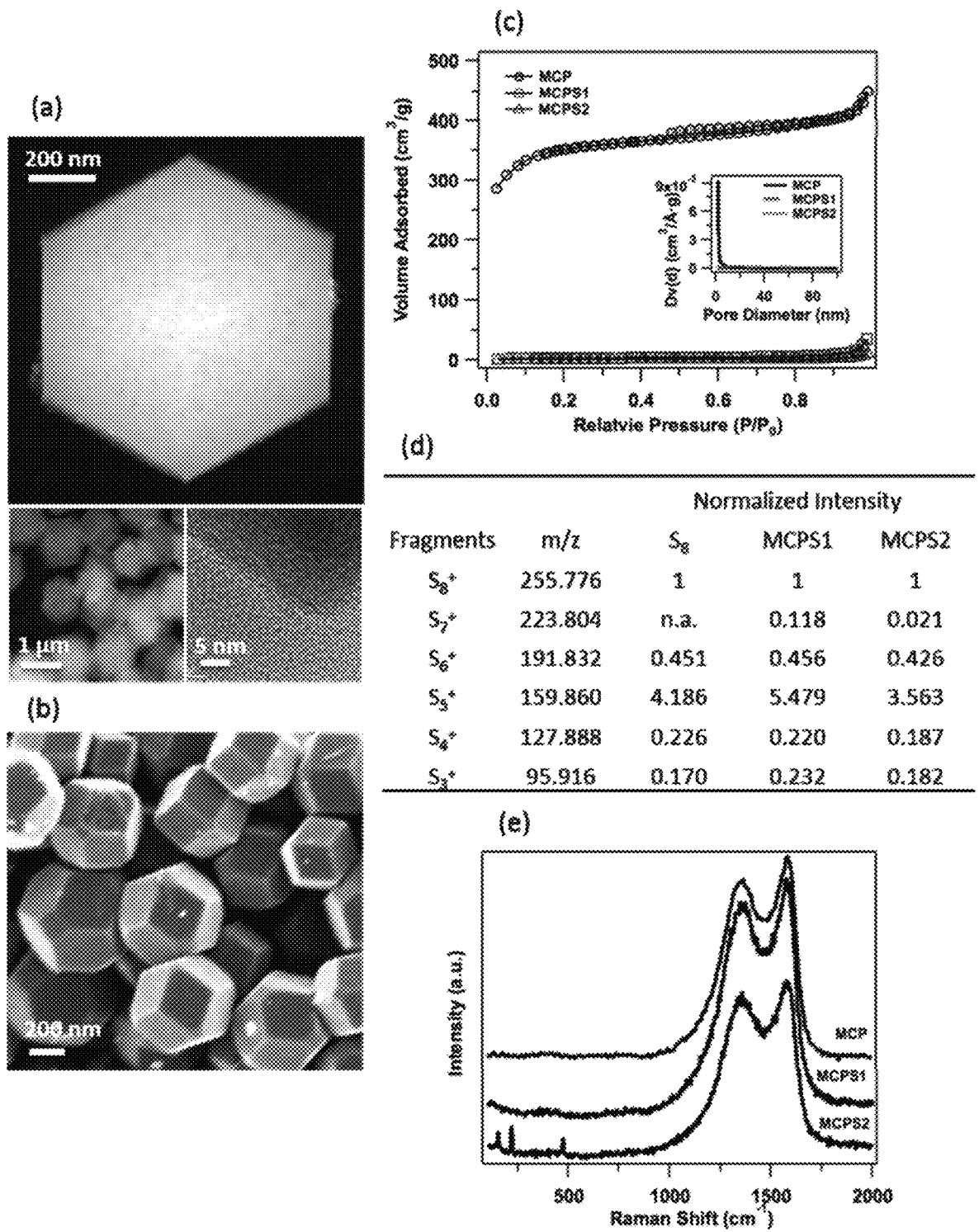
FIG. 2 shows physical characterization of MCP and MCPS. (a) Scanning transmission electron microscopy (STEM) and transmission electron microscopy (TEM) images of MCP. The right bottom TEM image shows the edge of the MCP, indicating uniform porous structure of the MCP. (b) Scanning electron microscopy (SEM) image of MCPS1. (c) $N_2$ adsorption-desorption isotherm and the corresponding Barrett-Joyner-Halenda (BJH) pore size distribution (inset) of MCP and MCPS composites. (d) Normalized positive sulfur fragmentation intensities for elemental sulfur, MCPS1 and MCPS2. (e) Raman Spectra of the MCP and MCPS composites. Three peaks in MCPS2 between 100-500 cm$^{-1}$ are the signature peaks of crystalline sulfur.
Figure 8:
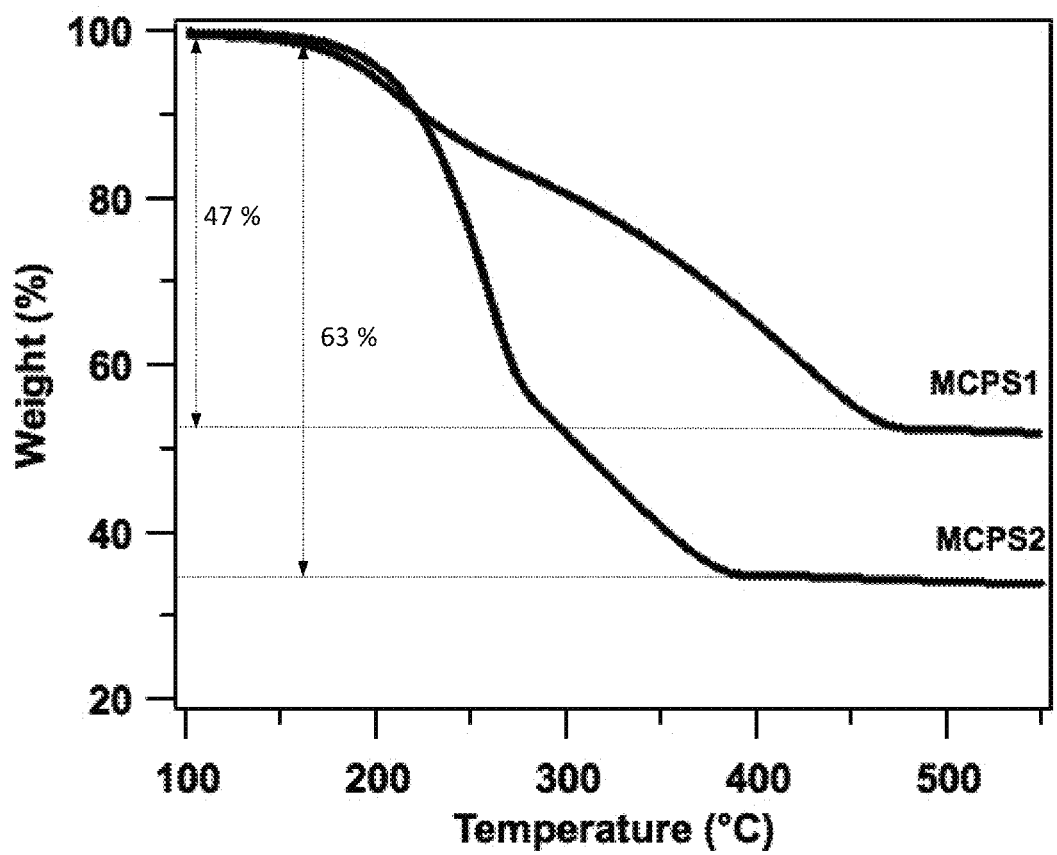
FIG. 8 shows thermogravimetric analysis (TGA) of the MCPSs with different sulfur loadings under $N_2$ flow.
Figure 9:
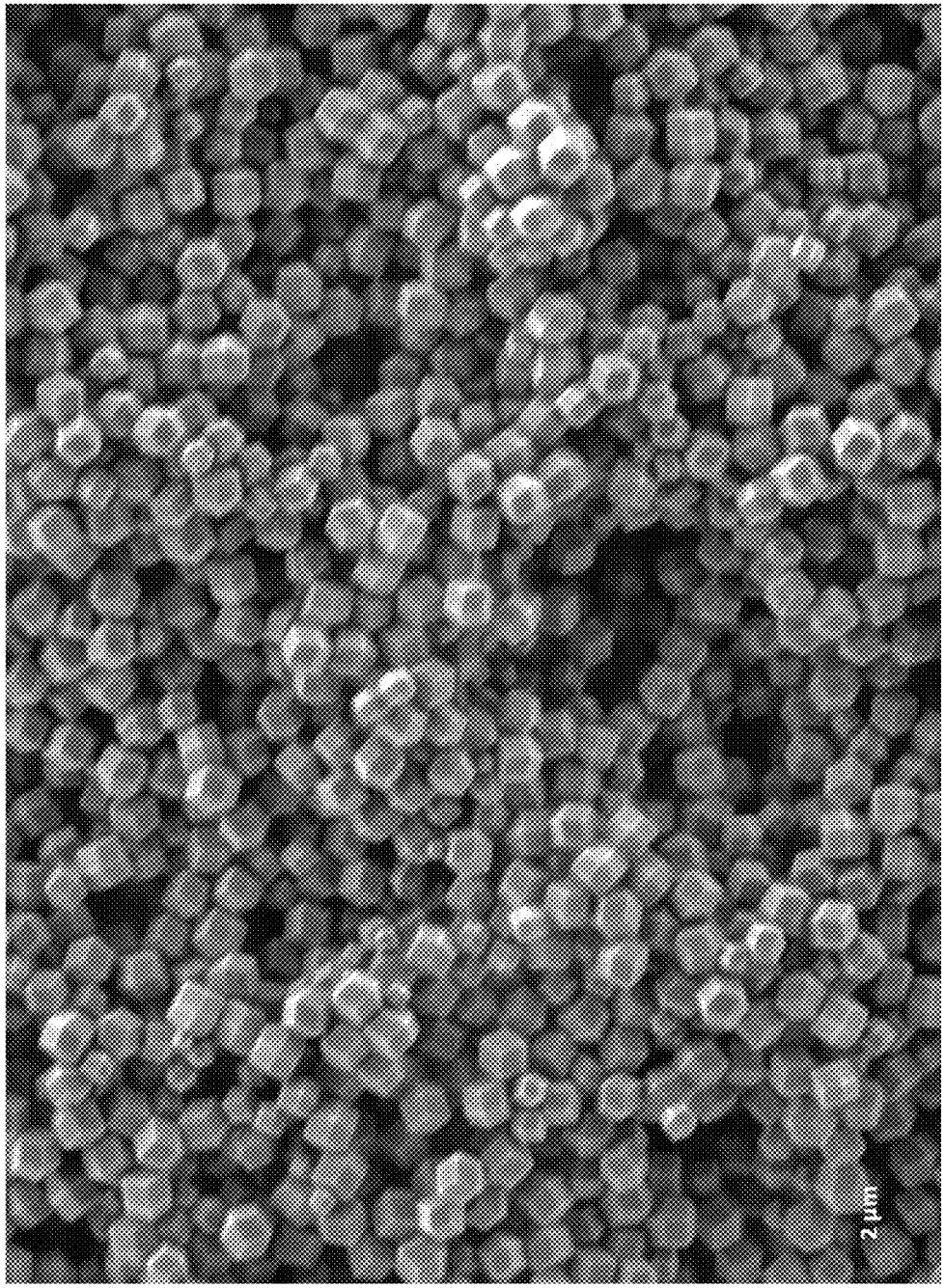
FIG. 9 shows a scanning electron microscopy (SEM) image of the porous zeolite-type MOF (ZIF-8) rhombic dodecahedra. These polyhedrons are about 1 μm in size with smooth surface.
Figure 10:
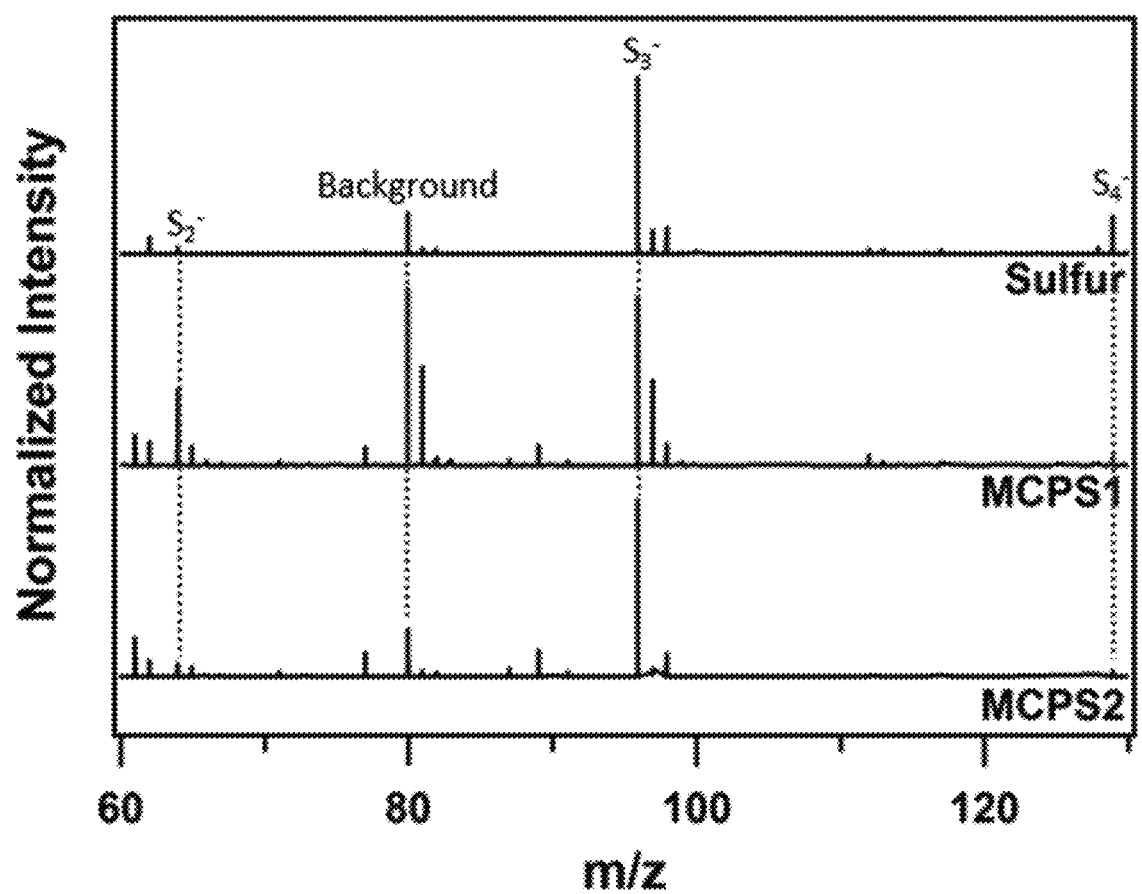
FIG. 10 shows direct analysis in real time mass spectra (DART-MS) of MCP composites and sulfur by negatively charged ion source. $S^{3-}$ is the dominant sulfur species in all the cases.

In light of the need for cathode materials with high sulfur loading, we developed a porous carbon host with homogeneous pore size distribution, high pore volume, and increased surface area. We employed a facile synthesis route to create well-patterned microporous carbon polyhedrons (MCP) using zeolite-type MOF (ZIF-8) rhombic dodecahedra as both the template and precursor. FIG. 2a describes the STEM and TEM images of the MCP, indicating a uniform microporous sponge-like texture. The abundant micropores give rise to a high Brunauer-Emmett-Teller (BET) surface area of 833 $m^2/g$ calculated from the N2 adsorption-desorption isotherm of the MCP (FIG. 2b and Table 1), which also give rise to a 708.5 m²/g microporous surface area and pore size distribution ranging from 0.6 nm to 1.8 nm. To create cathodes, different amounts of sulfur was infused into the MCP and the resultant composites denoted as MCPS1 and MCPS2 with 47% and 65% sulfur loading respectively (verified by TGA curve in FIG. 8). The weight loss for MCPS1 due to the evaporation of sulfur occurs in a wide temperature range up to 450° C., indicating strong nonpolar interaction between sulfur and carbon matrix, while MCPS2 shows a two-step weight loss, representing sulfur species outside and inside the MCP respectively. A SEM image (FIG. 2c) of the as-synthesized MCPS1 suggests that the rhombic dodecahedra morphology from ZIF-8 (FIG. 10) is well maintained after the carbonization and sulfur infusion processes, and most of the sulfur is trapped inside the micropores.

Table 1 shows physical characteristics of the MCP and MCPS composite. DFT: Density function theory method used to determine microspores. $I_g/I_d$ is the ratio used to determine the amount of graphitic carbon verse disordered carbon in the composite, which are the normalized peak ratio of G band to D band in Raman Spectra.

TABLE 1

| Samples | BET Total Surface Area (m²/g) | Pore Volume (cm³/g) | Micropore Surface Area (m²/g) | DFT Pore Size Distribution (nm) | Conductivity (S/cm) | $I_g/I_d$ |
|---|---|---|---|---|---|---|
| MCP | 833.3781 | 0.695505 | 708.4812 | 0.6~1.8[1] | 9.66*10⁻³ | 1.14 |
| MCPS1 | 11.5262 | 0.054189 | 2.3499 | n.a. | 6.13*10⁻³ | 1.14 |
| MCPS2 | 3.2628 | 0.017352 | 1.1322 | n.a. | 5.22*10⁻³ | 1.08 |

Figure 11:
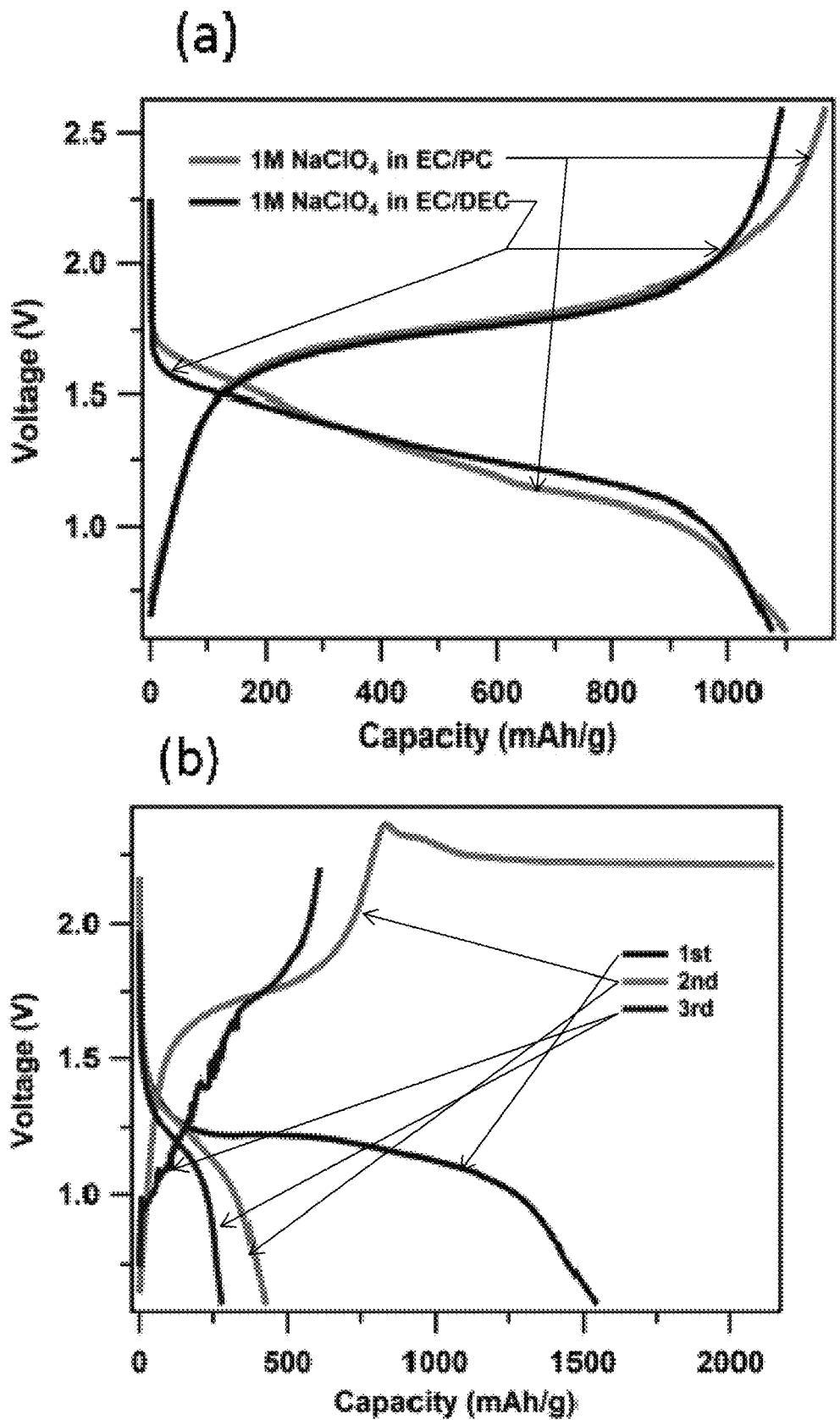
FIG. 11 shows voltage profile of the cell (a) in different carbonate electrolytes; (b) in the TEGDME-based electrolyte and (c) with different resting time (solid line: rest 10 min; dash line: rest 2 weeks) before testing in the two aforementioned electrolytes. Tetraethylene glycol dimethyl ether (TEGDME) is a commonly used ether-based electrolyte in Li—S batteries due to its higher solubility to LiPS, however, carbonate electrolytes are suggested to be non-soluble to PS. When using MCPS1 as cathode in TEGDME electrolyte, although the first discharge voltage profile is comparable to that in carbonate electrolytes, server shuttling is observed during recharge process. The current density is 0.1 C for both charge and discharge.
Figure 11:
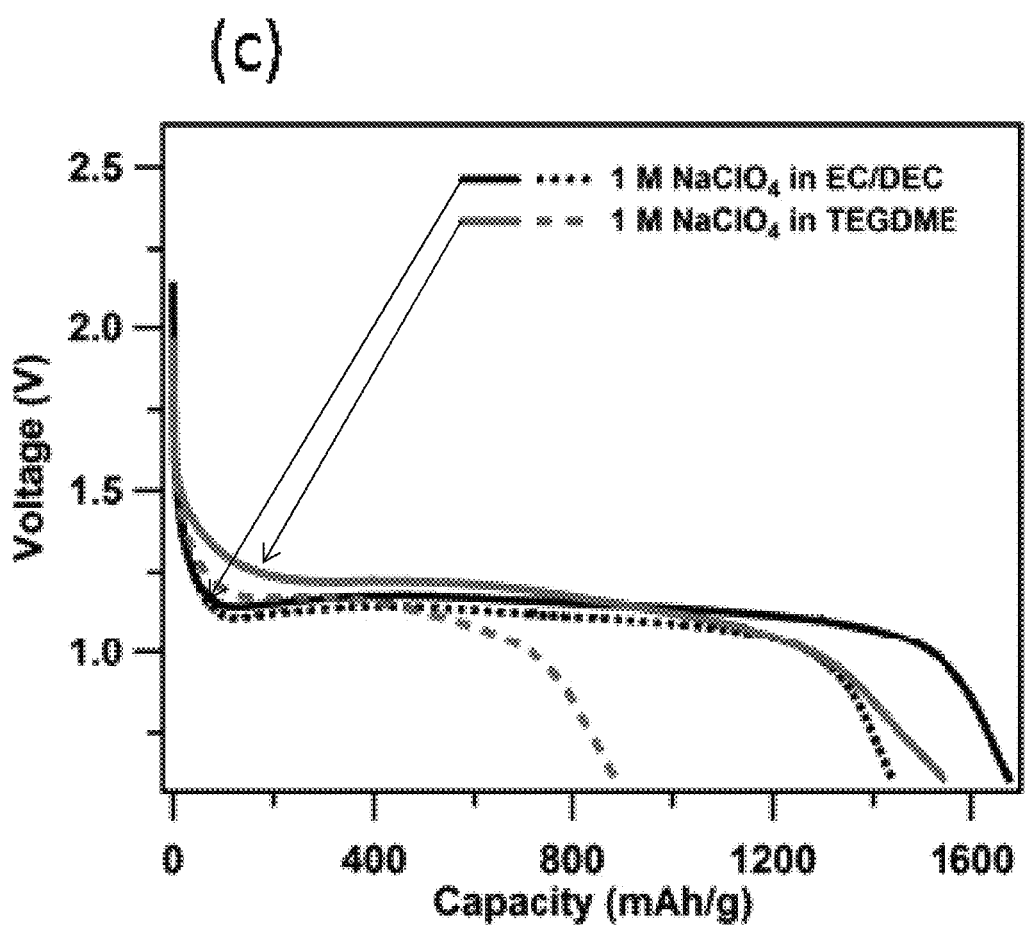

The state of sulfur inside micropores can play a significant role in the electrochemical stability of the cathode. Raman spectra (FIG. 2d) of MCP and MCPS composites indicate carbonization of ZIF-8 and well dispersion of sulfur in micropores in MCPS1 as no crystalline sulfur peaks can be observed. Sulfur fragments obtained from different sulfur containing species were evaluated by direct analysis in real time mass spectra (DART-MS). Normalized intensities for positively charged sulfur fragments are summarized in FIG. 2d. $S_8^+$ was identified both from elemental sulfur and MCPS composites, and $S_5^+$ was the dominant positively charged sulfur species in all samples. When a negative ion source was applied in DART-MS to the MCPS composites, $S_3^-$ is found to be the dominant sulfur species (FIG. 11). Combining the dominant sulfur fragments both from positive and negative ion sources measurements, yields $S_8$ as the main species in MCPS. This observation indicates that sulfur inside microporous carbon used in the present work is not the smaller sulfur $S_{2-4}$ species, but rather still exists as $S_8$. Considering the ring diameter, 0.69 nm, and crown-like ring structure, $S_8$ is able to accommodate inside extremely small micropore since the pore size distribution is an average value and the shape of micropore in carbon is typically slit-like. Previous galvanostatic discharge experiments show that introduction of β-monoclinic $S_8$ inside a vertically aligned carbon nanotube with a diameter of 3 nm eliminates the upper (2.4 V) discharge plateau associated with formation of soluble polysulfide species in Li—S cells. This suggests that $S_8$ may show different electrochemistry with the accommodation of porous carbon.

Figure 3:
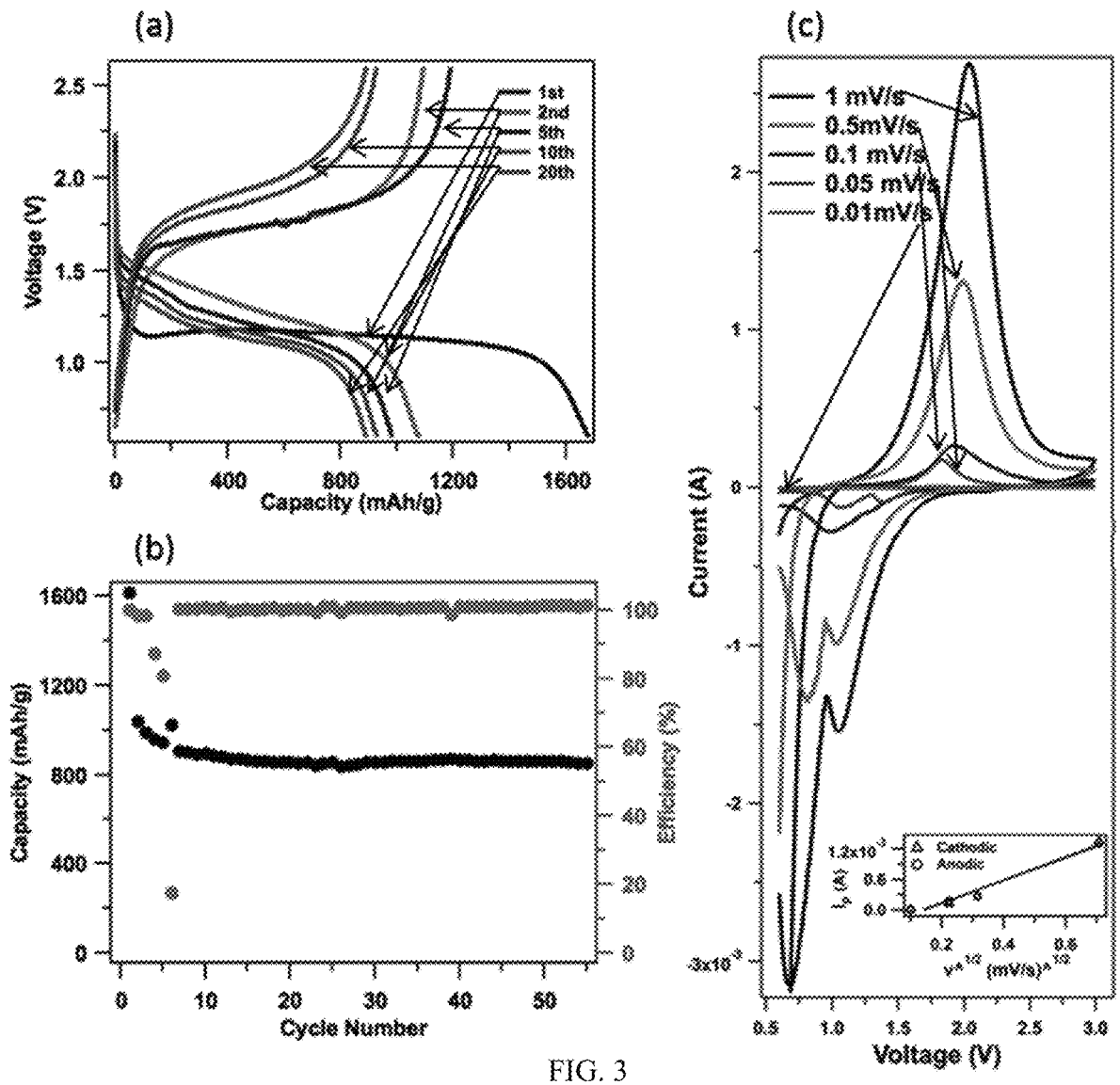
FIG. 3 shows electrochemical characterization of the Na—S cell in a carbonate electrolyte. (a) Electrochemical discharge and charge curves of the cell at various cycles. The tests were performed at 0.1 C for both charge and discharge in the potential range of 0.6-2.6 V vs Na/Na$^+$. (b) Capacity and Coulombic efficiencies versus cycle number for the cell. (c) Cyclic voltammograms (CV) of the Na—S cells at various scan rates; inset: relation between peak cathodic and anodic currents verse square root of scan rate derived from CV.

Galvanostatic cycling experiments were performed to assess the electrochemical properties of Na—S cells in which MCPS1 is used as cathode. Results described in FIG. 3a show that the cell exhibits a high initial discharge capacity of 1614 mAh/g at a current density of 0.1 C (1 C=1675 mAh/g). The dimple and the lower voltage plateau at the beginning of discharge compared to the following cycles indicates that Na⁺ ions need to go through a barrier which is probably related to desolvation or solvation shell distortion to accommodate the extremely small pore size in order to diffuse inside the micropores. The higher irreversible capacity is partially attributed to initial SEI formation and electrolyte decomposition. The reversible discharge plateau in the following cycles ranges from 1.6 V to 1 V. The lower voltage is consistent with direct formation of $Na_2S/Na_2S_2$, without creation of intermediate soluble NaPS species. A reversible discharge capacity of 800 mAh/g is stably achieved for 50 cycles (FIG. 3b).

Figure 12:
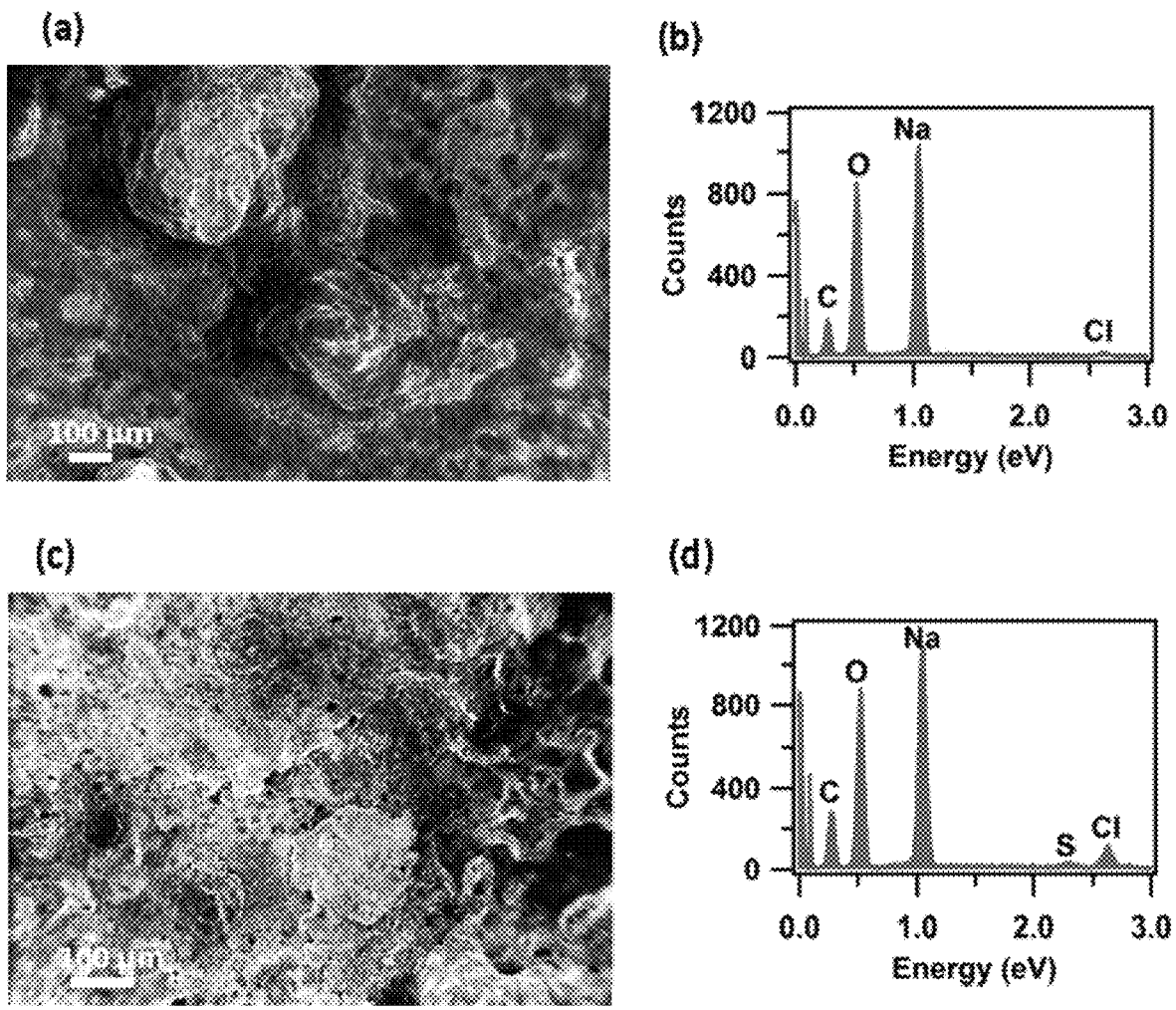
FIG. 12 shows a scanning electron microscopy (SEM) image and energy dispersive spectra (EDS) maps of the sodium anodes after 10 cycles. (a) and (b) SEM image and EDS maps of the sodium anode in 80 μL 1M $NaClO_4$ in EC/DEC electrolyte. (c) and (d) are in 80 μL 1M $NaClO_4$ in TEGDME electrolyte. (e), (f), and (g) are in 1M $NaClO_4$ in EC/PC electrolyte with 10 vol % $SiO_2$-IL-$ClO_4$. The cells were dissembled after 10 cycles of charge and discharge at 0.1 C in an argon filled glovebox and the anodes were washed with electrolyte solvent before characterization. Sulfur signals were found in EDS spectra for the anode cycled in TEGDME, indicating that polysulfides are formed in electrolyte and attack sodium anode.
Figure 12:
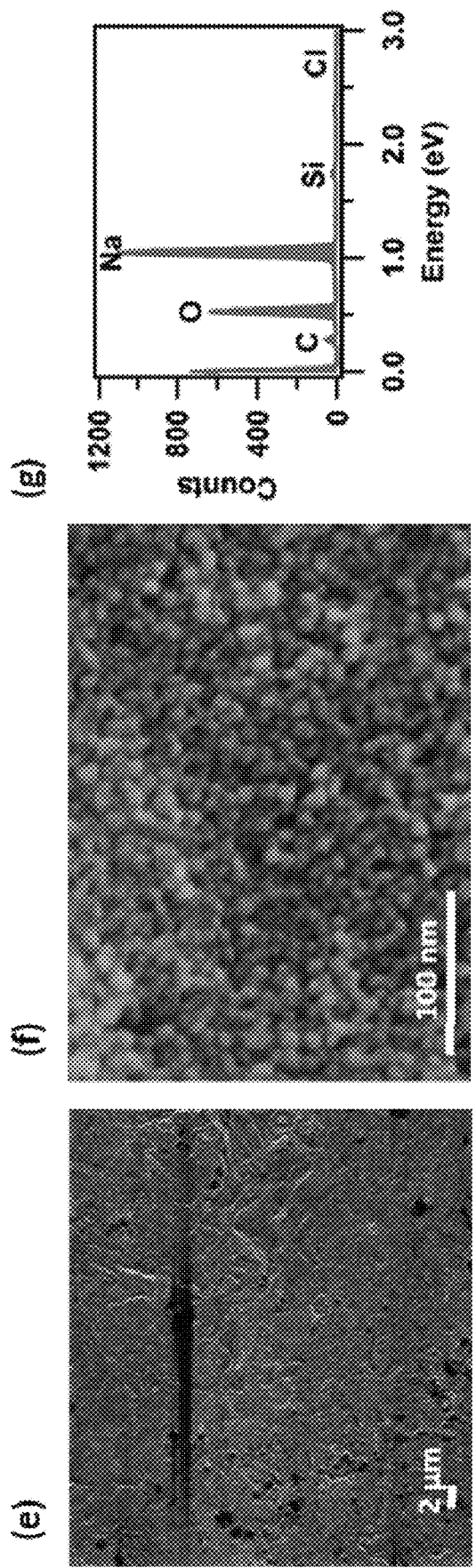
Figure 13:
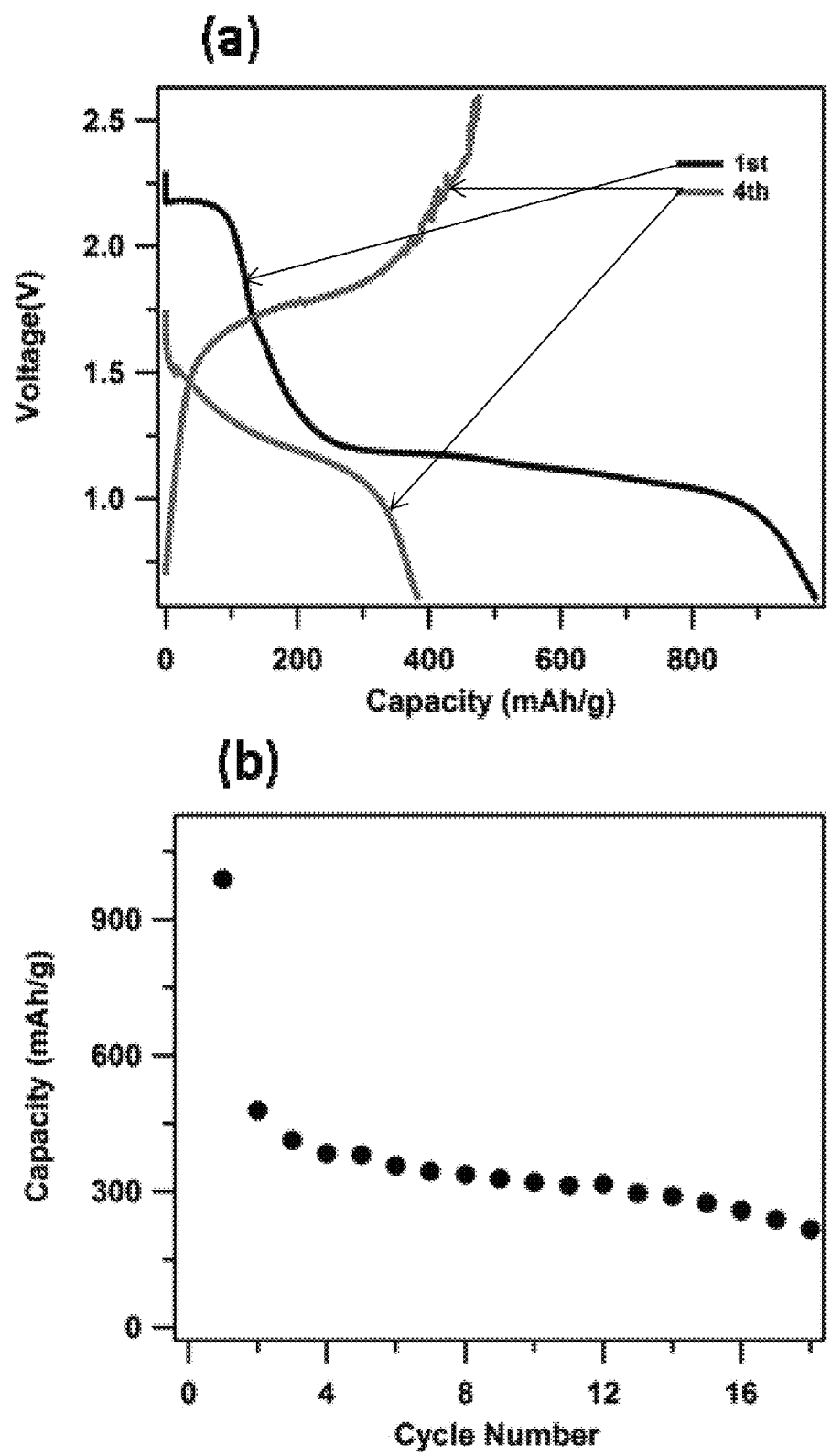
FIG. 13 shows electrochemical characterization of the $MCPS_2$ in a carbonate electrolyte. (a) Electrochemical discharge and charge curves of the cell at 0.1 C. The two discharge plateau in the first cycles indicates sulfur outside and inside the MCPS2. The disappearance of the higher discharge voltage plateau suggests that the elemental sulfur outside MCP reacts irreversibly with carbonate electrolyte. (b) Capacity verses cycle number by using MCPS2 as the cathode.

In contrast, when TEGDME, which has high solubility for NaPS, is used as the electrolyte solvent, shuttling is observed in the voltage profile (see FIG. 11) and corrosion of the sodium anode is readily seen from post mortem studies (FIG. 12). This has widely been known the cause of cell failure in sodium-sulfur batteries in previous works by using ether-based electrolytes. Those batteries can neither bear high current densities (1/64 C is employed previously) nor undergo satisfied cycle life (20 cycles). Even though $NaNO_3$ is used in their electrolytes to passivate sodium metal with the expectation that it is as effective as $LiNO_3$ on passivating lithium anode in Li—S batteries, it is unlikely to achieve outstanding performance in those cell configurations. A similar result is also found when MCPS2 is used as cathode with the EC/PC based electrolyte, where results described in FIG. 13 indicate that higher order NaPSs is formed and react with the carbonate electrolyte. As such, carbonate-based electrolytes were shown to be incompatible with metal-sulfur batteries if sulfur cathodes are not taken care of properly. These results therefore clearly show that the electrochemistry of sulfur in microporous carbon is affected by subtle features related the solubility of PS in electrolyte and a competition between the affinity of sulfur for the microporous carbon and electrolyte determines whether what intermediate sulfide species is observed.

Low self-discharge is another criterion to judge the commercialization and the safety of energy-storage devices. Metal-sulfur batteries, unfortunately, have strong self-discharge behavior in ether-based electrolytes due to the formation and dissolution of polysulfides. Surprisingly, comparison of the initial voltage profile (FIG. 11c) between a ten-minute and two-week resting time for the cell with the carbonate electrolyte and the MCPS1 composite cathodes suggests relatively small decrease in capacity. Even though a 42% capacity decay was observed for the cell using the TEGDME electrolyte after 2 weeks, it is still a significant improvement compared with a normal sulfur-carbon blend cathode, in which an immediate voltage drop and short-circuit was found after cell assembly. This again indicated that spontaneous internal cell chemical reaction can be minimized by the strong confinement of MCP as well as the carbonate electrolyte.

In the carbonate electrolyte, interaction between sulfur and the microporous carbon appears to be strong enough to completely prevent sulfur loss to the electrolyte. This raises the possibility that sulfur undergoes a solid-state electrochemical reaction in the microporous carbon. To investigate this possibility, cyclic voltammetry (CV) measurements were performed at various scan rates. Results described in FIG. 3c clearly show that a two-electron transfer process occurs in the discharge cycle. The reduction peaks are seen to shift towards a more negative value and oxidation peak towards a more positive value with increasing scan rate, indicative of an electrochemical process in which mixed kinetics of charge transfer process and diffusion of electroactive species control. The cathodic and anodic peak currents are also seen to be similar in magnitude, which indicates good reversibility and similar reaction mechanism occurring during charge and discharge. Finally, the peak current is found to increase linearly with the square root of scan rate (FIG. 3c), which is a classical characteristic of a diffusion-limited process.

Figure 4:
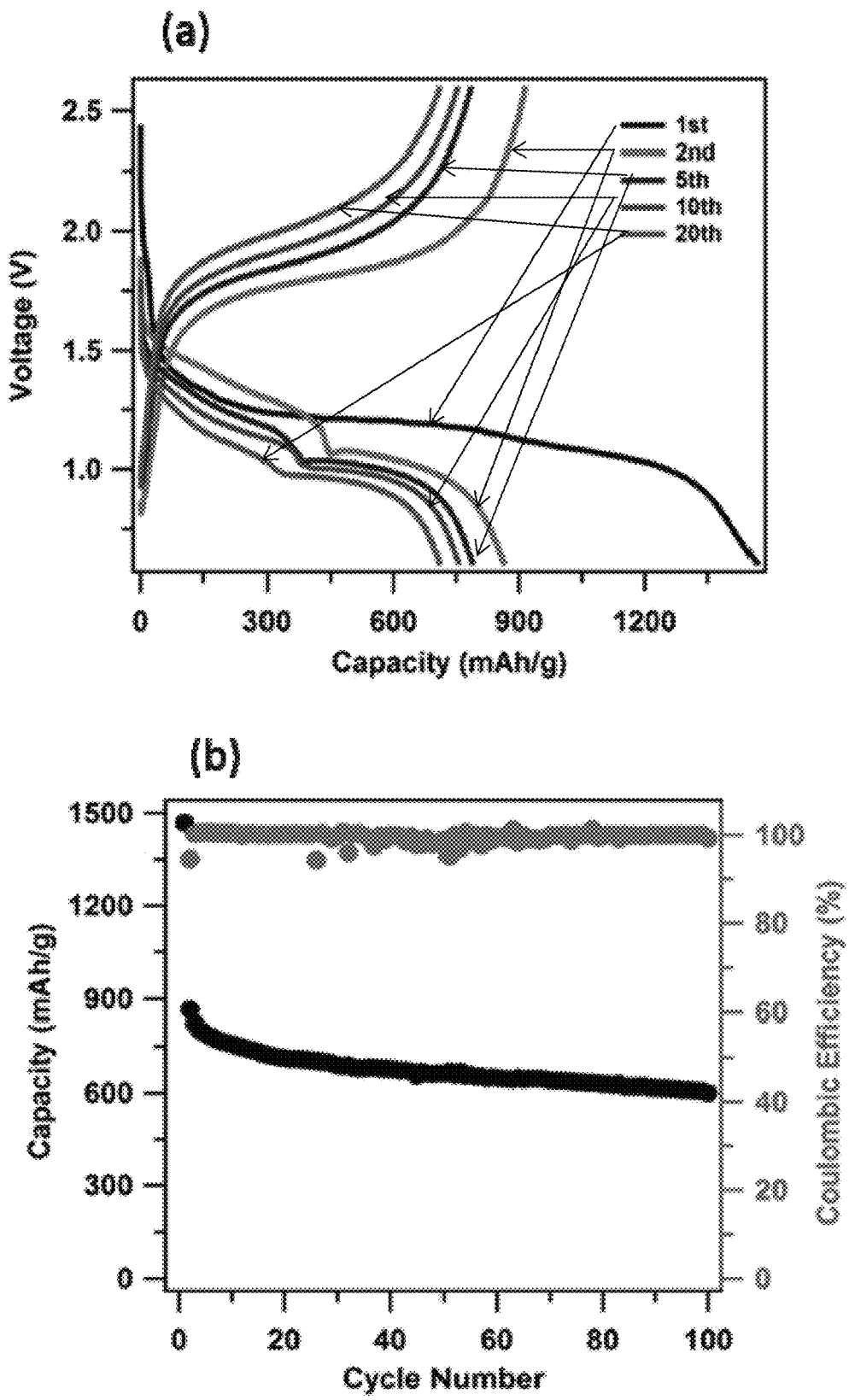
FIG. 4 shows galvanostatic cycling performance of the Na—S cell in a carbonate electrolyte with different amounts of $SiO_2$-IL-ClO$_4$. (a) Electrochemical discharge and charge curves of the cell at various cycles with 5 vol % of $SiO_2$-IL-ClO$_4$ in the electrolyte. The tests were performed at 0.1 C for the first discharge and 0.5 C for the following cycles in the potential range of 0.6-2.6 V vs Na/Na$^+$. (b) Capacity and Coulombic efficiencies versus cycle number for the cell with 5 vol % of $SiO_2$-IL-ClO$_4$ in the electrolyte. (c) Coulombic efficiency and (d), capacity versus cycle number for the cell with different amounts of $SiO_2$-IL-ClO$_4$ in the electrolytes respectively at a current density of 0.5 C. (e) Electrolyte stability analysis for the three cases (from top to bottom, the legend reads 1 M NaClO$_4$, 5 vol % $SiO_2$-IL-ClO$_4$, and 10 vol % $SiO_2$-IL-ClO$_4$) (in each set of three columns, the left most column is 1 M NaClO$_4$, the middle column is 5 vol % $SiO_2$-IL-ClO$_4$, and the right column is 10 vol % $SiO_2$-IL-ClO$_4$) in c in term of Coulombic efficiency for the first 100 cycles. (f) Cycling performance and (g) voltage profile of the cell without $SiO_2$-IL-ClO$_4$ in the electrolyte.
Figure 4:
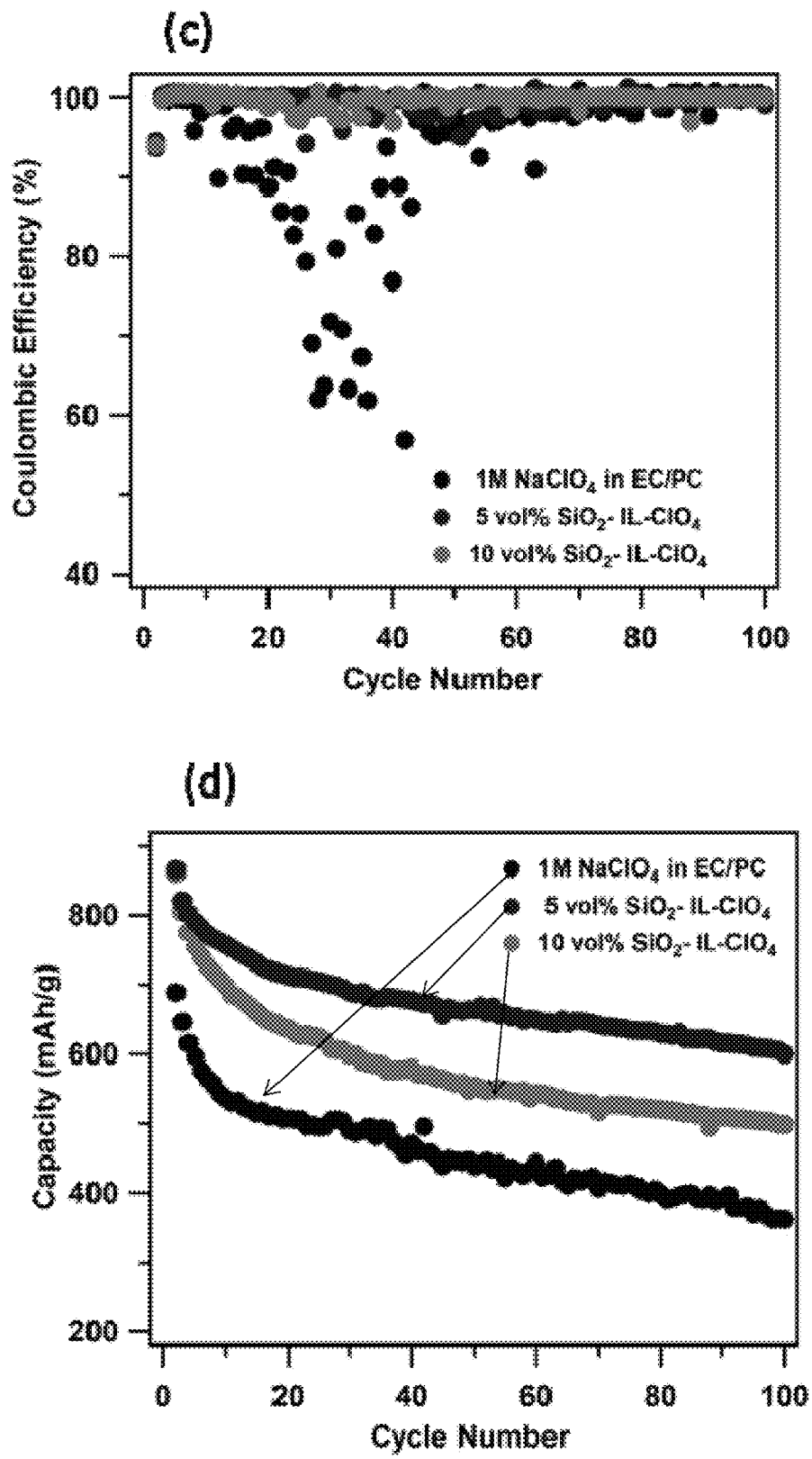
Figure 4:
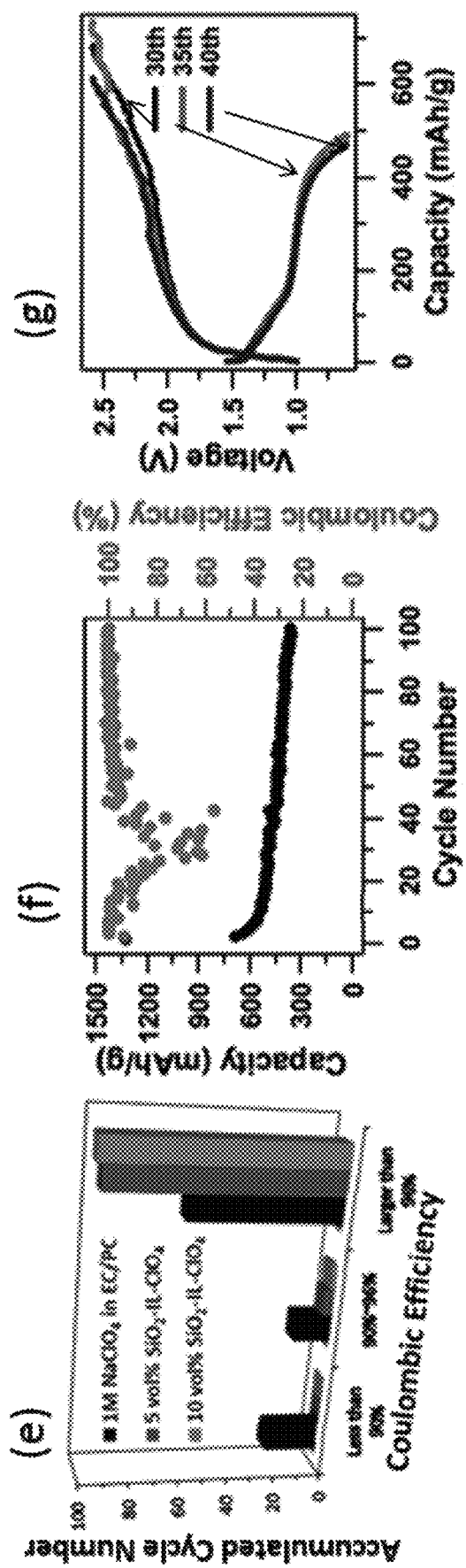
Figure 14:
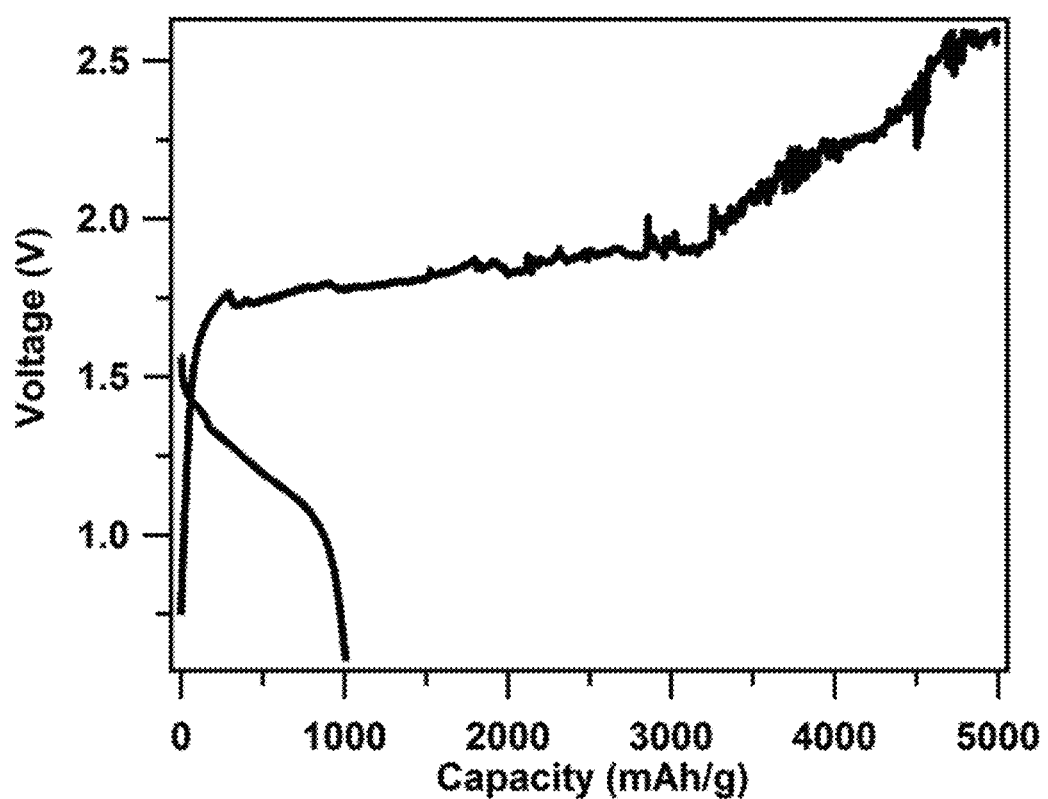
FIG. 14 shows the sixth cycle voltage profile of the cell in mentioned in FIGS. 3a and b. Severely instable charging was observed.

A superficial assessment of the cycling results in FIG. 1b would conclude that the Na—S cells cycle well. More careful scrutiny of the large drop in Columbic efficiency seen in FIG. 1b at around the $6^{th}$ cycle and the slight ripple in the charge profile at the $10^{th}$ cycle shown in FIG. 1a reveal undesirable stability problems with the Na—S cells (see FIG. 14). Measurements at higher current density show that the cells become progressively more unstable and the effects seen in FIGS. 1a and b become more severe. Because the unstable operation is only evident during cell recharge, we suspected that it originated from unstable Na deposition and/or side reactions of the freshly created Na surface area and the electrolyte. We investigated the effect of $SiO_2$-IL-$ClO_4$ nanoparticles as electrolyte additives for Na—S batteries. Either 5 vol % or 10 vol % of the $SiO_2$-IL-$ClO_4$ was added to the electrolyte as a stabilizer and the cell response in galvanostatic cycling experiments compared to those obtained from control experiments in which the IL-tethered particles were not present. It is seen that as little as 5 vol % of the $SiO_2$-IL-$ClO_4$ additive could stabilize charging to a large extent. FIGS. 4a and b show the voltage profile and cycling stability of cells. The first discharge is performed at 0.1 C to fully activate the electrode. A discharge capacity of around 866 mAh/g is achieved initially and maintained to 600 mAh/g at the $100^{th}$ cycle, indicating a small capacity decay of 0.31% per cycle, which is comparable to current Li—S batteries at the same C rate. The Coulombic efficiencies for the batteries with and without $SiO_2$-IL-$ClO_4$ are compared in FIGS. 4c and e to evaluate their stability. It is apparent that cells without $SiO_2$-IL-$ClO_4$ show diverged Coulombic efficiency between the $10^{th}$ to $60^{th}$ cycle, while cells with only small amount of $SiO_2$-IL-$ClO_4$ exhibit improved Coulombic efficiency to over 90% each cycle, which is enhanced with increasing $SiO_2$-IL-$ClO_4$ amount. A benefit of the improved charging stability of the cells is that their cycling performance is enhanced over multiple discharge capacity as shown in FIG. 4d. We tentatively attribute this effect to a reduction in electrolyte loss as a result of side reactions with the anode during cell recharge.

Figure 5:
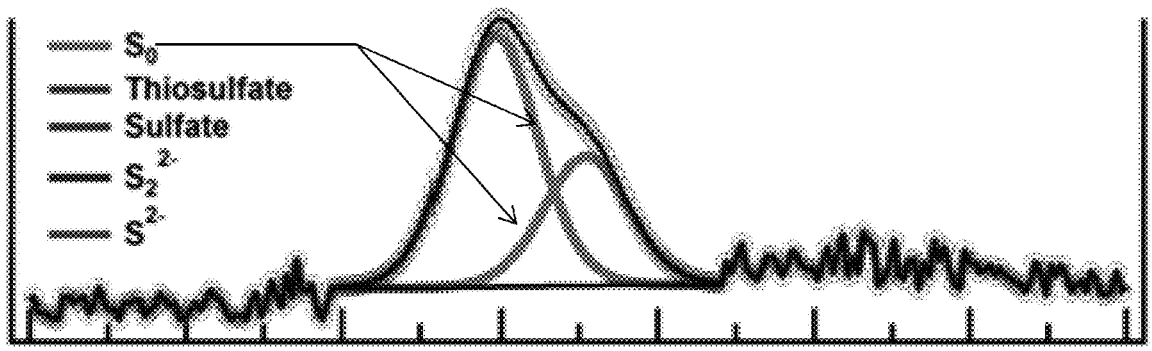
FIG. 5 shows post mortem characterization of MCPS1 cathodes in carbonate electrolytes. (a) Ex situ XPS spectra illustrating changes in the S2p mode in MCPS1 cathodes at pristine and different cycling states in a carbonate electrolyte. (From top to bottom: pristine cathode, cell was discharged to 1.4, 1 and 0.6 V and was recharged to 2.6 V at the first cycle respectively). Cathodes were disassembled in an argon filled glove-box and washed with electrolyte solvent before characterization. (b) STEM image and EDX maps of the MCPS1 cathode after first discharge. The cathode was washed with electrolyte solvent and sonicated to form a homogeneous suspension in a sealed vial. (c) UV-vis spectra of the cathodes solutions cycled in different electrolytes after 10 cycles at 0.1 C. The MCPS1 cathodes cycled in different electrolytes were soaked in 2 mL TEGDME for four days to extract PS species. For the $Na_2S_6$ solution, 1M $Na_2S_6$, which is synthesized by mixing $Na_2S$ and sulfur in a stoichiometric ratio of 2:6 in TEGDME. It was diluted 200 times and subjected to test. Peak assignment: $S^{2-}$, $S_2^{2-}$: 260 nm, $S_6^{2-}$: 340 nm and 450 nm, $S_3^{2-}$: 330 nm, $S_3^-$: 610 nm.
Figure 5:
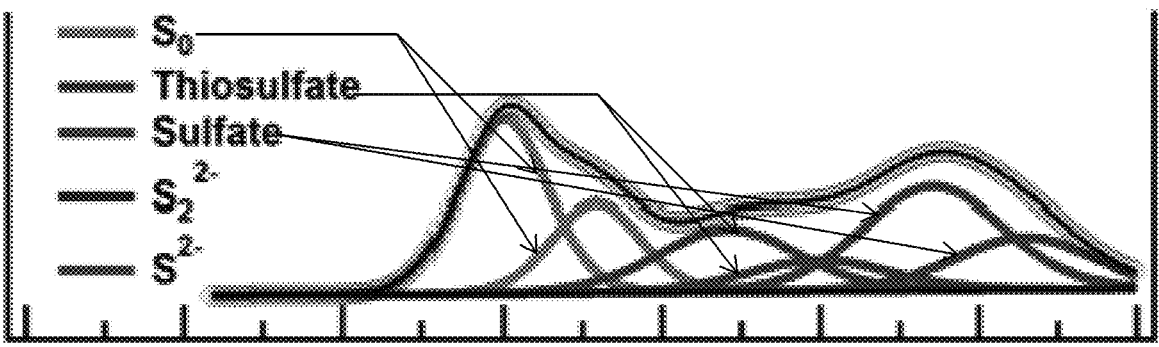
Figure 5:
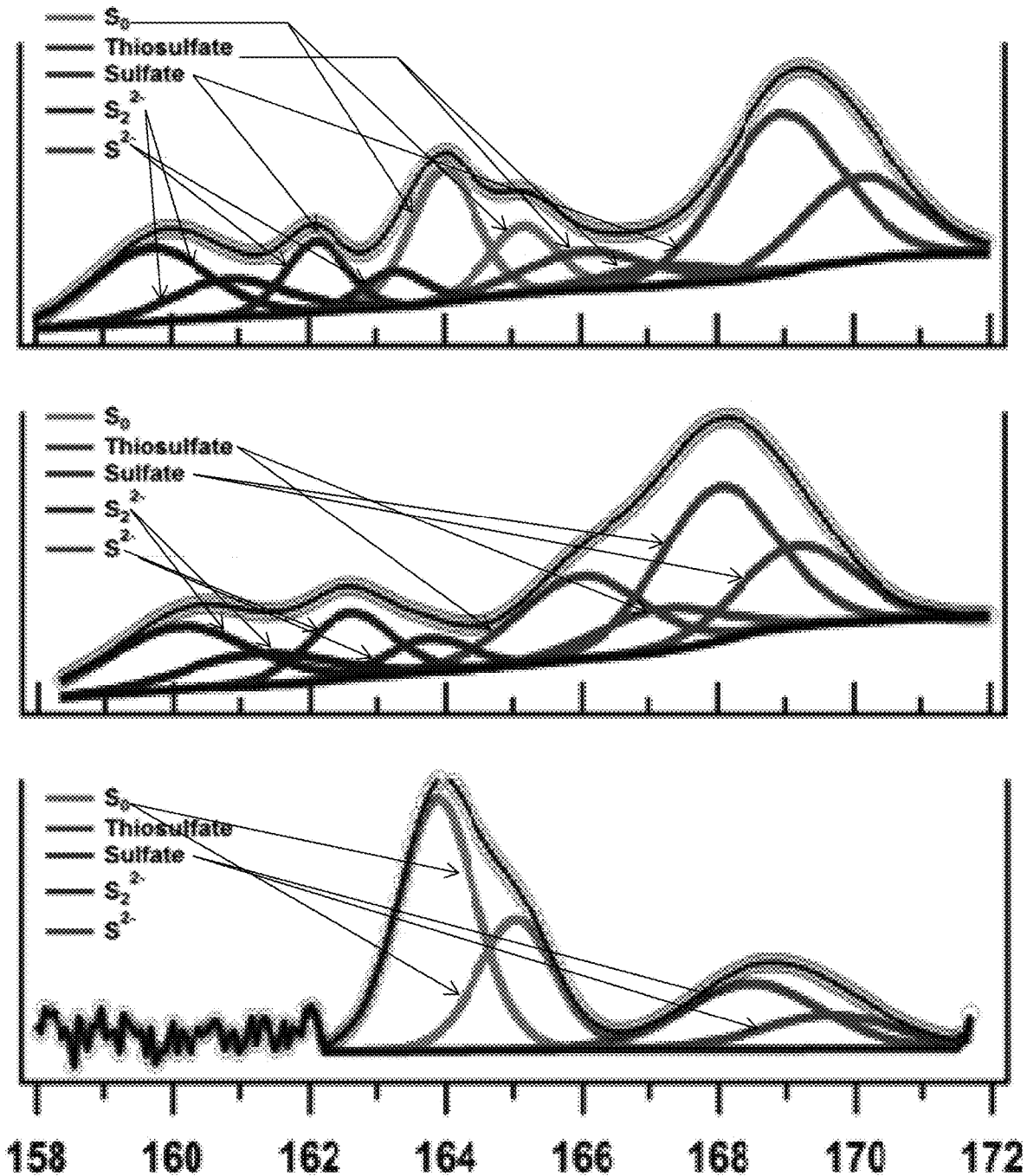
Figure 5:
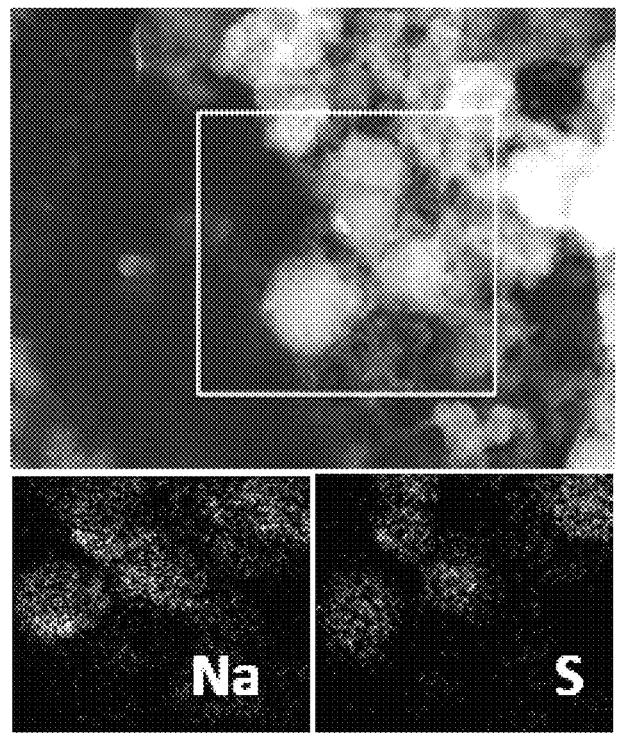
Figure 5:
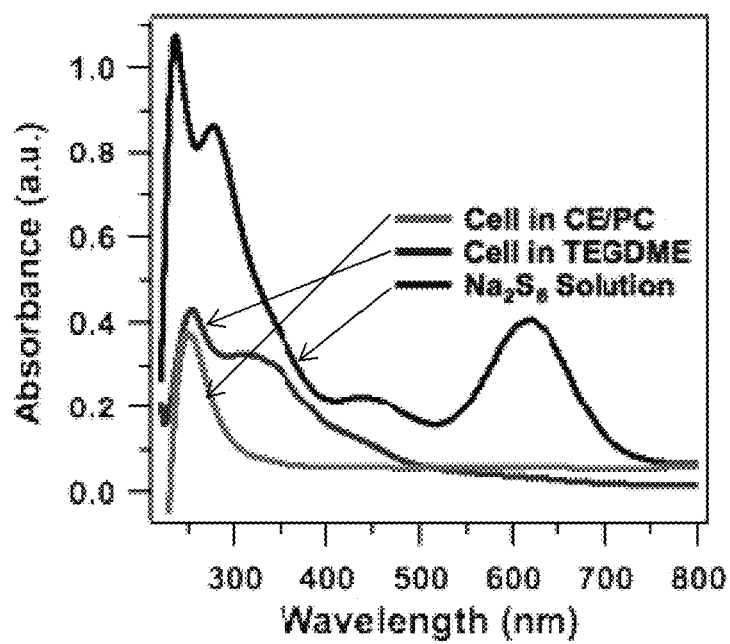
Figure 15:
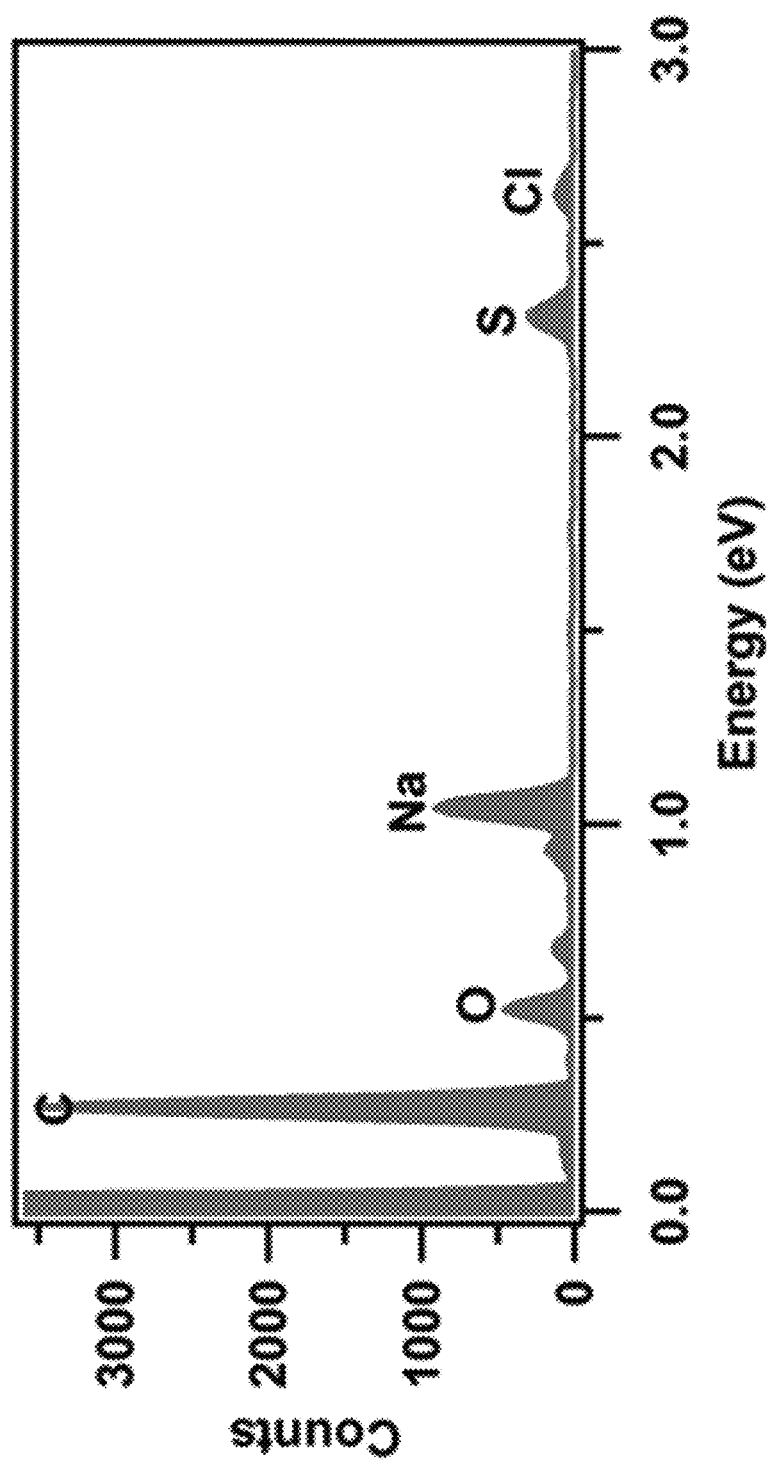
FIG. 15 is an EDX spectrum of the MCPS1 cathode after first discharge to 0.6 V.
Figure 16:
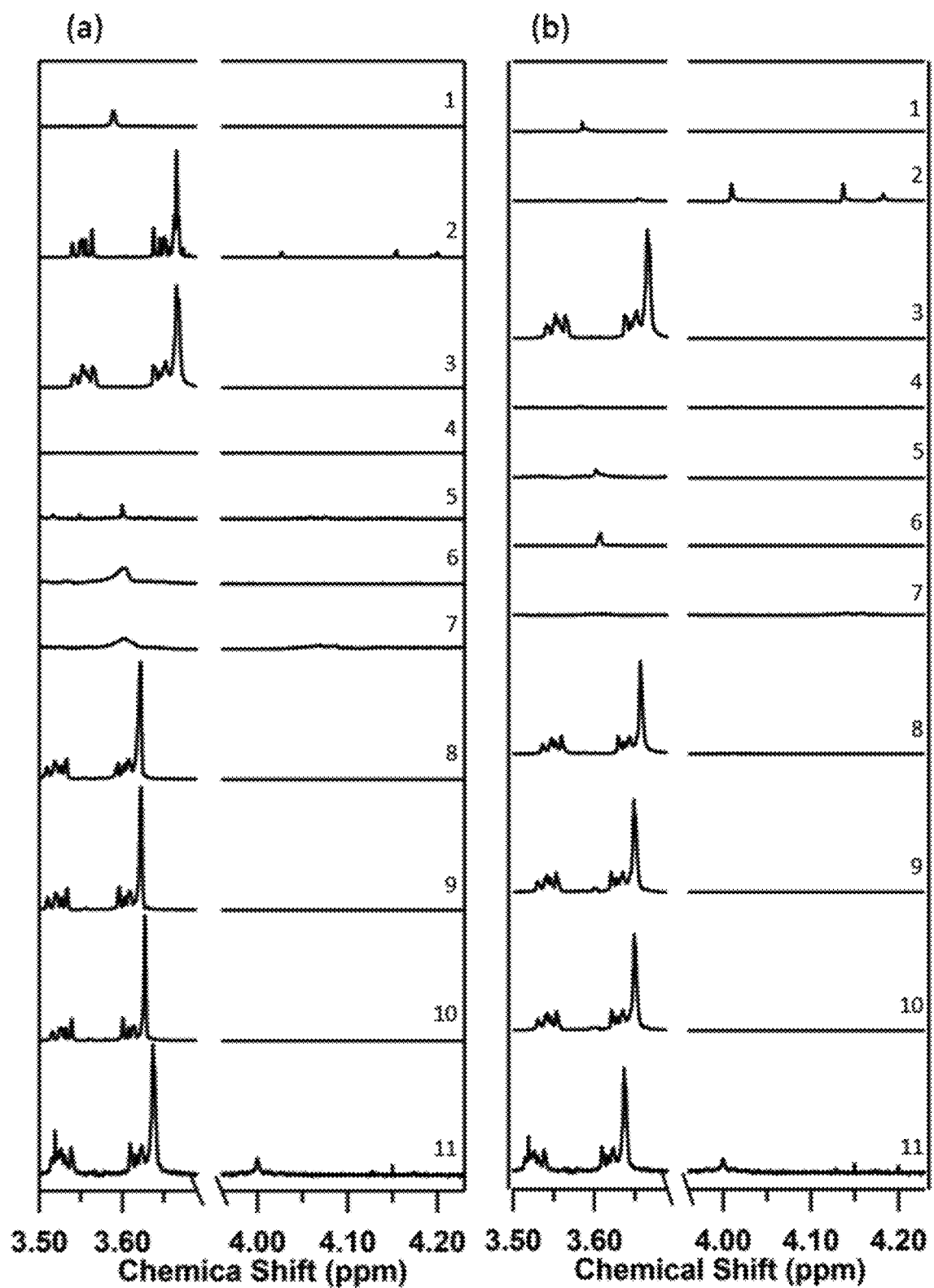
FIG. 16 is the $^1$H NMR spectra of the converted benzyl sulfide species from (a) sodium sulfide species and (b) lithium sulfide species. (a) $^1$H NMR spectra of benzyl sulfide species converted from 1: $Na_2S$ powder; 2: $Na_2S_6$ solution in TEGDME; 3: $^1$H NMR spectra of TEGDME; 4-6: MCPS1 cathodes discharged in the EC/DEC electrolyte to 1.4, 1, 0.6 V respectively; 7: MCPS1 cathodes at fully recharged state in EC/DEC electrolyte; 8-10: MCPS1 cathodes discharged in the TEGDME electrolyte to 1.4, 1, 0.6 V respectively; 7: MCPS1 cathodes at fully recharged state the TEGDME electrolyte. b, $^1$H-NMR spectra of benzyl sulfide species converted from 1: $Li_2S$ powder; 2: $Li_2S_3$ solution in dimethoxyethane (DME); 3: $^1$H NMR spectra of TEGDME; 4-6: MCPS1 cathodes discharged in the EC/DEC electrolyte to 1.4, 1, 0.6 V respectively; 7: MCPS1 cathodes at fully recharged state in EC/DEC electrolyte; 8-10: MCPS1 cathodes discharged in the TEGDME electrolyte to 1.4, 1, 0.6 V respectively; 7: MCPS1 cathodes at fully recharged state the TEGDME electrolyte. Regardless of the battery anode, chemical shift of $Bz_2S$ (3.60 ppm) was the only sulfide species observed for the cathodes cycled in the carbonate electrolyte. In TEGDME electrolyte, although $Bz_2S$ chemical shift was only found in the cathode at discharged stages, chemical shift of $Bz_2S_3$ (4.0 ppm), $Bz_2S_4$ (4.15 ppm) and $Bz_2S_5$ (4.2 ppm) were observed at recharge stage. The phenomena indicate that sulfur ($S_8$) in microporous carbon is able to reduce to solid sulfide species directly without forming soluble polysulfides. In a polysulfide soluble TEGDME electrolyte, recombination and disproportion reactions occurs during recharge process leading to the formation of soluble high-order polysulfides, which tentatively indicates that sulfur in microporous carbon is $S_8$. When using a non-solvent for polysulfide electrolyte (EC/DEC), sulfur in microporous carbon can reversibly undergo solid-state reaction to form $Na_2S$ or $Li_2S$. Chemical shift of TEGDME may change if benzyl sulfide co-exists probably dues to interaction with aromatic benzene rings. Cathodes cycled at different stages were soaked in a mixture of benzyl chloride and DME and allowed to sit for four days. After that, solvents were allowed to evaporate from the samples. The samples were then mixed with chloroform-d and filtered out of impurities (mainly carbon black on the cathode). They were then transferred to NMR tube and subjected to NMR test.
Figure 17:
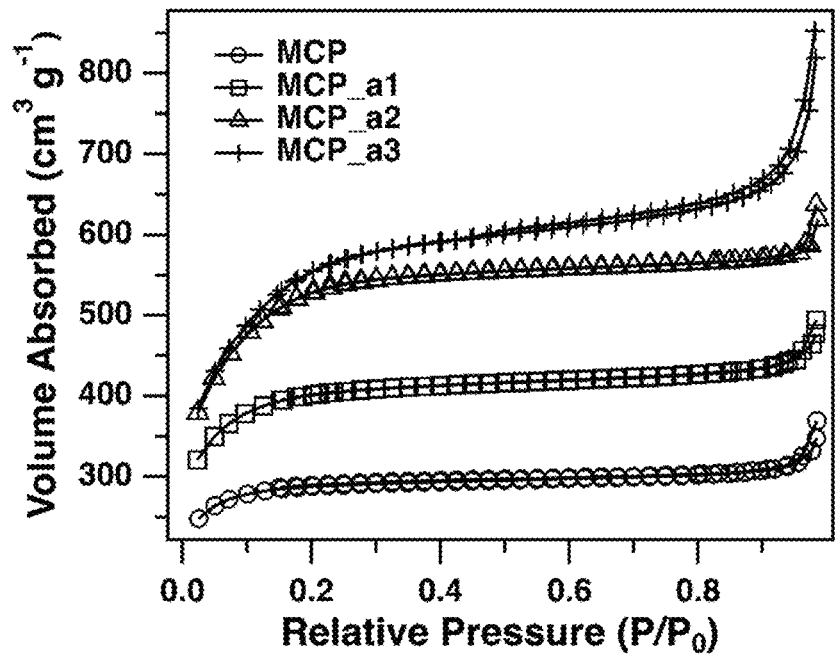
FIG. 17 shows (a) Nitrogen adsorption-desorption isotherms; (b) BJH pore size distribution and (c) the derivative of b, (d) BET and microporous surface area for the different porous carbons.
Figure 17:
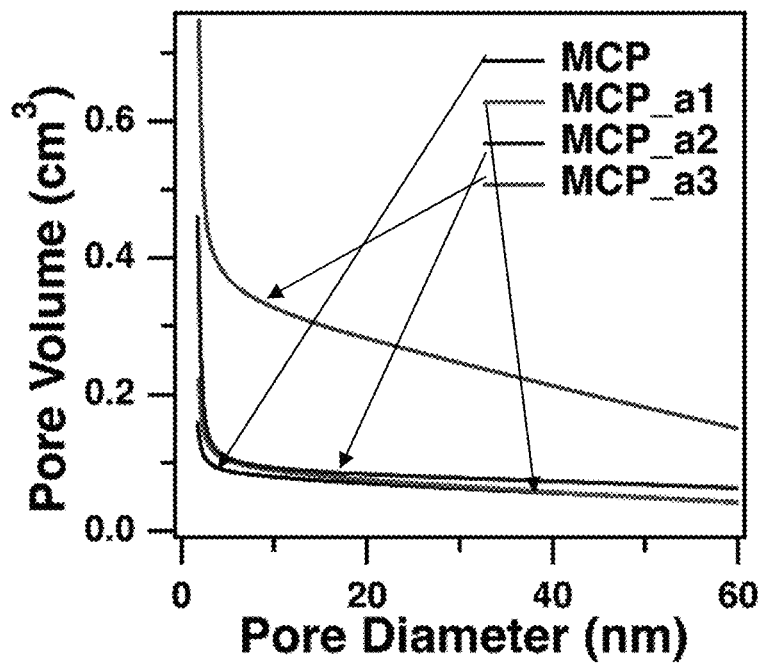
Figure 17:
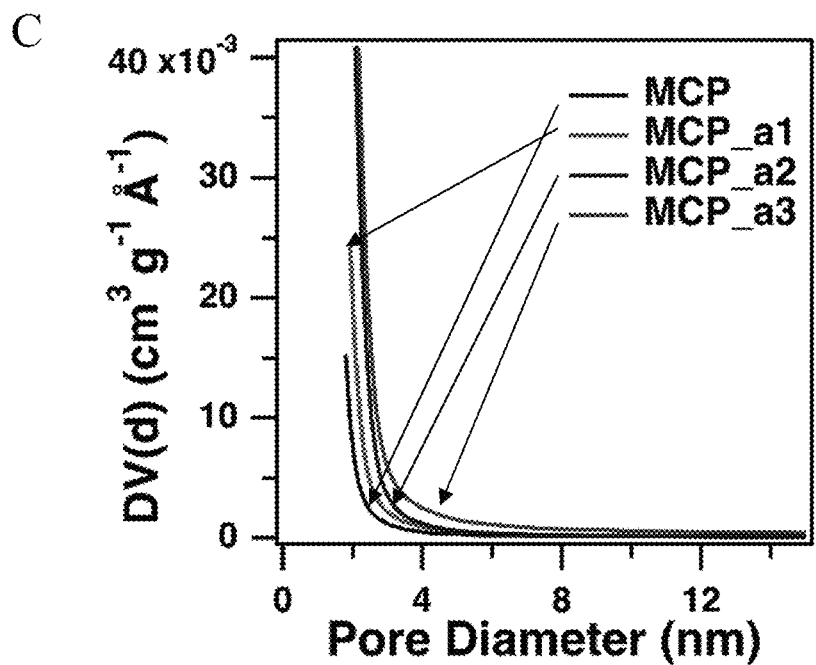
Figure 17:
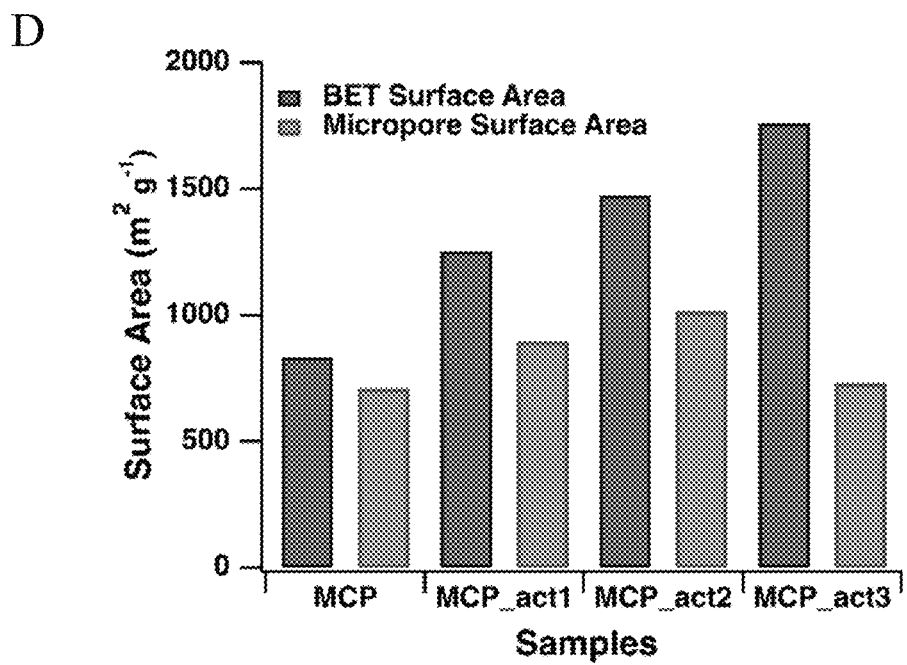
Figure 18:
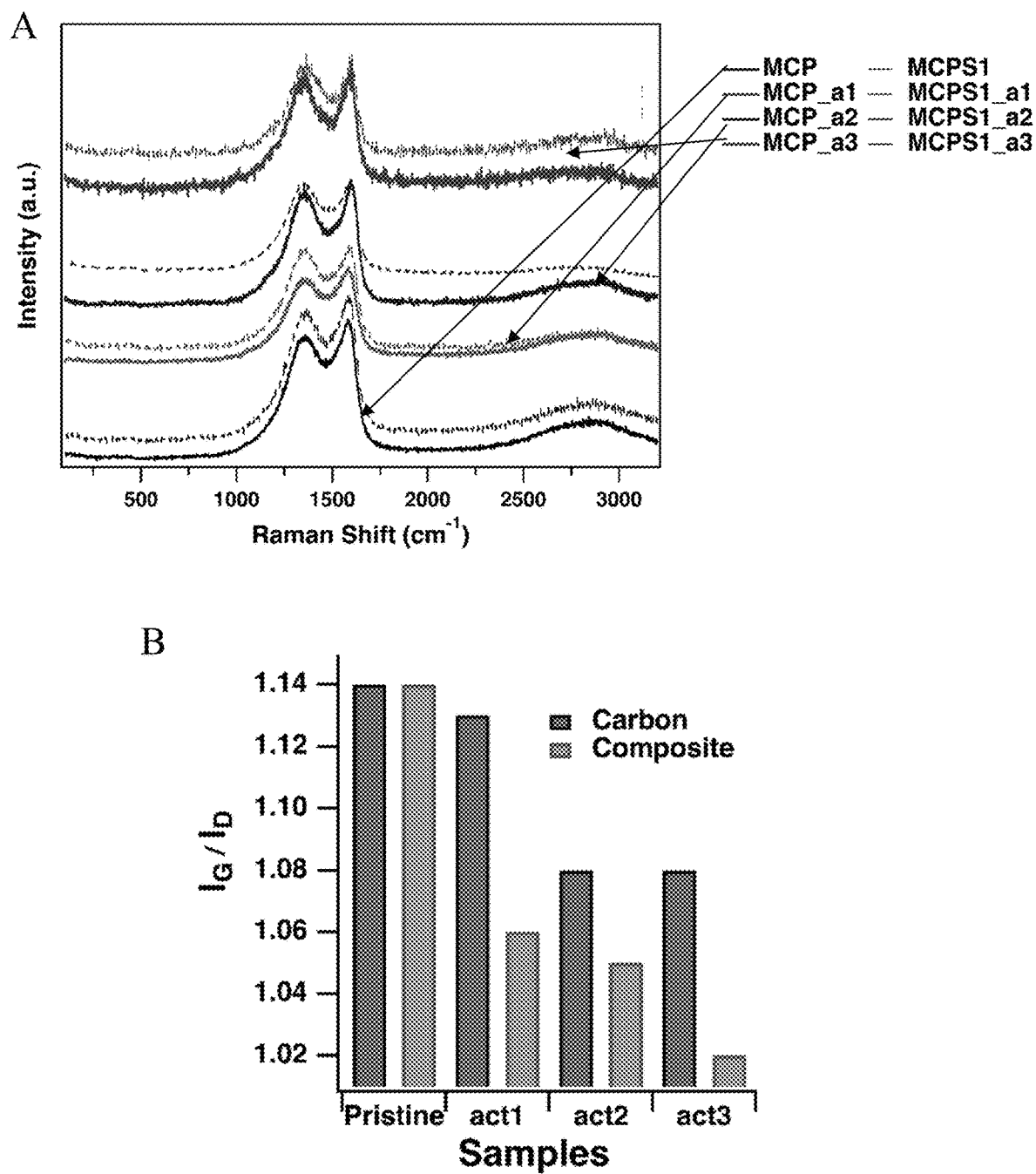
FIG. 18 shows (a) Raman spectra of the different porous carbons and porous carbon-sulfur composite; (b) Ratio of G band to D band for the porous carbons and porous carbon-sulfur composites.
Figure 19:
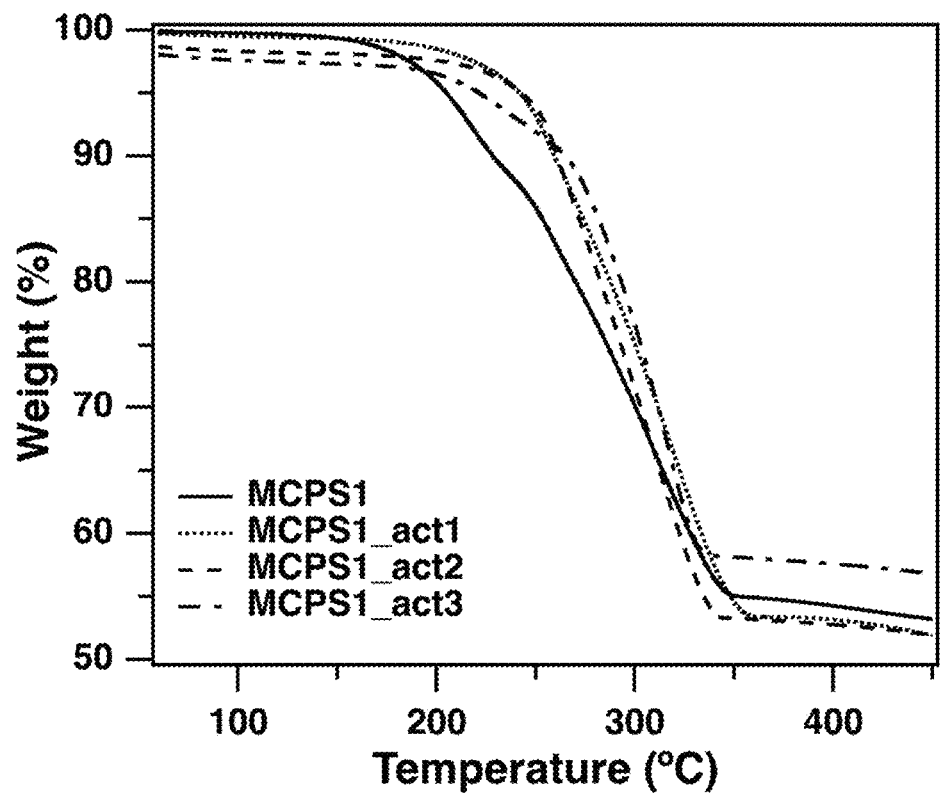
FIG. 19 shows TGA for the porous carbon-sulfur composites with different activation times and different pore size.
Figure 20:
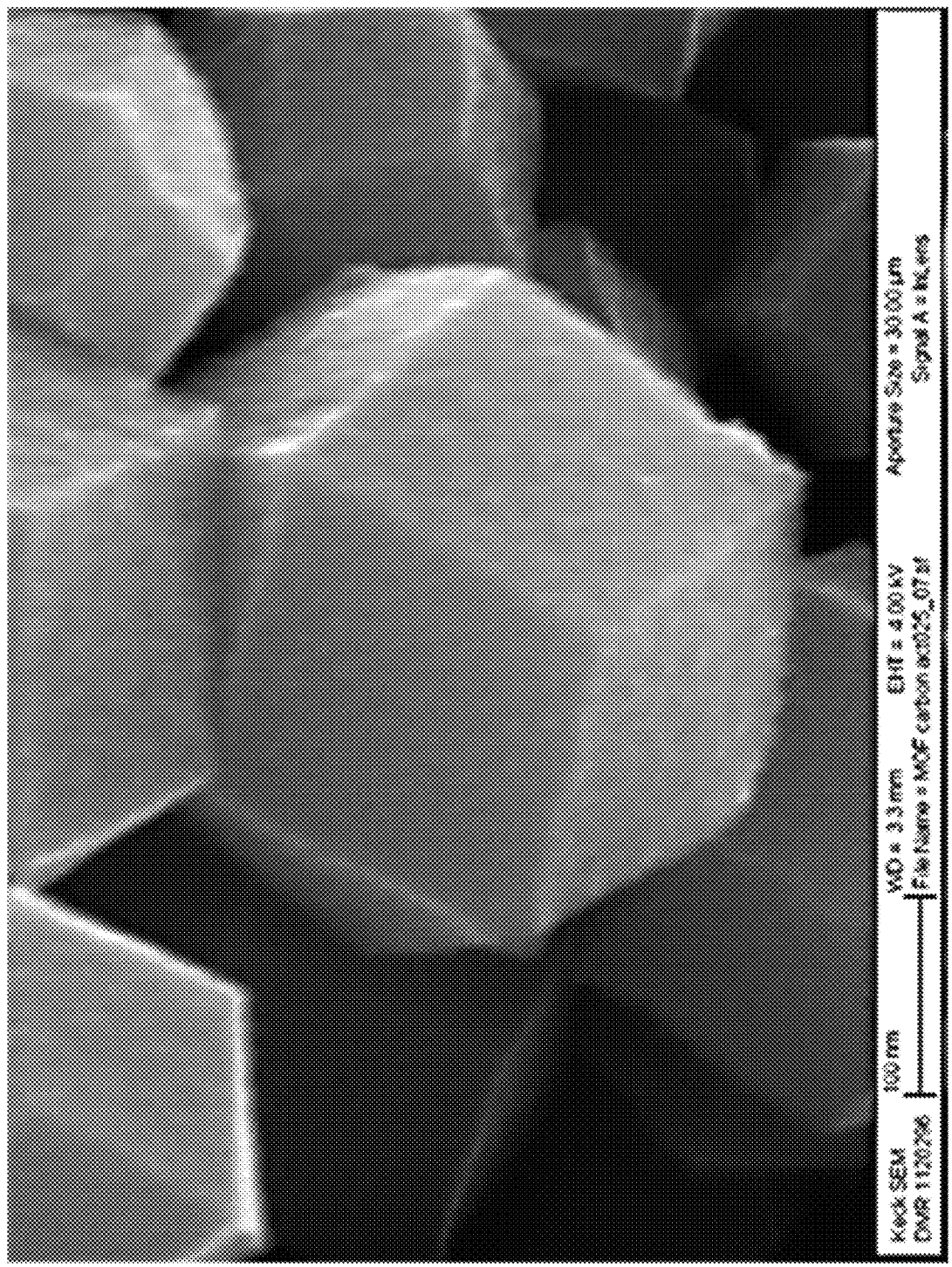
FIG. 20 shows SEM micrographs of MOFs after various activation times (a) 15 mins (min(s)=minute(s)) (b) 30 mins (c) 60 mins.
Figure 20:
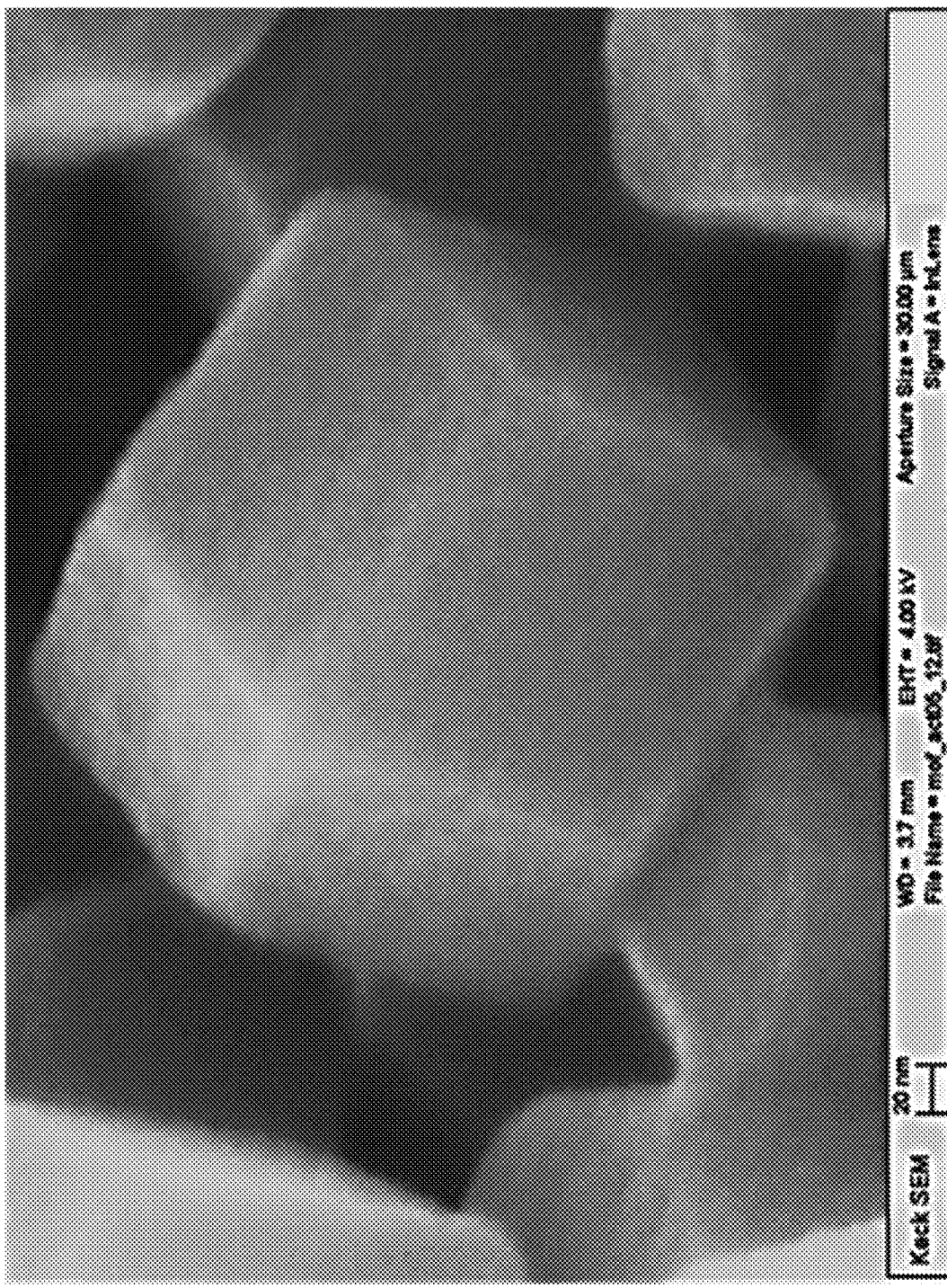
Figure 20:
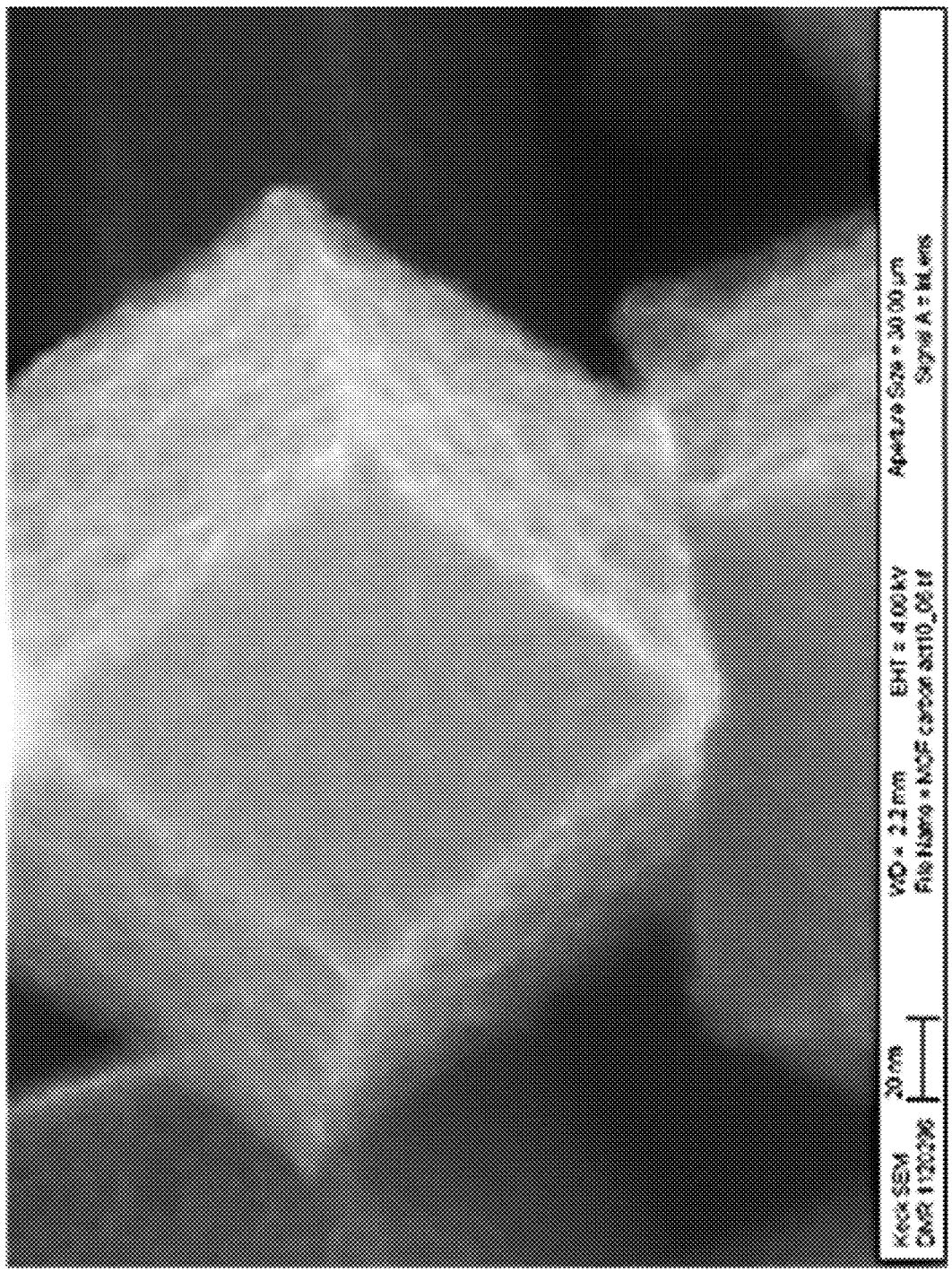

To investigate the discharge reaction mechanism, X-ray photoelectron spectroscopy (XPS) was applied on the cathode side after galvanostatic cycling at different stages to study the species formed at each stage (FIG. 5a). The pristine cathode exhibits an elemental-state sulfur doublet with S2p 2/3 at 164 eV. When the cell is discharged below 1 V, S2p 2/3 peaks at 162.1 eV and 160 eV representing $Na_2S_2$ and $Na_2S$ rise. The peak beyond 166 eV is probably due to thiosulfate/sulfate complex species originating from oxidized sulfide species. Upon full discharge, the elemental sulfur peak disappeared; only the sulfide peaks remain, suggesting the final discharge product is $Na_2S$. This can explain why a higher capacity is achieved compared to high temperature Na—S batteries, where the final discharge product is $Na_2S_x$ (x≥3) because of the phase limitation. Energy dispersive X-ray (EDX) analysis of the cathode after full discharge (FIG. 5b) reveal the atomic ratio of Na and S is about 2.085, consistent with an almost full reduction from S to $Na_2S$ (FIG. 15), and sulfur intensities concentrated inside the micropores (FIG. 5b), suggesting the solid-state reaction. To further understand the reaction mechanism, an organic conversation technique was utilized to characterize the reaction species during initial cycling in both EC/PC and TEGDME electrolytes. In this approach, highly reactive sulfide species are first converted to their stable analogue benzyl sulfides ($BzS_x$, x=1-5), and nuclear magnetic resonance (NMR) spectroscopy of the analogs applied to analyze the organic molecules (FIG. 16). Remarkably, chemical shift representing $Bz_2S$ were observed in the whole process for the cell utilizing EC/PC carbonate electrolyte and the first discharge process for the cell in the TEGDME electrolyte. In contrast, high order $BzS_x$ are clearly observed in recharged cathode in TEGDME. UV-vis spectra (FIG. 5c) of a dilute $Na_2S_6$ solution, battery cathodes after 10 cycles in TEGDME and carbonate electrolyte soaked in TEGDME are shown in FIG. 5c. In the carbonate electrolyte, there are only insoluble $S_2^{2-}$ or $S^{2-}$ formed, while high order soluble PSs are formed when the cell are cycled in TEGDME. This again confirms that MCPS cathode coupled with carbonate electrolyte undergoes solid-state reaction with no soluble intermediated soluble polysulfide formed in Na—S batteries.

Figure 6:
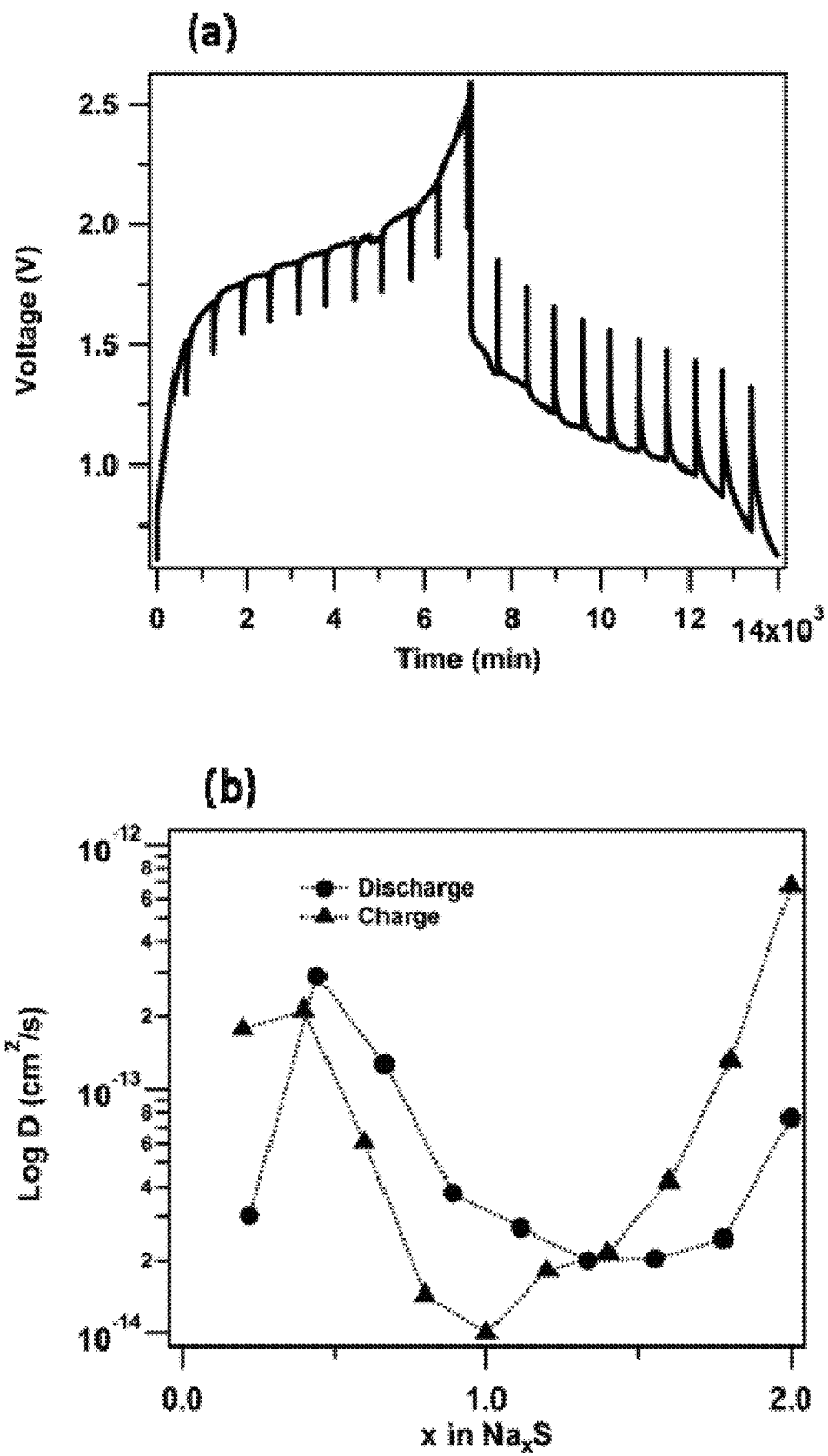
FIG. 6 shows diffusivity analysis of the Na—S cell. (a) GITT curves of MCPS1 in EC/PC electrolyte and (b) Diffusion coefficients derived from (a).

Based on the spectroscopic study above, we hypothesize that the electrochemistry in the cathode reaction occurs completely inside the MCPS, which means that both the transport of $Na^+$ into the cathode and the electrochemical reaction with sulfur in the cathode progress as solid-state processes. To verify this hypothesis, we first extract an approximate value for the $Na^+$ diffusivity in the cathode based on electrochemical data. Measurements utilizing a galvanostatic intermittent titration technique (GITT) was performed by discharging the cell for 30 minutes at 0.1 C followed by a 10-hour relaxation (FIG. 6a). The diffusion coefficient (FIG. 6b) at different stages during reversible charging and discharging can be calculated from the transient voltage response using an expression developed previously for solid-state diffusion processes in batteries. The $Na^+$ diffusivity deduced from this analysis is found to be the lowest in the region where the discharge profile exhibits a clear plateau, consistent with the idea that a kinetics-controlled mechanism is overlayed on the discharge. In addition, the equilibrium potential determined at the end of each titration step changes very slightly and all below 2 V, suggesting the formation of $Na_2S_x$ (x≤2). The reason why the solid-state reaction occurs only in microporous carbons with extremely small pore size, but not in other carbon materials is open to argument. On the basis of the empirical evidence in the present study, we tentatively attribute the difference to the strong interaction between sulfur/sulfur species in the carbon is much stronger than the strength for sulfur/sulfur species solvation due to their poor solubility in carbonate electrolytes and to the short electronic transport lengths, which permit good active material utilization during normal battery operation even under slow solid-state transport kinetics.

In conclusion, we describe to our knowledge the first example of a room-temperature, rechargeable Na—S battery that can be cycled stably with high Columbic efficiency at low and moderate current densities. The battery utilizes a microporous carbon/sulfur composite in the cathode and an EC/PC-1M NaClO$_4$ electrolyte. This combination of cathode substrate and electrolyte are shown to provide sufficiently strong association of sulfur in the cathode to confine the electrochemical reactions in the cathode to an all-solid state process in which Na$_2$S appears to be the only product. We use both spectroscopic and analytical tools to show that for the carbons used in the present work, sulfur remains as S$_8$ and that the cathode reaction occurs inside the microporous carbon composite. An additional problem associated with instability during the recharge process of Na—S cells operated at moderate and high current density was identified and resolved using SiO$_2$-IL-ClO$_4$ particles as additives in the electrolytes. Electron microscopy and electrochemical analysis indicates that the particles form a dense protective coating on the Na anode and stabilize deposition of sodium by at least two mechanisms. First they form a particle-rich, mechanically strong SEI layer that protects sodium metal from parasitic side reactions with the liquid carbonate electrolyte. Second, they appear to utilize a tethered anion effect to stabilize deposition of Na. Our finding underscores the benefits of microporous carbon-sulfur composite and nanoparticles for gridding new material designs for inexpensive rechargeable metal-sulfur batteries.

Methods:

Materials Synthesis: MCPS and SiO$_2$-IL-ClO$_4$ electrolyte were synthesized according to the previous methods with modifications. Briefly, the synthesis of MCPS is the same except the final sulfur infusion step. A sealed Pyrex tube was used to hold samples and a ramp rate of 1° C./min was used for both heating and cooling. The final mass fraction of sulfur in the composites was determined by TGA (Q5000 IR Thermogravimetric Analyzer). The synthesis of SiO$_2$-IL-ClO$_4$ was the same as well except the anion exchange step. In this work, NaClO$_4$ was used to as anion exchange source.

Material Characterization: The morphology and elemental mappings of the materials were studied using a FEI Tecnai F20 Transmission Electron Microscope and A LEO 1550 high resolution scanning electron microscopy. The nitrogen adsorption-desorption isotherms of the MCP and MCPS were obtained with a Brunauer-Emmett-Teller (Micromeritics ASAP2020). AccuTOF™ DART was used to get mass spectra for sulfur and MCPS composites. Raman spectra were collected using a Renishaw InVia Confocal Raman Microscope ($\lambda$=488 nm). $^1$H NMR spectra were taken by Inova-400 Spectrometer. UV-vis spectra were collected by Shimadzu UV-Vis-NIR Spectrometer. X-ray photoelectron spectroscopy (XPS) measurements were performed with a Surface Science SSX-100 spectrometer using a monochromatic Al K$\alpha$ source (1486.6 eV). Non-linear least squares curve fitting was applied to high-resolution spectra, using CasaXPS software.

Electrochemical Measurements: The cathodes were prepared with MCPS1 or MCPS2, carbon black (Super-P, TIMCAL), and polymer binder (poly(vinylidene difluoride), PVDF, Aldrich) in a weight ratio of 8:1:1. A carbon-coated aluminum foil (0.004 in thick, 1.27 in diameter, MTI Corp.) was used as the current collector. The typical thickness of the active material film is ~20 μm and sulfur loading is around 0.73~1 mg. Sodium foil (Alfa Aesar) was used as the counter and reference electrode. A glass fiber filter paper (Watchman 934-AH) was used as separator. 80 μL 1M sodium perchlorate (NaClO$_4$) in a mixture ethylene carbonate (EC) and diethyl carbonate (DEC) (v:v=1:1) or in tetraethylene glycol dimethyl ether (TEGDME) or in a mixture of EC and propylene carbonate (PC) (v:v=1:1) with different amount of SiO$_2$-IL-ClO$_4$ were used as electrolyte for the cells. Cell assembly was carried out in an argon-filled glove-box (MBraun Labmaster) by using coin cell 2032 type. The room-temperature cycling characteristics of the cells were evaluated under galvanostatic conditions using Neware CT-3008 battery testers and electrochemical processes in the cells were studied by cyclic voltammetry using a CHI600D potentiostat. Electrochemical impedance and floating tests were conducted by using a Solartron Cell Test System model 1470E potentiostat/galvanostat. Ionic conductivities were measured using a Novocontrol N40 broadband dielectric spectrometer.

For post-mortem studies, cells were disassembled in an argon-filled glove-box and the electrodes were harvested and rinsed thoroughly with the electrolyte solvent before analysis.

EXAMPLE 2

This example describes formation of a microporous host material of the present disclosure and characterization of same.

To activate microporous carbon, a microporous carbon was treated with CO$_2$ at 950° C. for 15 min, 30 min, and 60 min to increase surface area and porosity, thus allowing more loading of sulfur into the carbon.

TABLE 2

Surface area and pore size analysis of the microporous carbons with different activation time derived from nitrogen adsorption-desorption isotherm

| Samples | BET Total Surface Area (m$^2$/g) | Pore Volume (cm$^3$/g) | Micropore Surface Area (m$^2$/g) | Median Pore Width (Å) |
| --- | --- | --- | --- | --- |
| MCP | 833.3781 | 0.443103 | 708.4812 | 9.134 (HK) |
| MCP_act1 | 1,253.38 | 0.610571 | 894.1453 | 8.974 (HK) |
| MCP_act2 | 1,473.77 | 0.7199 | 1,013.29 | 9.028 (HK) |
| MCP_act3 | 1,758.04 | 0.838194 | 730.7379 | 40.373 (BJH) |

TABLE 3

The ratio of G band to D band for different microporous carbon and microporous carbon-sulfur composite derived from Raman Spectra.

| Carbon | I$_g$/I$_d$ | Composite | I$_g$/I$_d$ |
| --- | --- | --- | --- |
| MCP | 1.14 | MCPS1 | 1.14 |
| MCP_act1 | 1.13 | MCPS1_act1 | 1.06 |
| MCP_act2 | 1.08 | MCPS1_act2 | 1.05 |
| MCP_act3 | 1.08 | MCPS1_act3 | 1.02 |

EXAMPLE 3

This example describes formation of a microporous host material of the present disclosure and characterization of same.

Figure 21:
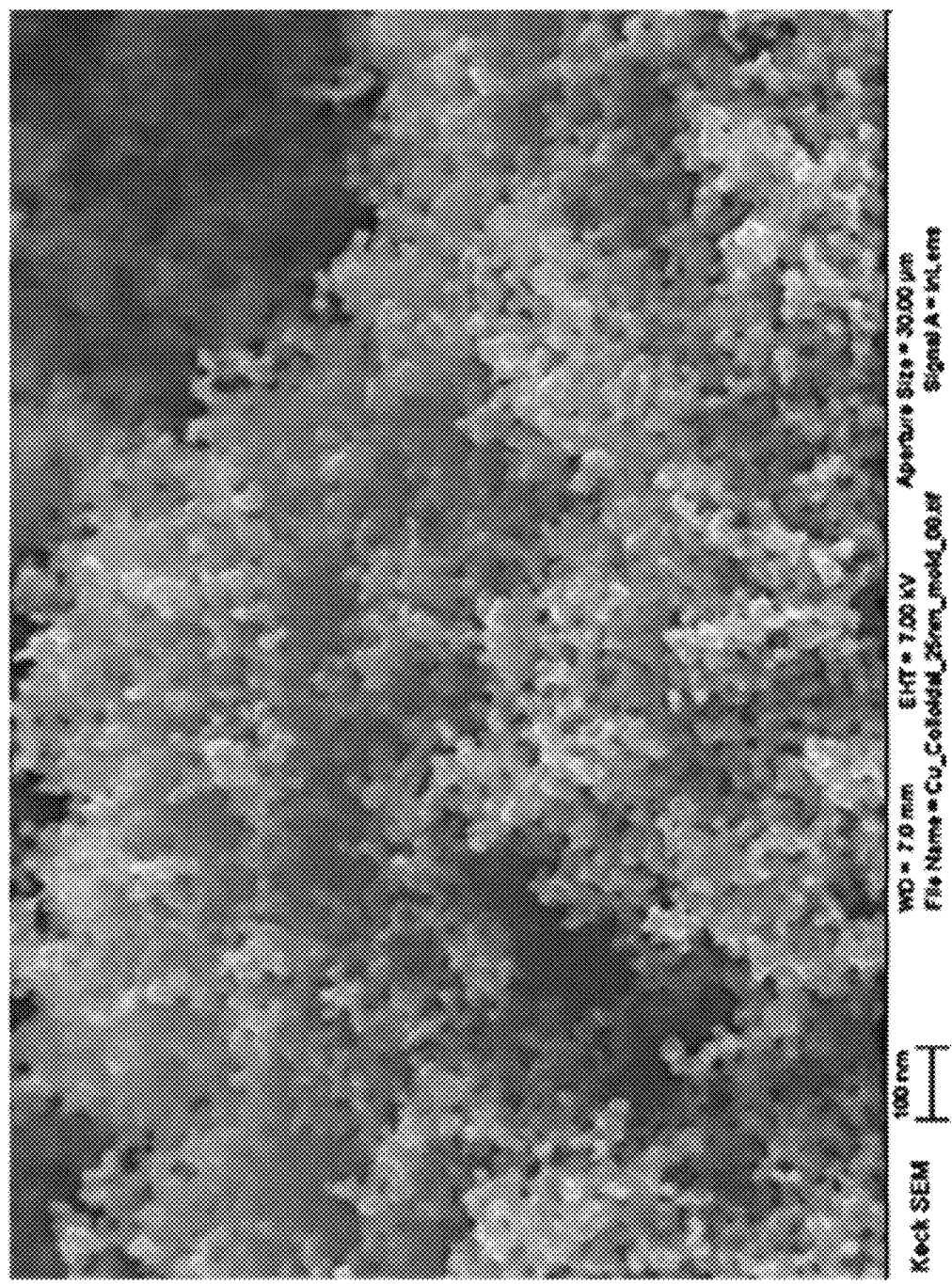
FIG. 21 shows SEM images of examples of electrodeposited porous copper using PS template with different diameters: (a) 20 nm; (b) 200 nm; and (c) 1 μm.
Figure 21:
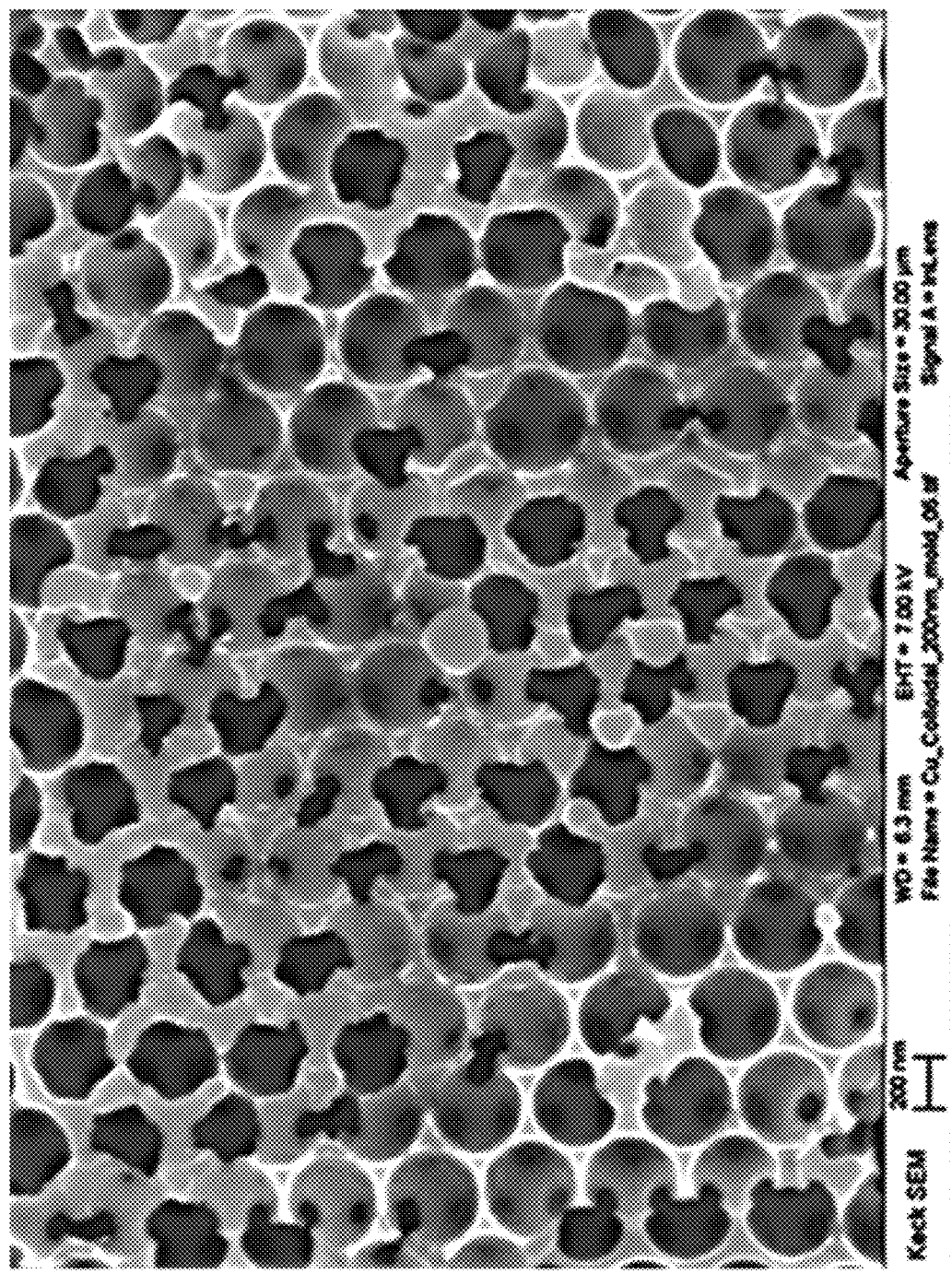
Figure 21:
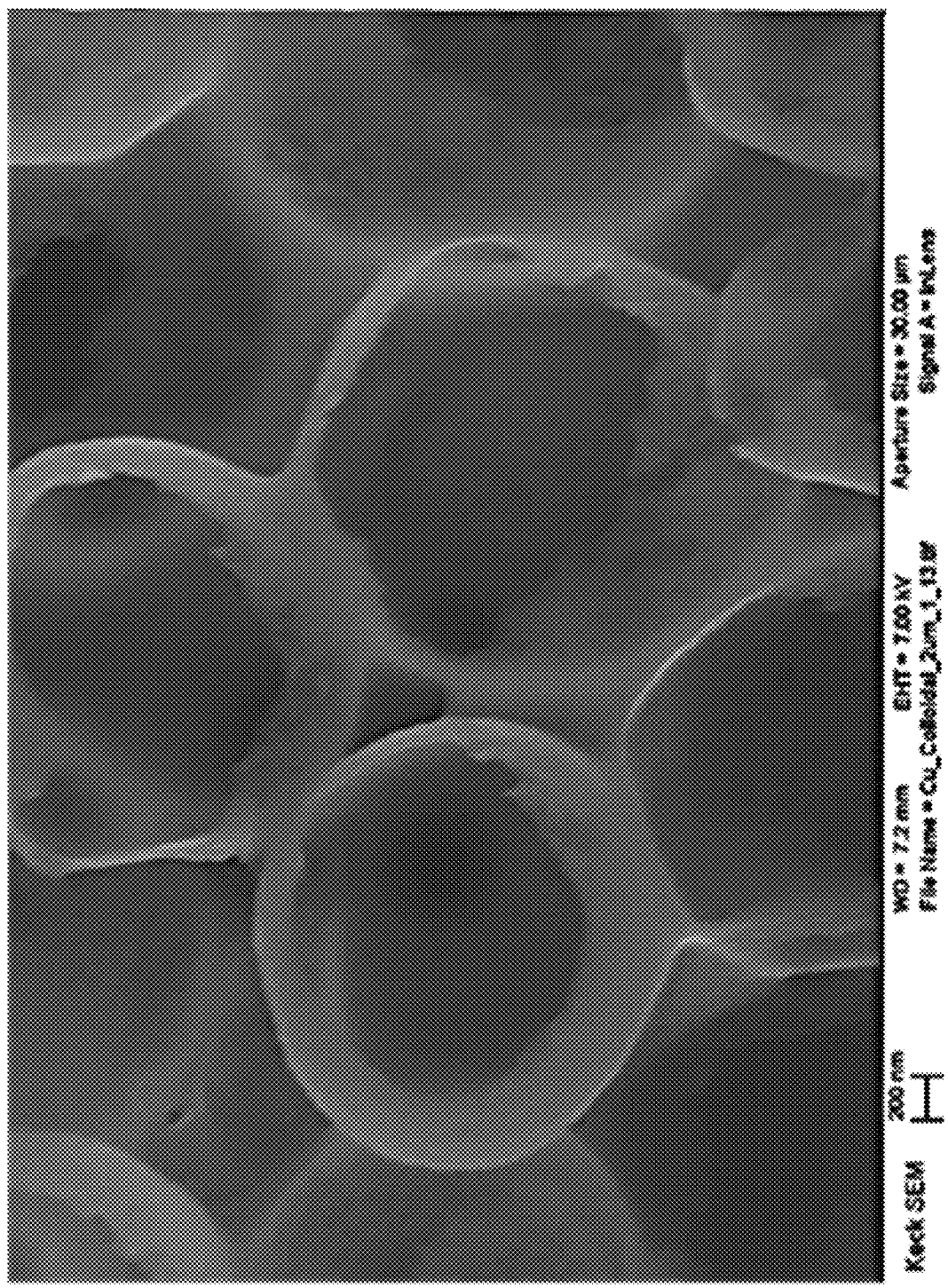
Figure 22:
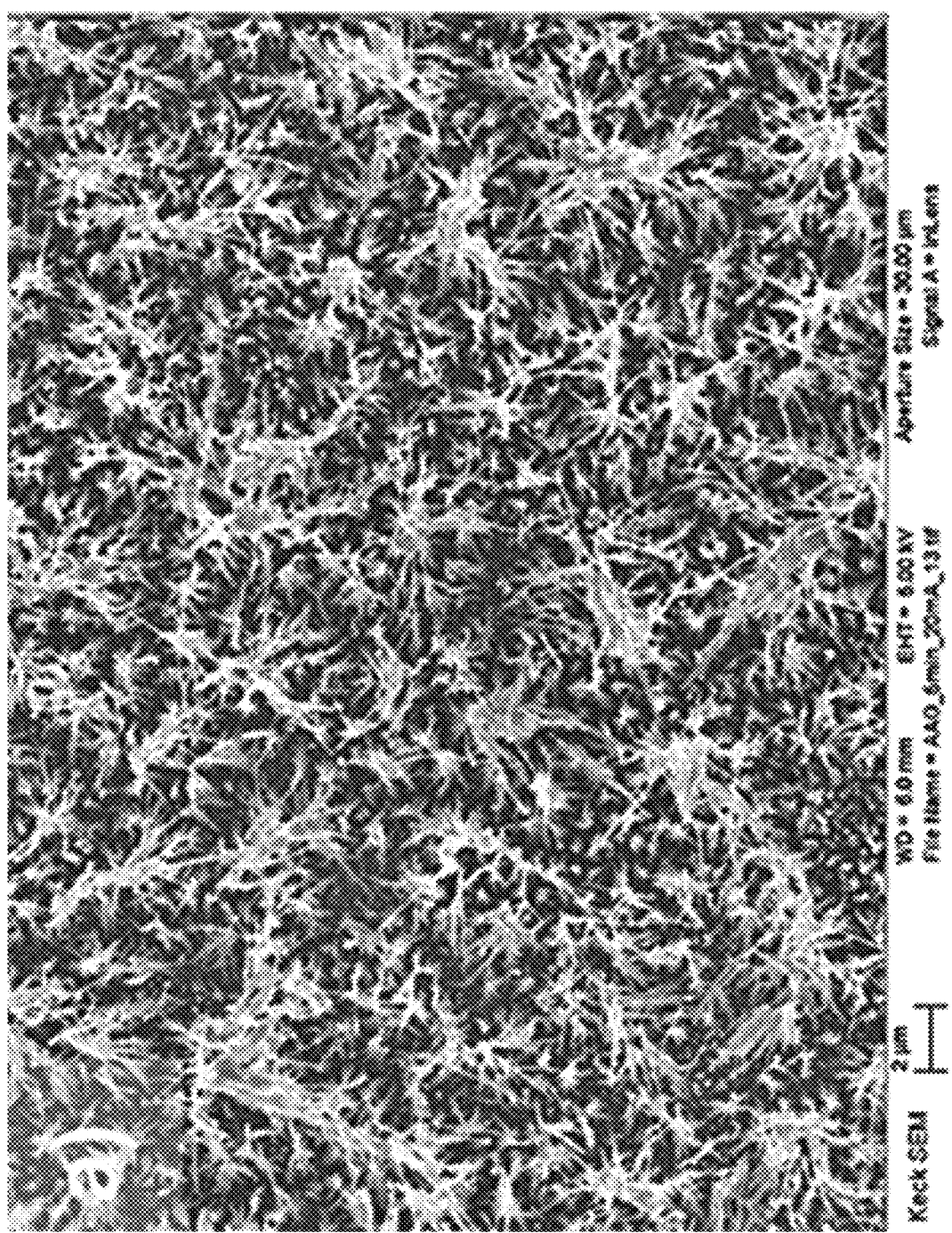
FIG. 22 shows SEM images of examples of electrodeposited porous copper by using 200 nm AAO template with different deposition time: (a) 5 min; (b) 10 min; (c) 20 min; (d) 30 min; and (e) 60 min.
Figure 22:
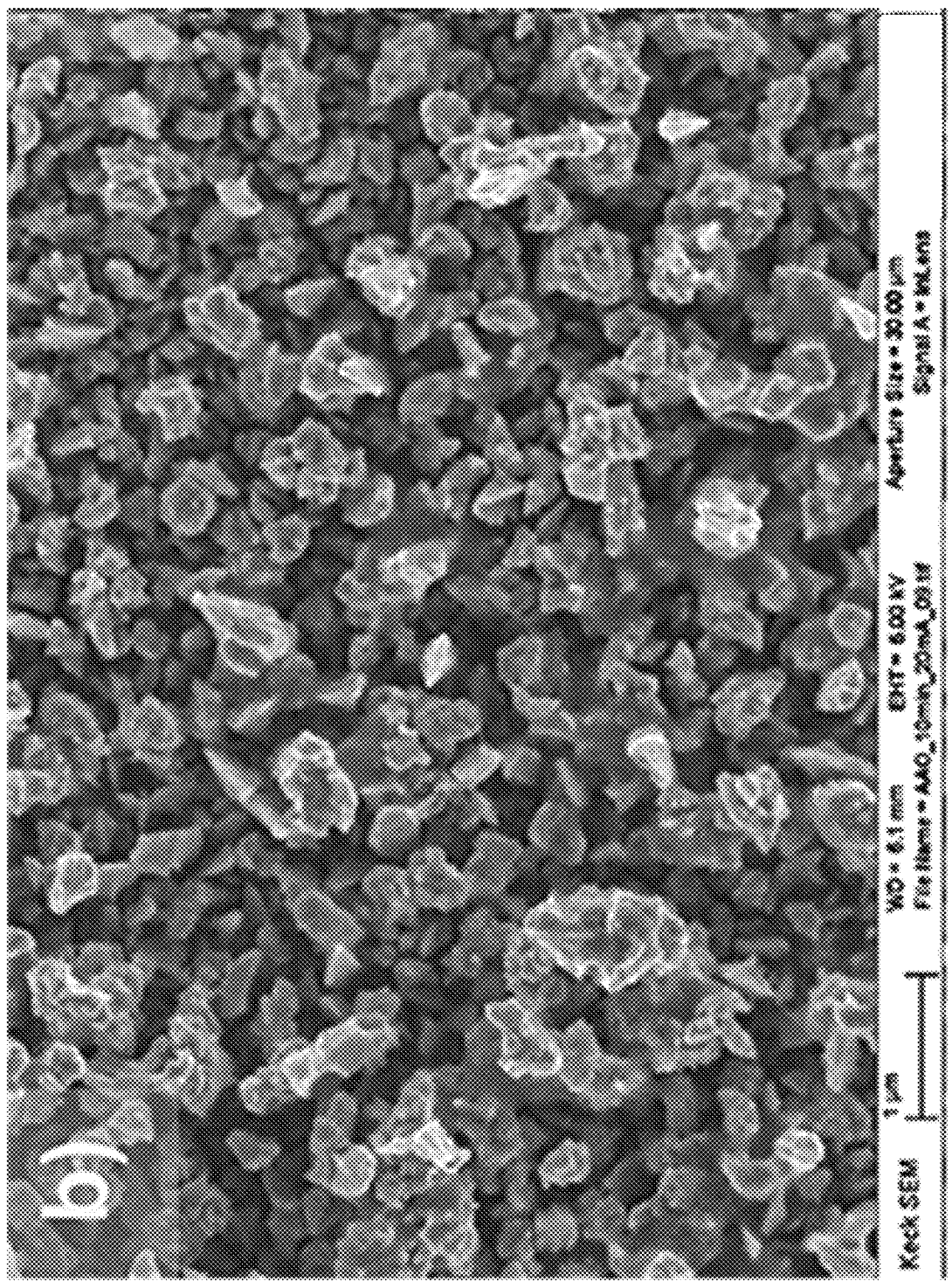
Figure 22:
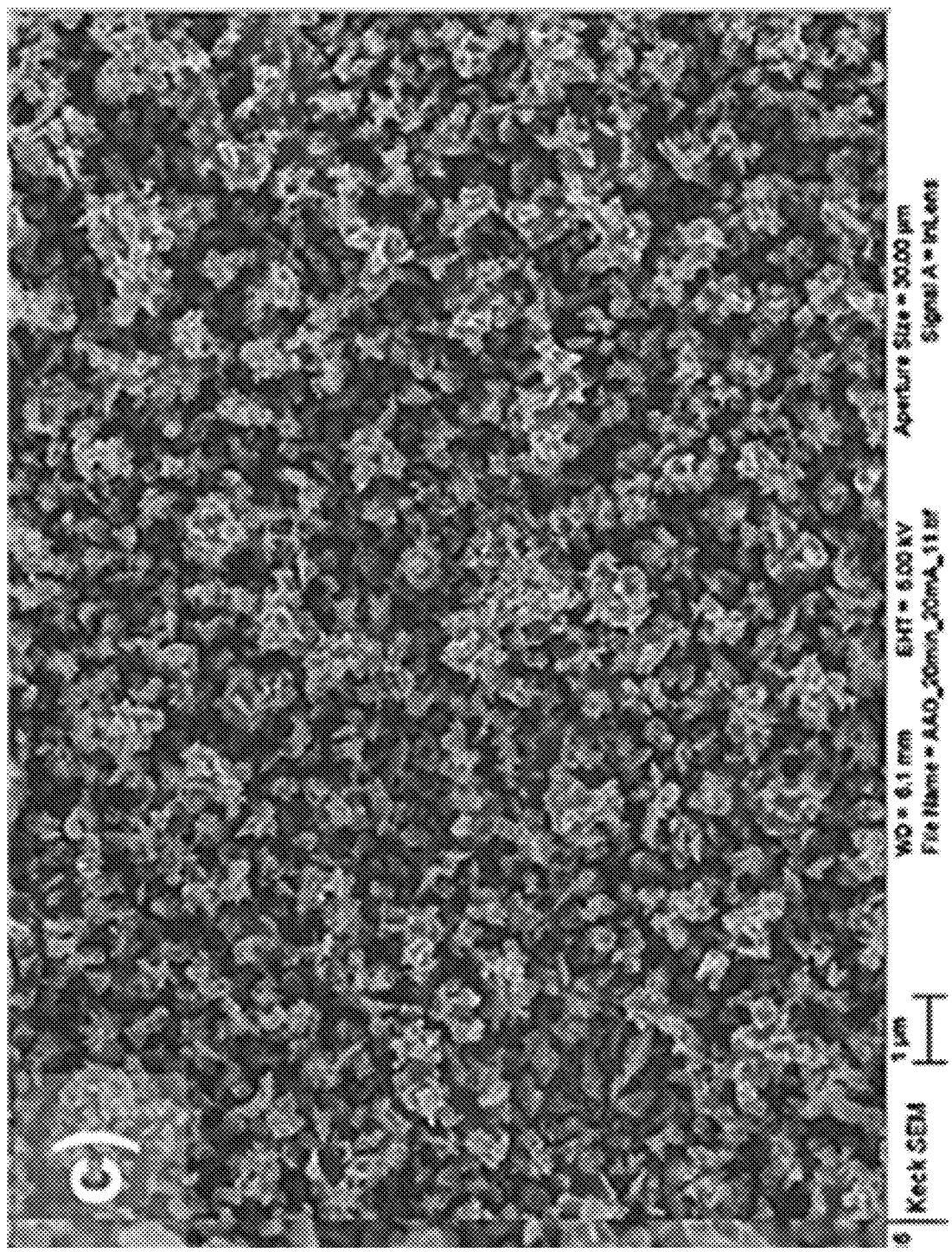
Figure 22:
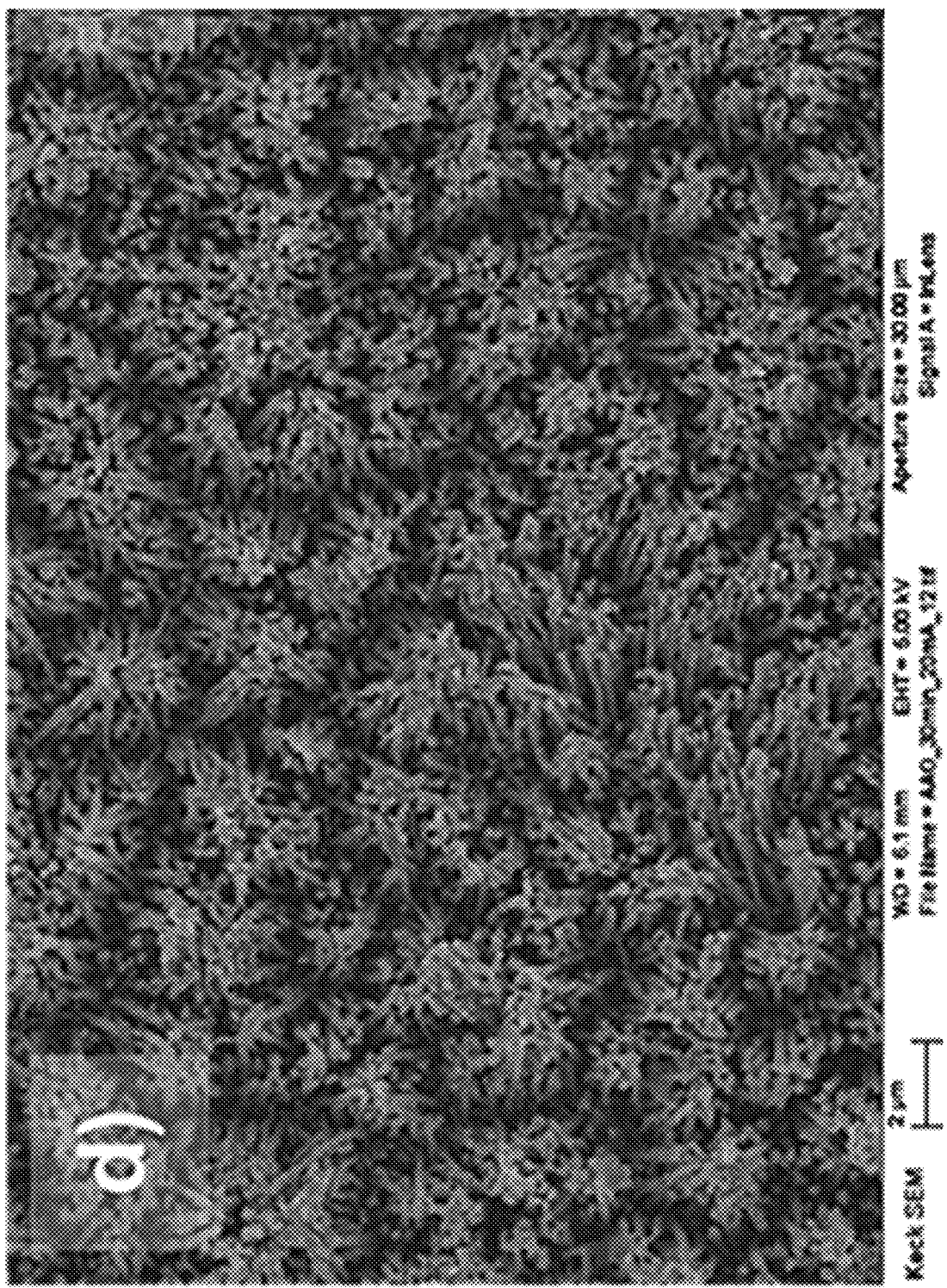
Figure 22:
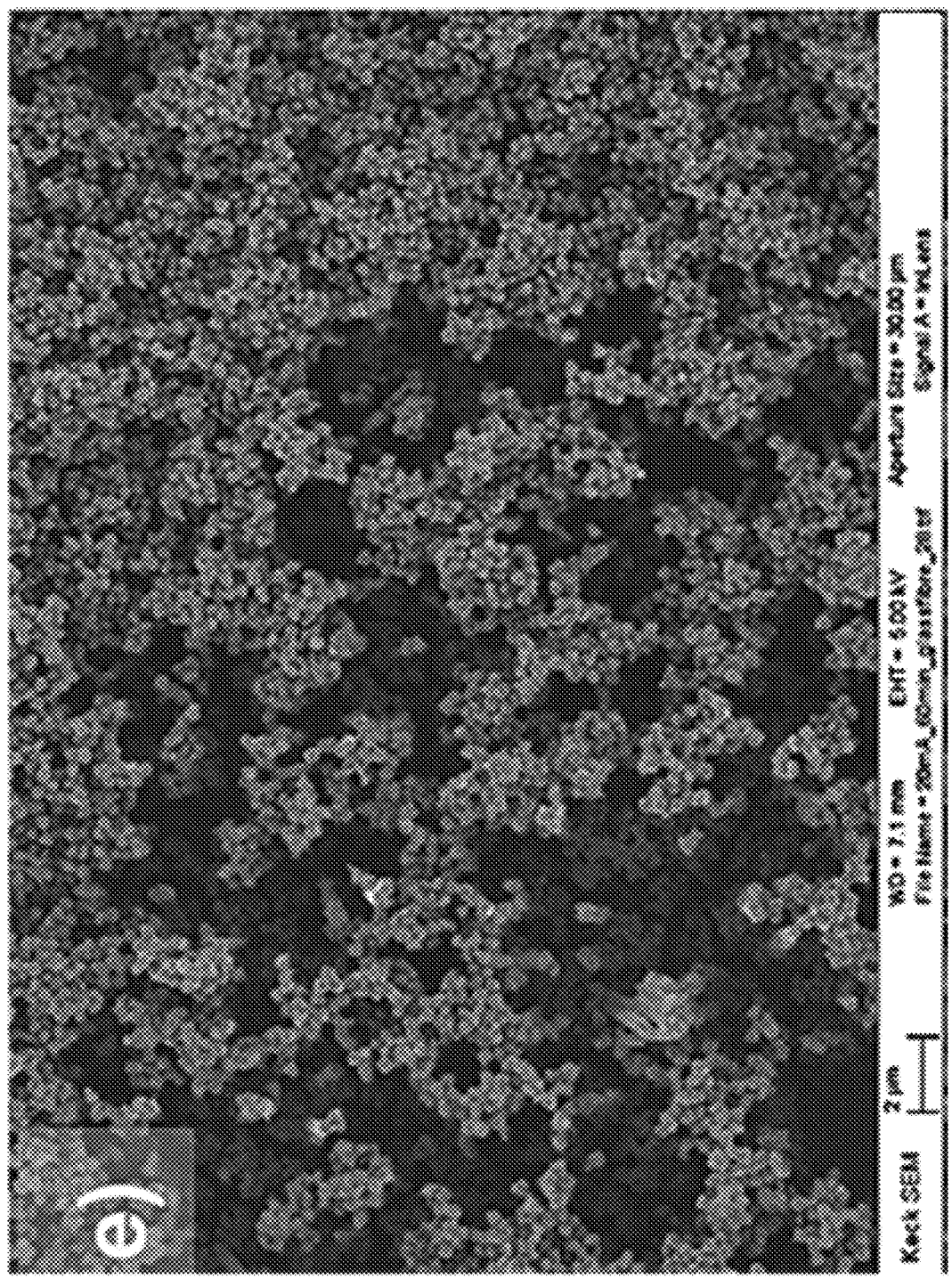

FIGS. 21 and 22 describe examples of forming a porous metal (copper) host using electrodeposition with a template.

Method: A baker cell is made with two copper electrodes that are parallel facing to each other and 0.5 M CuSO$_4$ solution in water as the electrolyte. A template (polystyrene (PS) nanosphere or anodized aluminum oxide (AAO)) is firstly packed on one copper electrode surface. Then copper is electrodeposited at a constant current of 20 mA/cm² for 30 min. After that the template is removed to achieve porous Cu. The electrolyte concentration, current density and time are important to control/alter the morphology of the porous metal formation.

FIG. 21 shows SEM images of electrodeposited porous copper using PS template with different diameters: (a) 20 nm; (b) 200 nm; and (c) 1 μm. FIG. 22 shows SEM images of electrodeposited porous copper using 200 nm AAO template with different deposition time: (a) 5 min; (b) 10 min; (c) 20 min; (d) 30 min; and (e) 60 min.

While the disclosure has been described through illustrative examples, routine modifications of the various examples will be apparent to those skilled in the art and such modifications are intended to be within the scope of this disclosure.

The invention claimed is:

1. A rechargeable battery comprising:
a) a sodium metal anode;
b) a cathode comprising a microporous and/or mesoporous host-sulfur composite material;
c) a liquid electrolyte comprising a liquid electrolyte solvent and a liquid electrolyte sodium salt; and
d) an electrolyte additive comprising an ionic liquid tethered to an organic or inorganic nanoparticle.

2. The rechargeable battery of claim 1, wherein the microporous and/or mesoporous host comprises a material selected from the group consisting of microporous and/or mesoporous carbon materials, microporous and/or mesoporous polymers, microporous and/or mesoporous metal-organic frameworks, microporous and/or mesoporous metals, microporous and/or mesoporous metal oxides, microporous and/or mesoporous ceramic materials, microporous and/or mesoporous molecular sieves, and microporous and/or mesoporous metal sulfides.

3. The rechargeable battery of claim 1, wherein the microporous and/or mesoporous host has pores having a diameter of 0.1 nm to 20 nm and/or a pore volume of 0.2 to 3 cm³/g and/or a surface area of 200 to 3000 m²/g.

4. The rechargeable battery of claim 1, wherein the sulfur is elemental sulfur and the elemental sulfur is confined in one or more of the pores of the microporous and/or mesoporous host and the sulfur is present at 30% to 80% by weight based on the weight of the microporous and/or mesoporous host-sulfur composite material.

5. The rechargeable battery of claim 1, wherein the microporous and/or mesoporous host-sulfur composite electrode is a microporous and/or mesoporous carbon-sulfur composite cathode, and wherein the microporous and/or mesoporous carbon has regularly shaped and regularly oriented pores having a diameter of 0.1 nm to 20 nm.

6. The rechargeable battery of claim 5, wherein the microporous and/or mesoporous carbon has a pore volume of 0.2 to 3 cm³/g and/or a surface area of 200 to 3000 m²/g.

7. The rechargeable battery of claim 5, the microporous and/or mesoporous carbon comprises primary particles having a rhombic dodecahedral shape.

8. The rechargeable battery of claim 3, wherein the microporous and/or mesoporous carbon-sulfur composite cathode comprises a porous carbon-sulfur composite having a conductivity of above $5*10^{-3}$ S/cm.

9. The rechargeable battery of claim 3, wherein the microporous and/or mesoporous carbon contains more graphitic carbon than disordered carbon.

10. The rechargeable battery of claim 3, wherein the microporous and/or mesoporous carbon of the microporous and/or mesoporous carbon-sulfur composite electrode is made by carbonization of metal-organic framework or carbon precursors.

11. The rechargeable battery of claim 3, wherein the sulfur is vapor infused into the pores of the microporous and/or mesoporous carbon.

12. The rechargeable battery of claim 1, wherein the liquid electrolyte solvent is selected from the group consisting of aliphatic carbonates, alkylpolyethers, and combinations thereof.

13. The rechargeable battery of claim 12, wherein the aliphatic carbonate is selected from the group consisting of ethylene carbonate, propylene carbonate, vinyl carbonate, dimethyl carbonate, diethyl carbonate, ethylmethyl carbonate, fluorinated ethylene carbonate, and combinations thereof.

14. The rechargeable battery of claim 12, wherein the alkylpolyether is selected from the group consisting of tetraglyme, dyglyme, monoglyme, 1,3-dioxolane, ethylene glycol dimethyl ether, and combinations thereof.

15. The rechargeable battery of claim 1, wherein the liquid electrolyte sodium salt is selected from the group consisting of sodium hexafluorophosphate, sodium perchlorate, bis (trifluoromethanesulfonyl) imide sodium, sodium trifluoromethanesulfonate, sodium nitrite, sodium fluoride, sodium chloride, sodium bromide, sodium iodide, and combinations thereof.

16. The rechargeable battery of claim 1, wherein the nanoparticle has a diameter of 2 nm to 500 nm.

17. The rechargeable battery of claim 1, wherein the ionic liquid comprise a cation moiety selected from the group consisting of imidizolium ions, ammonium, pyridinium, piperdinium, and pyrrolidinium and/or the ionic liquid comprises an anion selected from group consisting of halide ions, perchlorate ions, hexafluorophosphate ions, and bis (trifluoromethanesulfonyl) imide, trifluoromethanesulfonate ions.

18. The rechargeable battery of claim 1, wherein the electrolyte additive is present at 5% to 30% volume fraction with respect to the volume of the liquid electrolyte.

19. The rechargeable battery of claim 1, wherein the cation of the ionic liquid is tethered to an organic or inorganic nanoparticle.

20. The rechargeable battery of claim 1, wherein the organic nanoparticle is a carbon nanoparticle or a polymer nanoparticle.

21. The rechargeable battery of claim 1, wherein the inorganic particle is a silica nanoparticle, titania nanoparticle, alumina nanoparticle, zirconium dioxide nanoparticle, or calcium peroxide nanoparticle.

22. The rechargeable battery of claim 1, wherein the ionic liquid cation is tethered to an organic or inorganic particle via an alkylene moiety comprising 3 to 10 carbons.

23. The rechargeable battery of claim 1, wherein the at least a portion or all of the electrolyte additive forms a layered coating comprising 1 to 50 layers of the electrolyte additive disposed on at least a portion or all of the surface of the anode in contact with the liquid electrolyte.

24. The rechargeable battery of claim 1, wherein during discharge of the battery the sulfur undergoes a reversible solid-state reaction to form insoluble sulfides and/or the reaction does not form soluble polysulfides.

25. A device comprising one or more rechargeable battery of claim 1.

26. The device of claim 25, wherein the device is a battery pack.

27. The device of claim 26, wherein the battery pack is a homogeneous battery pack or a heterogeneous battery pack.

\* \* \* \* \*